(12) United States Patent
Matsushima

(10) Patent No.: US 7,693,994 B2
(45) Date of Patent: Apr. 6, 2010

(54) INTERMEDIARY APPARATUS, DISTRIBUTED PROCESSING SYSTEM, DATA-TRANSFER METHOD, PROGRAM AND RECORDING MEDIUM

(75) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 939 days.

(21) Appl. No.: 11/198,911

(22) Filed: Aug. 8, 2005

(65) Prior Publication Data

US 2006/0085498 A1 Apr. 20, 2006

(30) Foreign Application Priority Data

Sep. 17, 2004 (JP) ............... 2004-272614

(51) Int. Cl.
- *G06F 15/173* (2006.01)
- *G06F 15/16* (2006.01)
- *G06F 15/02* (2006.01)

(52) U.S. Cl. ............... 709/226; 709/202; 709/227; 705/8

(58) Field of Classification Search ............... None
See application file for complete search history.

(56) References Cited

U.S. PATENT DOCUMENTS

| | | | |
|---|---|---|---|
| 6,349,336 | B1 | 2/2002 | Sit et al. |
| 7,149,813 | B2 * | 12/2006 | Flanagin et al. ............ 709/248 |
| 7,296,072 | B2 * | 11/2007 | Flurry et al. ............... 709/226 |
| 7,428,523 | B2 * | 9/2008 | Tsang et al. ............... 707/2 |
| 2003/0084093 | A1 | 5/2003 | Grason et al. |
| 2004/0148328 | A1 * | 7/2004 | Matsushima ............... 709/200 |
| 2005/0027871 | A1 * | 2/2005 | Bradley et al. ............ 709/227 |
| 2007/0192415 | A1 * | 8/2007 | Pak ............... 709/206 |

FOREIGN PATENT DOCUMENTS

| | | |
|---|---|---|
| EP | 1241902 | 9/2002 |
| EP | 1418732 | 5/2004 |
| JP | 07-105116 | 4/1995 |
| JP | 2001-086133 | 3/2001 |
| JP | 2001-273211 | 10/2001 |
| JP | 2002-135858 | 5/2002 |
| WO | WO 02/13479 | 2/2002 |

OTHER PUBLICATIONS

Office Action for corresponding Japanese Application No. 2004-272614 dated Jan. 6, 2009.
Mikio Aoyama, Creation of Next Generation Information Systems Based on Software Services Engineering, A Publication C of The Institute of Electrical Engineers of Japan, Japan, The Institute of Electrical Engineers of Japan, May 1, 2002, vol. 122-C, No. 5, pp. 737 through 743.

* cited by examiner

*Primary Examiner*—Wen-Tai Lin
(74) *Attorney, Agent, or Firm*—Harness, Dickey & Pierce, P.L.C.

(57) ABSTRACT

An intermediary apparatus for intermediating communications between a first communications apparatus and multiple second communications apparatuses is disclosed. The intermediary apparatus includes first receiving means for receiving from the first communications apparatus at least an operational request, first transmitting means for transmitting to a second communications apparatus to be a forwarding destination each operational request received by the receiving means according to a type of the operational request, second receiving means for receiving from one of the second communications apparatuses at least an operational response to the operational request transferred from the first communications apparatus, and second transmitting means for transmitting to the first communications apparatus each operational response received by the second receiving means.

20 Claims, 54 Drawing Sheets

| NAME-SPACE URI | FORWARDING-DESTINATION INFORMATION (IP ADDRESS, HOST NAME, ETC.) |
|---|---|
| http://www.example.com/maintenance/server | INTERMEDIARY SERVER B (ITSELF) |
| http://www.example.com/maintenance/client | INTERMEDIARY SERVER B (ITSELF) |
| default | INTERMEDIARY ITSELF SERVER C (NEXT INTERMEDIARY SERVER) |

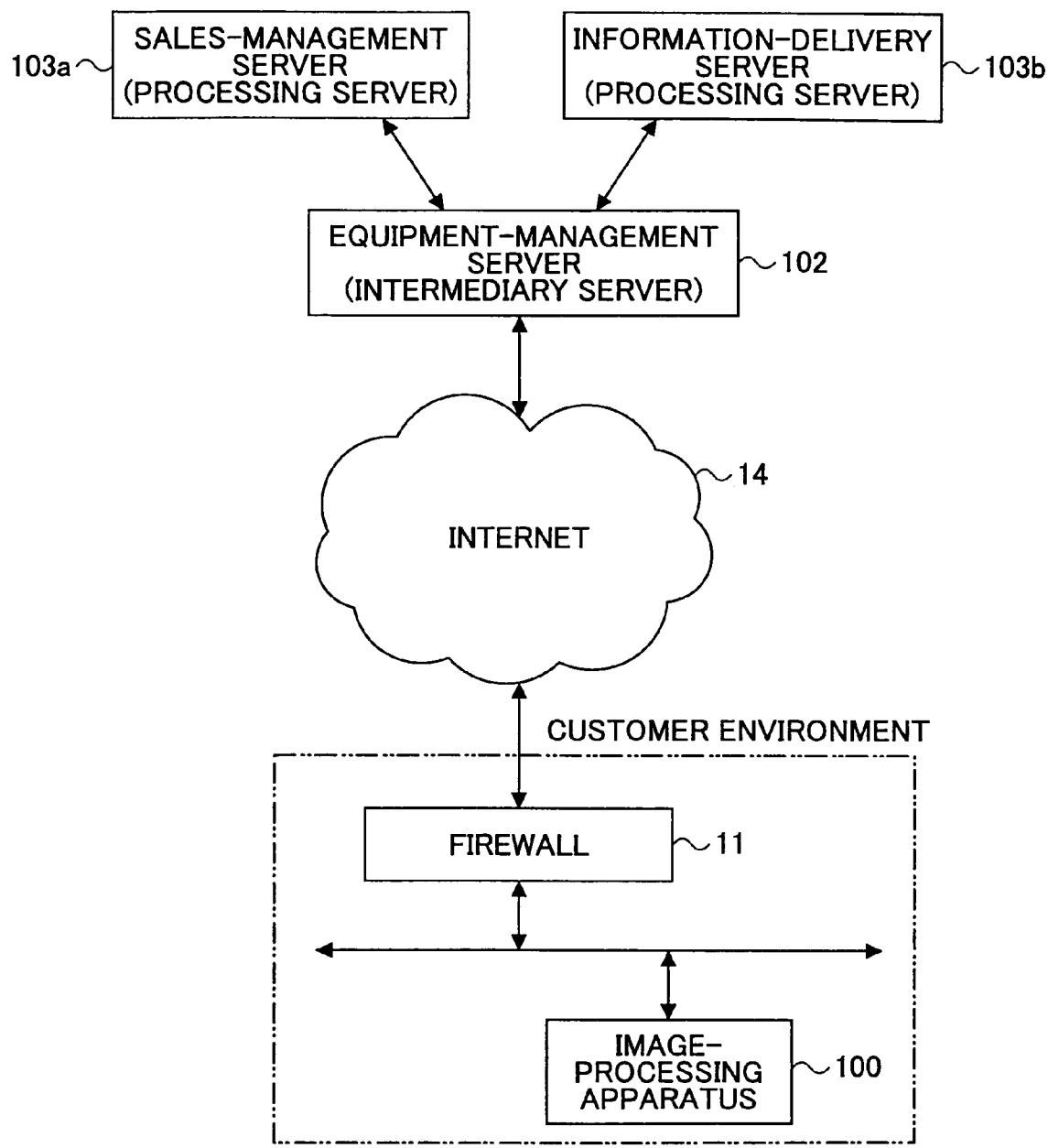

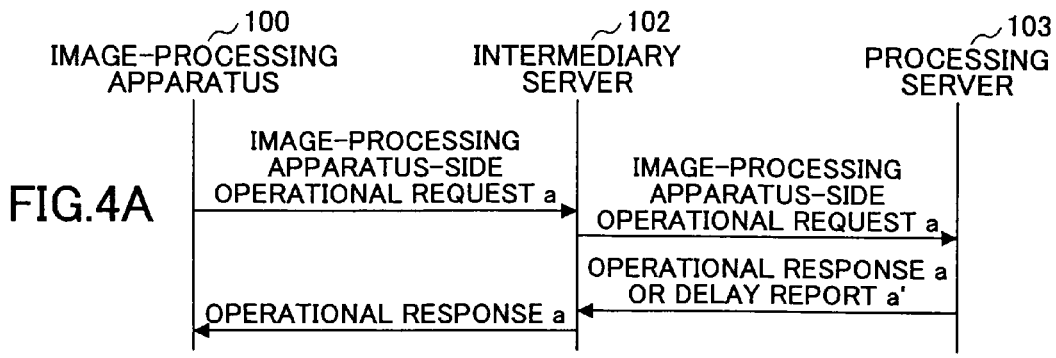
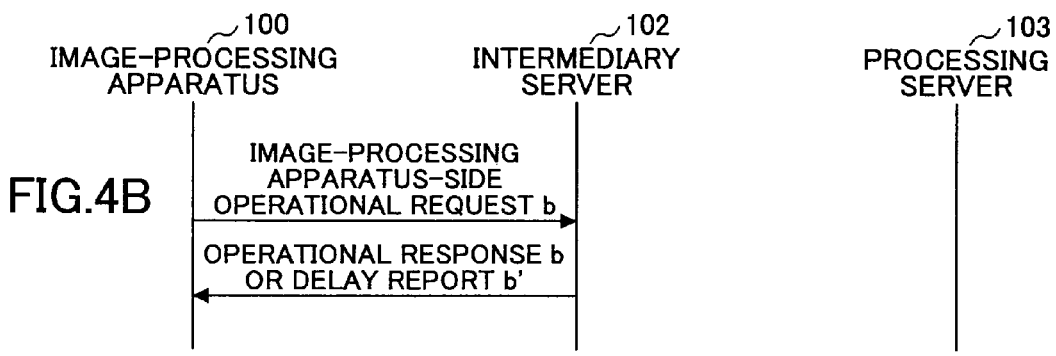
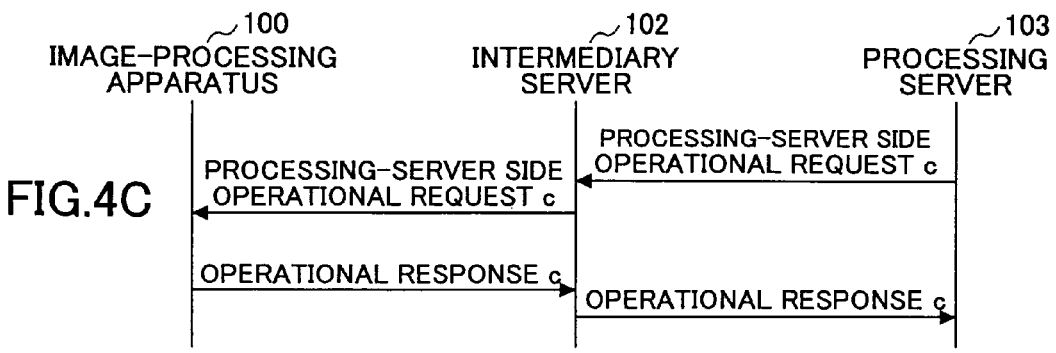
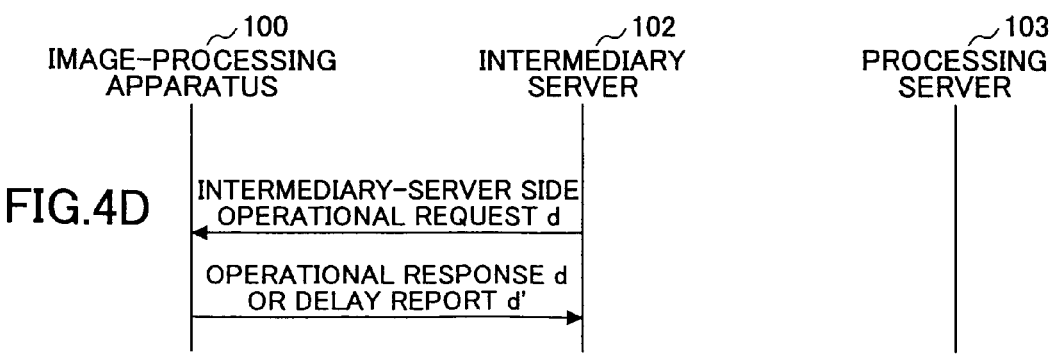

FIG.12

COMMAND ID
SOURCE INFORMATION
METHOD NAME (ERROR REPORT, ETC.)
INPUT PARAMETER (NATURE OF ERROR, ETC.)
STATE (INITIAL VALUE: UNPROCESSED)
OUTPUT PARAMETER (UNUSED UNTIL THE END OF PROCESS)
COMMAND DESTINATION

FIG.13

COMMAND ID
DESTINATION INFORMATION
METHOD NAME (COUNTER ACQUISITION, ETC.)
INPUT PARAMETER
STATE (INITIAL VALUE: UNPROCESSED)
DESTINATION OF COMMAND-EXECUTION RESULT
OUTPUT PARAMETER (UNUSED UNTIL RESPONSE ACQUISITION)

FIG.14

FORWARDING-DESTINATION INFORMATION
ENTITY-HEADER INFORMATION
XML DATA OF MESSAGE

FIG.15

ENTITY-HEADER INFORMATION
XML DATA OF MESSAGE

FIG.16

```
POST /aaa HTTP/1.1
Content-Type:multipart/mixed;boundary=MIME_boundary
Content-Length:nnnn --MIME_boundary
Content-Type:text/xml;charset=UTF-8
Content-Transfer-Encoding:8bit
SOAPAction:"SOAP Action URI"
X-SOAP-Type:Request <s:Envelope>
   <--SOAP Request-->
</s:Envelope>

--MIME_boundary
Content-Type:text/xml;charset=UTF-8
Content-Transfer-Encoding:8bit
X-SOAP-Type:Response <s:Envelope>
   <--SOAP Response-->
</s:Envelope>

--MIME_boundary
Content-Type:text/xml;charset=UTF-8
Content-Transfer-Encoding:8bit
X-SOAP-Type:Response <s:Envelope>
   <--SOAP Response-->
</s:Envelope>

--MIME_boundary
Content-Type:text/xml;charset=UTF-8
Content-Transfer-Encoding:8bit
X-SOAP-Type:Response <s:Envelope>
   <--SOAP Response-->
</s:Envelope>

--MIME_boundary--
```

First part: ENTITY HEADER, XML DATA (SOAP ENVELOPE)
Second part
Third part
Fourth part

FIG.17

```
HTTP/1.1 200 OK
Content-Type:multipart/mixed;boundary=MIME_boundary
Content-Length:nnnn --MIME_boundary
Content-Type:text/xml;charset=UTF-8    ⎤
Content-Transfer-Encoding:8bit         ⎬ ENTITY
SOAPAction:"SOAP Action URI"           ⎪ HEADER
X-SOAP-Type:Request                    ⎦

<s:Envelope>                           ⎤ XML DATA
   <--SOAP Request-->                  ⎬ (SOAP
</s:Envelope>                          ⎦ ENVELOPE)
```
(FIRST PART)

```
--MIME_boundary
Content-Type:text/xml;charset=UTF-8
Content-Transfer-Encoding:8bit
X-SOAP-Type:Response <s:Envelope>
   <--SOAP Response-->
</s:Envelope>
```
(SECOND PART)

```
--MIME_boundary
Content-Type:text/xml;charset=UTF-8
Content-Transfer-Encoding:8bit
X-SOAP-Type:Response <s:Envelope>
   <--SOAP Response-->
</s:Envelope>
```
(THIRD PART)

```
--MIME_boundary
Content-Type:text/xml;charset=UTF-8
Content-Transfer-Encoding:8bit
X-SOAP-Type:Response <s:Envelope>
   <--SOAP Response-->
</s:Envelope>

--MIME_boundary--
```
(FOURTH PART)

FIG.18

```
POST /bbb HTTP/1.1
Content-Type:multipart/mixed;boundary=MIME_boundary
Content-Length:nnnn --MIME_boundary
Content-Type:text/xml;charset=UTF-8
Content-Transfer-Encoding:8bit
SOAPAction:"SOAP Action URI"
X-SOAP-Type:Request
X-Received-From:Client_A <s:Envelope>
   <--SOAP Request-->
</s:Envelope>

--MIME_boundary
Content-Type:text/xml;charset=UTF-8
Content-Transfer-Encoding:8bit
X-SOAP-Type:Response
X-Received-From:Client_A <s:Envelope>
   <--SOAP Response-->
</s:Envelope>

--MIME_boundary
Content-Type:text/xml;charset=UTF-8
Content-Transfer-Encoding:8bit
X-SOAP-Type:Response
X-Received-From:Client_B <s:Envelope>
   <--SOAP Response-->
</s:Envelope>

--MIME_boundary
Content-Type:text/xml;charset=UTF-8
Content-Transfer-Encoding:8bit
X-SOAP-Type:Response
X-Received-From:Client_B <s:Envelope>
   <--SOAP Response-->
</s:Envelope>

--MIME_boundary--
```

Annotations:
- First part: ENTITY HEADER (SOAPAction through X-Received-From lines); XML DATA (SOAP ENVELOPE)
- Second part
- Third part
- Fourth part

FIG.19

```
HTTP/1.1 200 OK
Content-Type:multipart/mixed;boundary=MIME_boundary
Content-Length:nnnn --MIME_boundary
Content-Type:text/xml;charset=UTF-8  ⎫
Content-Transfer-Encoding:8bit       ⎪
SOAPAction:"SOAP Action URI"         ⎬ ENTITY      ⎫
X-SOAP-Type:Request                  ⎪ HEADER      ⎪
X-Send-To:Client_A                   ⎭             ⎪
                                                   ⎬ FIRST
<s:Envelope>                         ⎫ XML DATA    ⎪ PART
   <--SOAP Request-->                ⎬ (SOAP       ⎪
</s:Envelope>                        ⎭ ENVELOPE)   ⎭

--MIME_boundary
Content-Type:text/xml;charset=UTF-8                 ⎫
Content-Transfer-Encoding:8bit                      ⎪
X-SOAP-Type:Response                                ⎪
X-Send-To:Client_A                                  ⎪
                                                    ⎬ SECOND
<s:Envelope>                                        ⎪ PART
   <--SOAP Response-->                              ⎪
</s:Envelope>                                       ⎭

--MIME_boundary
Content-Type:text/xml;charset=UTF-8                 ⎫
Content-Transfer-Encoding:8bit                      ⎪
X-SOAP-Type:Response                                ⎪
X-Send-To:Client_B                                  ⎪
                                                    ⎬ THIRD
<s:Envelope>                                        ⎪ PART
   <--SOAP Response-->                              ⎪
</s:Envelope>                                       ⎭

--MIME_boundary
Content-Type:text/xml;charset=UTF-8                 ⎫
Content-Transfer-Encoding:8bit                      ⎪
X-SOAP-Type:Response                                ⎪
X-Send-To:Client_B                                  ⎪
                                                    ⎬ FOURTH
<s:Envelope>                                        ⎪ PART
   <--SOAP Response-->                              ⎪
</s:Envelope>                                       ⎭

--MIME_boundary--
```

FIG.20

```
Content-Type: text/xml; charset=UTF-8
Content-Transfer-Encoding: 8bit
X-SOAP-Type: Request
SOAPAction: "http://www.example.com/maintenance/server/errorNotification"

<s:Envelope
   xmlns:s="http://schemas.xmlsoap.org/soap/envelope/"
   xmlns:se="http://schemas.xmlsoap.org/soap/encoding/"
   xmlns:n="http://www.example.com/header"
   xmlns:ns:"http://www.example.com/maintenance/server"
   s:encodingStyle="http://schemas.xmlsoap.org/soap/encoding">

<s:Header>
      <n:REQUEST ID>12345</n:REQUEST ID>
   </s:Header>
   <s:Body>
      <ns:ERROR REPORT>
         <ERROR ID>1111</ERROR ID>
         <DESCRIPTION>HARD-DISK DRIVE ERROR</DESCRIPTION>
      </ns:ERROR REPORT>
   </s:Body>
</s:Envelope>
```

FIG.21

```
Content-Type: text/xml; charset=UTF-8
Content-Transfer-Encoding: 8bit
X-SOAP-Type: Response <s:Envelope
   xmlns:s="http://schemas.xmlsoap.org/soap/envelope/"
   xmlns:se="http://schemas.xmlsoap.org/soap/encoding/"
   xmlns:n="http://www.example.com/header"
   xmlns:ns:"http://www.example.com/maintenance/server"
   s:encodingStyle="http://schemas.xmlsoap.org/soap/encoding">

<s:Header>
      <n:REQUEST ID>12345</n:REQUEST ID>
   </s:Header>
   <s:Body>
      <ns:ERROR REPORT Response>
         <RECEIVED RESULT>OK</RECEIVED RESULT>
      </ns:ERROR REPORT Response>
   </s:Body>
</s:Envelope>
```

FIG.22

```
Content-Type: text/xml; charset=UTF-8
Content-Transfer-Encoding: 8bit
X-SOAP-Type: Request
SOAPAction: "http://www.example.com/sales/server/orderPaper"

<s:Envelope
  xmlns:s="http://schemas.xmlsoap.org/soap/envelope/"
  xmlns:se="http://schemas.xmlsoap.org/soap/encoding/"
  xmlns:n="http://www.example.com/header"
  xmlns:ns="http://www.example.com/sales/server"
  s:encodingStyle="http://schemas.xmlsoap.org/soap/encoding">

<s:Header>
    <n:REQUEST ID>12346</n:REQUEST ID>
  </s:Header>
  <s:Body>
    <ns:ORDER PAPER>
      <PRODUCT NAME>100 A4 COPY-PAPER SHEETS</PRODUCT NAME>
      <QUANTITY>5</QUANTITY>
    </ns:ORDER PAPER>
  </s:Body>
</s:Envelope>
```

FIG.23

```
Content-Type: text/xml; charset=UTF-8
Content-Transfer-Encoding: 8bit
X-SOAP-Type: Request
SOAPAction: "http://www.example.com/sales/server/orderPaper"
X-Received-From:Client_A
```

```
            IMAGE-PROCESSING APPARATUS →
     SAME ENVELOPE AS IN THE CASE OF INTERMEDIARY SERVER
```

FIG.24

```
Content-Type: text/xml; charset=UTF-8
Content-Transfer-Encoding: 8bit
X-SOAP-Type: Response
X-Send-To: Client_A <s:Envelope
  xmlns:s="http://schemas.xmlsoap.org/soap/envelope/"
  xmlns:se="http://schemas.xmlsoap.org/soap/encoding/"
  xmlns:r="http://www.example.com/header"
  xmlns:ns:"http://www.example.com/sales/server"
  s:encodingStyle="http://schemas.xmlsoap.org/soap/encoding">

<s:Header>
    <n:REQUEST ID>12346</n:REQUEST ID>
  </s:Header>
  <s:Body>
    <ns:ORDER PAPER Response>
      <ORDER RESULT>OK</ORDER RESULT>
      <CHARGES>1000</CHARGES>
    </ns:ORDER PAPER Response>
  </s:Body>
</s:Envelope>
```

FIG.25

```
Content-Type: text/xml; charset=UTF-8
Content-Transfer-Encoding: 8bit
X-SOAP-Type: Response

PROCESSING SERVER →
  SAME ENVELOPE AS IN THE CASE OF INTERMEDIARY SERVER
```

FIG.26

```
Content-Type: text/xml; charset=UTF-8
Content-Transfer-Encoding: 8bit
X-SOAP-Type: Request
SOAPAction: "http://www.example.com/maintenance/client/getTemperature"

<s:Envelope
  xmlns:s="http://schemas.xmlsoap.org/soap/envelope/"
  xmlns:se="http://schemas.xmlsoap.org/soap/encoding/"
  xmlns:n="http://www.example.com/header"
  xmlns:nc:"http://www.example.com/maintenance/client"
  s:encodingStyle="http://schemas.xmlsoap.org/soap/encoding">

<s:Header>
    <n:REQUEST ID>98765</n:REQUEST ID>
  </s:Header>
  <s:Body>
    <nc:TEMPERATURE-SENSOR VALUE ACQUISITION>
      <SENSOR ID>3</SENSOR ID>
    </nc:TEMPERATURE-SENSOR VALUE ACQUISITION>
  </s:Body>
</s:Envelope>
```

FIG.27

```
Content-Type: text/xml; charset=UTF-8
Content-Transfer-Encoding: 8bit
X-SOAP-Type: Response <s:Envelope
  xmlns:s="http://schemas.xmlsoap.org/soap/envelope/"
  xmlns:se="http://schemas.xmlsoap.org/soap/encoding/"
  xmlns:n="http://www.example.com/header"
  xmlns:nc:"http://www.example.com/maintenance/client"
  s:encodingStyle="http://schemas.xmlsoap.org/soap/encoding">

<s:Header>
    <n:REQUEST ID>98765</n:REQUEST ID>
  </s:Header>
  <s:Body>
    <nc:TEMPERATURE-SENSOR VALUE ACQUISITION>
      <TEMPERATURE>52</TEMPERATURE>
    </nc:TEMPERATURE-SENSOR VALUE ACQUISITION Response>
  </s:Body>
</s:Envelope>
```

FIG.28

```
Content-Type: text/xml; charset=UTF-8
Content-Transfer-Encoding: 8bit
X-SOAP-Type: Request
SOAPAction: "http://www.example.com/sales/client/notifyNewItem"
X-Send-To: Client_A <s:Envelope
   xmlns:s="http://schemas.xmlsoap.org/soap/envelope/"
   xmlns:se="http://schemas.xmlsoap.org/soap/encoding/"
   xmlns:n="http://www.example.com/header"
   xmlns:nc:"http://www.example.com/sales/client"
   s:encodingStyle="http://schemas.xmlsoap.org/soap/encoding">

<s:Header>
   <n:REQUEST ID>77777</n:REQUEST ID>
</s:Header>
<s:Body>
   <nc:NEW PRODUCT INFORMATION REPORT>
      <PRODUCT NAME>100 HIGH-GRADE PRINTER-PAPER SHEETS</PRODUCT NAME>
      <UNIT PRICE>1000</UNIT PRICE>
   </nc:NEW PRODUCT INFORMATION REPORT>
</s:Body>
</s:Envelope>
```

FIG.29

```
Content-Type: text/xml; charset=UTF-8
Content-Transfer-Encoding: 8bit
X-SOAP-Type: Request
SOAPAction: "http://www.example.com/sales/client/notifyNewItem"
```

```
              PROCESSING SERVER →
THE SAME ENVELOPE AS IN THE CASE OF INTERMEDIARY SERVER
```

FIG.30

```
Content-Type: text/xml; charset=UTF-8
Content-Transfer-Encoding: 8bit
X-SOAP-Type: Response <s:Envelope
   xmlns:s="http://schemas.xmlsoap.org/soap/envelope/"
   xmlns:se="http://schemas.xmlsoap.org/soap/encoding/"
   xmlns:n="http://www.example.com/header"
   xmlns:nc:"http://www.example.com/sales/client"
   s:encodingStyle="http://schemas.xmlsoap.org/soap/encoding">

<s:Header>
     <n:REQUEST ID>77777</n:REQUEST ID>
   </s:Header>
   <s:Body>
     <nc:NEW PRODUCT INFORMATION REPORT Response>
       <RECEIIVED RESULT>OK</RECEIVED RESULT>
     </nc:NEW PRODUCT INFORMATION REPORT Response>
   </s:Body>
</s:Envelope>
```

FIG.31

```
Content-Type: text/xml; charset=UTF-8
Content-Transfer-Encoding: 8bit
X-SOAP-Type: Response
X-Received-From: Client_A IMAGE-PROCESSING APPARATUS →
   THE SAME ENVELOPE AS IN THE CASE OF INTERMEDIARY SERVER
```

FIG.34

| NAME SPACE URI | FORWARDING-DESTINATION INFORMATION (IP ADDRESS, HOST NAME, ETC.) |
|---|---|
| http://www.example.com/maintenance/server | EQUIPMENT-MANAGEMENT SERVER (INTERMEDIARY SERVER 102, ITSELF) |
| http://www.example.com/maintenance/client | EQUIPMENT-MANAGEMENT SERVER (INTERMEDIARY SERVER 102, ITSELF) |
| http://www.example.com/sales/server | SALES-MANAGEMENT SERVER (PROCESSING SERVER 103a) |
| http://www.example.com/sales/client | SALES-MANAGEMENT SERVER (PROCESSING SERVER 103a) |
| http://www.example.com/delivery/server | INFORMATION-DELIVERY SERVER (PROCESSING SERVER 103b) |
| http://www.example.com/delivery/client | INFORMATION-DELIVERY SERVER (PROCESSING SERVER 103b) |

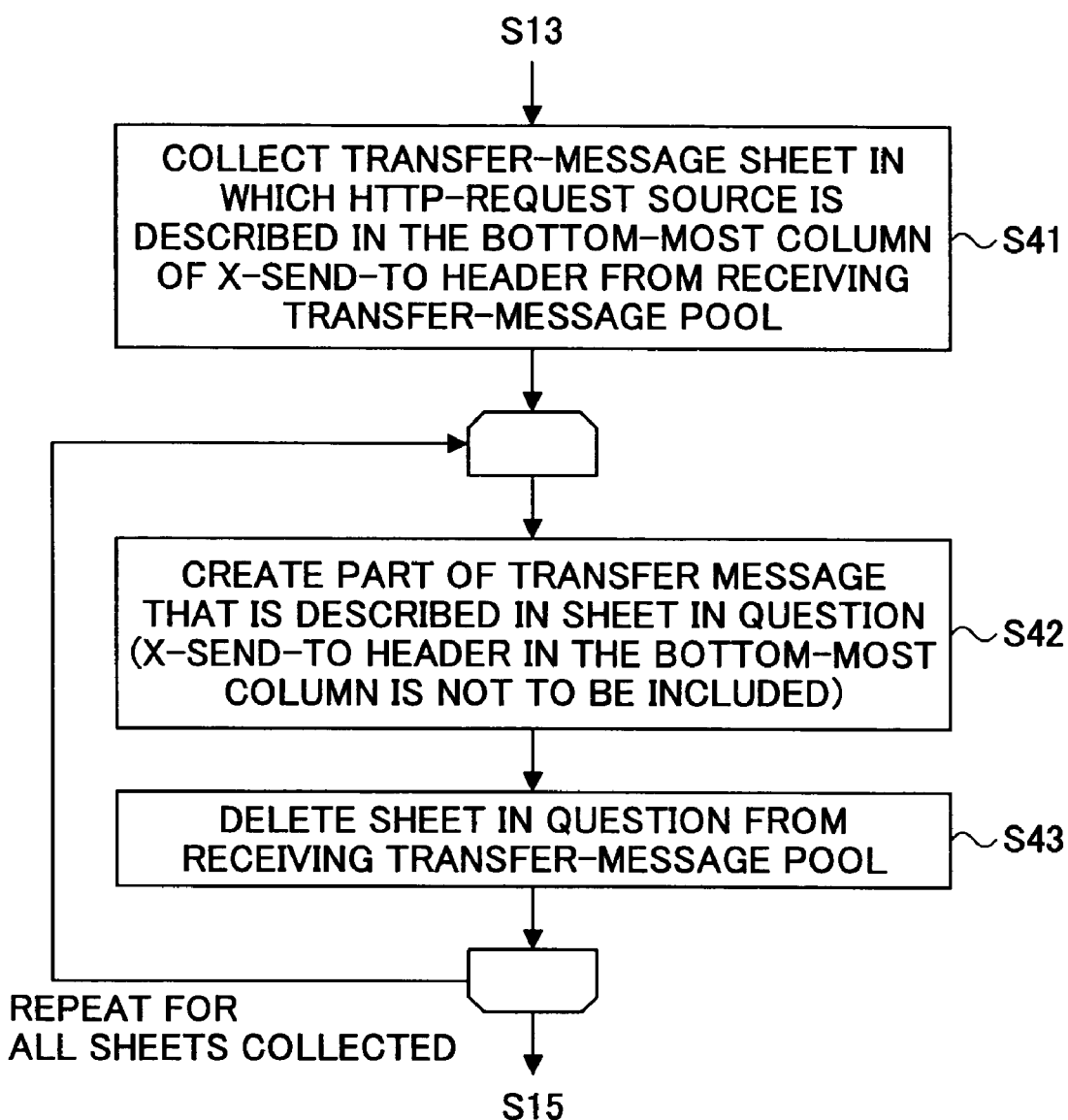

FIG.43

```
COMMAND ID
METHOD NAME (ERROR REPORT,ETC.)
INPUT PARAMETER (NATURE OF ERROR, ETC.)
STATE (INITIAL VALUE: UNPROCESSED)
DESTINATION OF COMMAND-EXECUTION RESULT
OUTPUT PARAMETER (UNUSED UNTIL RESPONSE ACQUISITION)
```

FIG.44

```
COMMAND ID
METHOD NAME (COUNTER ACQUISITION, ETC.)
INPUT PARAMETER
STATE (INITIAL VALUE: UNPROCESSED)
OUTPUT PARAMETER (UNUSED UNTIL THE END OF PROCESS)
DESTINATION OF COMMAND
```

FIG.49

| TERMINAL APPARATUS ID | ROUTE INFORMATION |
|---|---|
| IMAGE-PROCESSING APPARATUS A | ⇔INTERMEDIARY SERVER 102 |
| IMAGE-PROCESSING APPARATUS B | ⇔INTERMEDIARY SERVER 102 |
| IMAGE-PROCESSING APPARATUS C | UNKNOWN |
| IMAGE-PROCESSING APPARATUS D | UNKNOWN |

FIG.58

| TERMINAL APPARATUS ID | ROUTE INFORMATION |
|---|---|
| TERMINAL APPARATUS A | ⇔INTERMEDIARY SERVER F⇔INTERMEDIARY SERVER G |
| TERMINAL APPARATUS B | ⇔INTERMEDIARY SERVER H |
| TERMINAL APPARATUS C | UNKNOWN |
| TERMINAL APPARATUS D | UNKNOWN |

FIG.59

| NAME-SPACE URI | FORWARDING-DESTINATION INFORMATION (IP ADDRESS, HOST NAME, ETC.) |
|---|---|
| http://www.example.com/maintenance/server | EQUIPMENT-MANAGEMENT SERVER (INTERMEDIARY SERVER 102, ITSELF) |
| http://www.example.com/maintenance/client | EQUIPMENT-MANAGEMENT SERVER (INTERMEDIARY SERVER 102, ITSELF) |
| http://www.example.com/sales/server | SALES-MANAGEMENT SERVER (PROCESSING SERVER 103a) |
| http://www.example.com/sales/client | SALES-MANAGEMENT SERVER (PROCESSING SERVER 103a) |
| http://www.example.com/delivery/server | INFORMATION-DELIVERY SERVER (SERVER 103b) |
| http://www.example.com/delivery/client | INFORMATION-DELIVERY SERVER (SERVER 103b) |
| default | OVERALL-MANAGEMENT SERVER (PROCESSING SERVER 103c) |

FIG.61

| NAME-SPACE URI | FORWARDING-DESTINATION INFORMATION (IP ADDRESS, HOST NAME, ETC.) |
|---|---|
| http://www.example.com/maintenance/server | INTERMEDIARY SERVER B (ITSELF) |
| http://www.example.com/maintenance/client | INTERMEDIARY SERVER B (ITSELF) |
| default | INTERMEDIARY ITSELF SERVER C (NEXT INTERMEDIARY SERVER) |

| SETTING NAME | SETTING VALUE |
|---|---|
| NAME-SPACE URI TO WHICH METHOD FOR OWN PROCESSING BELONGS TO | http://www.example.com/maintenance/server<br>http://www.example.com/maintenance/client |
| FORWARDING-DESTINATION SERVER ID | INTERMEDIARY SERVER C (NEXT INTERMEDIARY SERVER) |

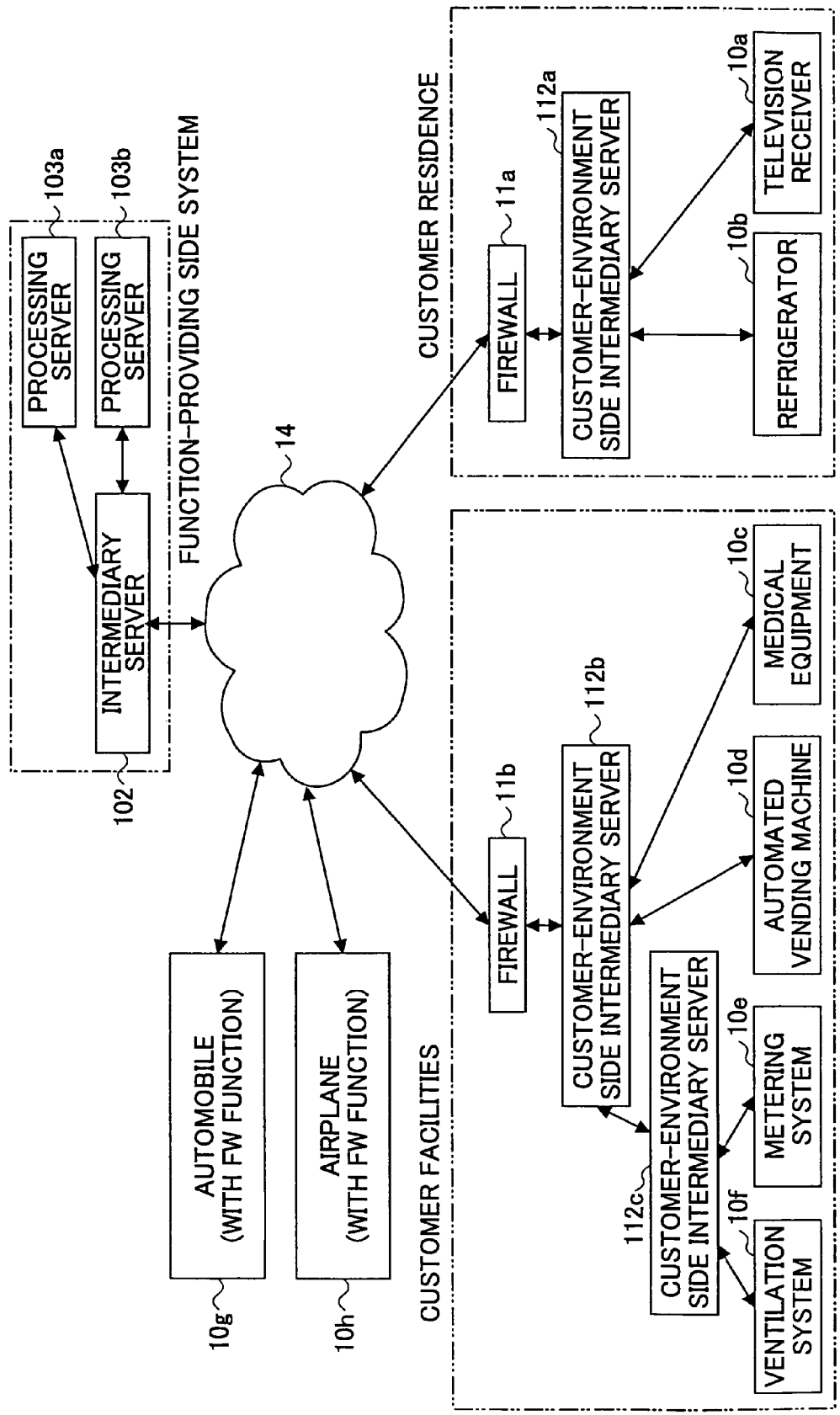

INTERMEDIARY APPARATUS, DISTRIBUTED PROCESSING SYSTEM, DATA-TRANSFER METHOD, PROGRAM AND RECORDING MEDIUM

TECHNICAL FIELD

The present invention generally relates to a technology for data communications, and more particularly to an intermediary apparatus for intermediating communications between a first communications apparatus and a plurality of second communications apparatuses, a distributed-processing system comprising a terminal apparatus and a plurality of processing servers, a data-transfer method for transmitting and receiving an operational request and an operational response between the first communications apparatus and the second communications apparatuses via the intermediary apparatus as described above, a program for making a computer to function as the intermediary apparatus as described above and a computer-readable recording medium in which such program is recorded.

BACKGROUND ART

In a communications system in which communications apparatuses are connected via a network, setting to mutually exchange messages between the communications apparatuses so as to have a report or a request made to a destination apparatus has been performed up to now. Then, in such system, transmitting a command as an operational request from a certain apparatus to another apparatus so as to have an operation performed and to have an execution result of the operation sent back from the transmission destination as an operational response has also been performed.

Such a technique is disclosed, for example in Patent Document 1 in which a remote processor transmits to a local processor a message instructing a command to be executed and receives a response to the command.

Moreover, in this document, a technique is also disclosed that provides for transmitting a command from the outside to inside of the firewall by providing for transmitting a communications request to a remote processor outside the firewall and having the remote processor transmit to a local processor a command as a response to this communications request when the local processor is placed inside the firewall.

Patent Document 1

JP2001-273211A

Moreover, a technique regarding such operational request can also be applied to a system which remotely controls an operation of an apparatus connected to a communications apparatus. In Patent Document 2 is described an example in which such technique is applied to a remote-control system in which a command is transmitted from a remote-control apparatus having a function of accepting user operations for an apparatus to be remotely controlled that has a function of operating blinds and lighting so as to operate the blinds and the lighting. However, in this document, the fact that a response to the command is transmitted is not shown.

Patent Document 2

JP2002-135858A

Now, when trying to use a certain service which is provided in response to a command, it is possible that apparatuses which provide the service differ depending on the command. Then, with a system in which a command is transmitted with a destination being specified as in the conventional technique, in such a case a service cannot be used unless an appropriate destination is grasped per command and the command is transmitted for that apparatus. Therefore, there is a problem that the management burden of destination information is large.

Moreover, while there may also be a case of a service provider changing or a system configuration changing such that a necessity arises for changing the destination of the command, failing to report the change of the destination per each terminal apparatus results in not being able to use the service. Therefore, there is a problem that not correctly managing destination information results in hampering the use of the service.

The present invention aims to resolve such problems and to reduce the burden of managing the destination information as well as to make it possible to configure a communications system which allows for stable operations even when the system configuration is changed when a certain communications apparatus transmits to multiple communications apparatuses an operational request and receives an operational response to that operational request.

DISCLOSURE OF THE INVENTION

Accordingly, it is a general object of the present invention to provide a technology for data communications that substantially obviates one or more problems caused by the limitations and disadvantages of the related art.

It is a more particular object of the present invention to provide an intermediary apparatus for intermediating communications between a first communications apparatus and a plurality of second communications apparatuses, a distributed-processing system comprising a terminal apparatus and a plurality of processing servers, a data-transfer method for transmitting and receiving an operational request and an operational response between the first communications apparatus and the second communications apparatuses via the intermediary apparatus as described above, a program for causing a computer to function as the intermediary apparatus as described above and a computer-readable recording medium in which such program is recorded.

According to an aspect of the invention, an intermediary apparatus which intermediates communications between a first communications apparatus and multiple second communications apparatuses includes first receiving means for receiving at least one operational request from the first communications apparatus, first transmitting means for transmitting to a second communications apparatus to be a forwarding destination for each operational request received by the receiving means according to the type of the operational request, second receiving means for receiving from each second communications apparatus an operational response to the operational request transferred from the first communications apparatus, and second transmitting means for transmitting to the first communications apparatus each operational response received by the second receiving means.

According to another aspect of the invention, a distributed-processing system includes at least a processing server; and an intermediary server for intermediating communications between the processing server and a terminal apparatus, wherein the intermediary server is provided with first receiving means for receiving from the terminal apparatus at least an operational request; first transmitting means for transmitting to the processing server to be a forwarding destination the operational request received by the receiving means according to a type of the operational request; second receiving means for receiving from the processing server at least an operational response to the operational request from the terminal apparatus; and second transmitting means for transmitting to the terminal apparatus the operational response received by the second receiving means; and wherein the processing server is provided with receiving means for receiving from the intermediary server the operational request from the terminal apparatus to the processing server; means for executing an operation related to the operational request received by the receiving means and generating as the executing result the operational response to the operational request; and transmitting means for transmitting to the intermediary server the operational response generated by the generating means.

According to yet another aspect of the invention, a data-transfer method of causing at least an operational request and an operational response to be transmitted and received between a first communications apparatus and a plurality of second communications apparatuses via an intermediary apparatus, wherein the method causes the intermediary apparatus to execute: a first receiving procedure for receiving from the first communications apparatus the operational request; a first transmitting procedure for transmitting to a second communications apparatus to be a forwarding destination for the operational request received by the receiving procedure according to a type of the operational request; a second receiving procedure for receiving from one of the second communications apparatuses as at least an operational response to the operational request transferred from the first communications apparatus; and a second transmitting procedure for transmitting to the first communications apparatus the operational response received by the second receiving procedure.

According to yet another aspect of the invention, a program for causing a computer to function as an intermediary apparatus for intermediating communications between a first communications apparatus and a plurality of second communications apparatuses, wherein the program causes the computer to function as: first receiving means for receiving from the first communications apparatus at least an operational request; first transmitting means for transmitting to one of the second communications apparatuses to be a forwarding destination for the operational request received by the first receiving means according to a type of the operational request; second receiving means for receiving from the one of the second communications apparatus as at least an operational response to the operational request transferred from the first communications apparatus; and second transmitting means for transmitting to the first communications apparatus the operational response received by the second receiving procedure.

BRIEF DESCRIPTION OF THE DRAWINGS

Other objects, features, and advantages of the present invention will become more apparent from the following detailed description when read in conjunction with the accompanying drawings, in which:

FIG. 3 is a block diagram illustrating a configuration of a remote-control system being a further example of the distributed-processing system illustrated in FIG. 1;

FIG. 4A is a diagram illustrating a relationship between an operational request and an operational response in the remote-control system illustrated in FIG. 3;

FIG. 4B is another diagram illustrating a relationship between an operational request and an operational response in the remote-control system illustrated in FIG. 3;

FIG. 4C is yet another diagram illustrating a relationship between an operational request and an operational response in the remote-control system illustrated in FIG. 3;

FIG. 4D is yet another diagram illustrating a relationship between an operational request and an operational response in the remote-control system illustrated in FIG. 3;

FIG. 12 is a diagram illustrating an example data structure in a terminal-apparatus command-sheet of the intermediary server illustrated in FIG. 3;

FIG. 13 is a diagram illustrating an example data structure in an intermediary-server command-sheet of the intermediary server illustrated in FIG. 3;

FIG. 14 is a diagram illustrating an example data structure in a transfer-message sheet in a transmitting transfer-message pool of the intermediary server illustrated in FIG. 3;

FIG. 15 is a diagram illustrating an example data structure in a transfer-message sheet in a receiving transfer-message pool of the intermediary server illustrated in FIG. 3;

FIG. 16 is a diagram illustrating an example HTTP request which the intermediary server illustrated in FIG. 3 receives from the image-processing apparatus;

FIG. 17 is a diagram illustrating an example HTTP response that the intermediary server illustrated in FIG. 3 transmits to the image-processing apparatus;

FIG. 18 is a diagram illustrating an example HTTP request that the intermediary server illustrated in FIG. 3 transmits to the processing server;

FIG. 19 is a diagram illustrating an example HTTP response that the intermediary server illustrated in FIG. 3 receives from the processing server;

FIG. 20 is a diagram illustrating an example part describing a terminal-apparatus command to the intermediary server in the remote-control system illustrated in FIG. 3;

FIG. 21 is a diagram illustrating an example part describing a response to the terminal-apparatus command illustrated in FIG. 20 in the remote-control system illustrated in FIG. 3;

FIG. 22 is a diagram illustrating an example description of a part for transferring from the image-processing apparatus to the intermediary server a terminal-apparatus command for a processor server (a sales-management server) in the remote-control system illustrated in FIG. 3;

FIG. 23 is a diagram illustrating an example description of a part for transferring from the intermediary server to the processor server a terminal-apparatus command illustrated in FIG. 22 in the remote-control system illustrated in FIG. 3;

FIG. 24 is a diagram illustrating an example description of a part for transferring from the processing server to the intermediary server a response to the terminal-apparatus command illustrated in FIG. 22 in the remote-control system illustrated in FIG. 3;

FIG. 25 is a diagram illustrating an example description of a part for transferring from the intermediary server to the image-processing apparatus a command response illustrated in FIG. 24 in the remote-control system illustrated in FIG. 3;

FIG. 26 is a diagram illustrating an example description of a part describing an intermediary-server command to the image-processing apparatus in the remote-control system illustrated in FIG. 3;

FIG. 27 is a diagram illustrating an example description of a part describing a response to the intermediary-server command illustrated in FIG. 26 in the remote-control system illustrated in FIG. 3;

FIG. 28 is a diagram illustrating an example description of a part for transferring from the processing server to the intermediary server a processing-server command for the image-processing apparatus in the remote-control system illustrated in FIG. 3;

FIG. 29 is a diagram illustrating an example description of a part for transferring from the intermediary server to the image-processing apparatus the processing-server command illustrated in FIG. 28 in the remote-control system illustrated in FIG. 3;

FIG. 30 is a diagram for illustrating an example description of a part for transferring from the image-processing apparatus to the intermediary server a response to the processing-server command illustrated in FIG. 28 in the remote-control system illustrated in FIG. 3;

FIG. 31 is an example description of a part for transferring from the intermediary server to the processing server (a sales-management server) the command response illustrated in FIG. 30 in the remote-control system illustrated in FIG. 3;

FIG. 34 is a diagram illustrating an example forwarding-destination table which the intermediary server illustrated in FIG. 3 stores;

FIG. 35 is a flowchart illustrating in more detail a transfer-message collection process illustrated in step S14 of FIG. 32;

FIG. 43 is an example data structure in a terminal-apparatus command-sheet of the image-processing apparatus illustrated in FIG. 3;

FIG. 44 is an example data structure in a server-side command-sheet of the image-processing apparatus illustrated in FIG. 3;

FIG. 49 is a diagram illustrating an example route-information table which the processing server illustrated in FIG. 3 stores;

FIG. 58 is a diagram illustrating a storage example of a route-information table in a processing server J illustrated in FIG. 57;

FIG. 59 is a diagram illustrating another example of the forwarding-destination table illustrated in FIG. 34;

FIG. 61 is a diagram illustrating yet another example of the forwarding-destination table;

FIG. 65 is a diagram illustrating yet another example configuration of the distributed-processing system of an embodiment of the invention.

BEST MODE FOR CARRYING OUT THE INVENTION

Figure 1:
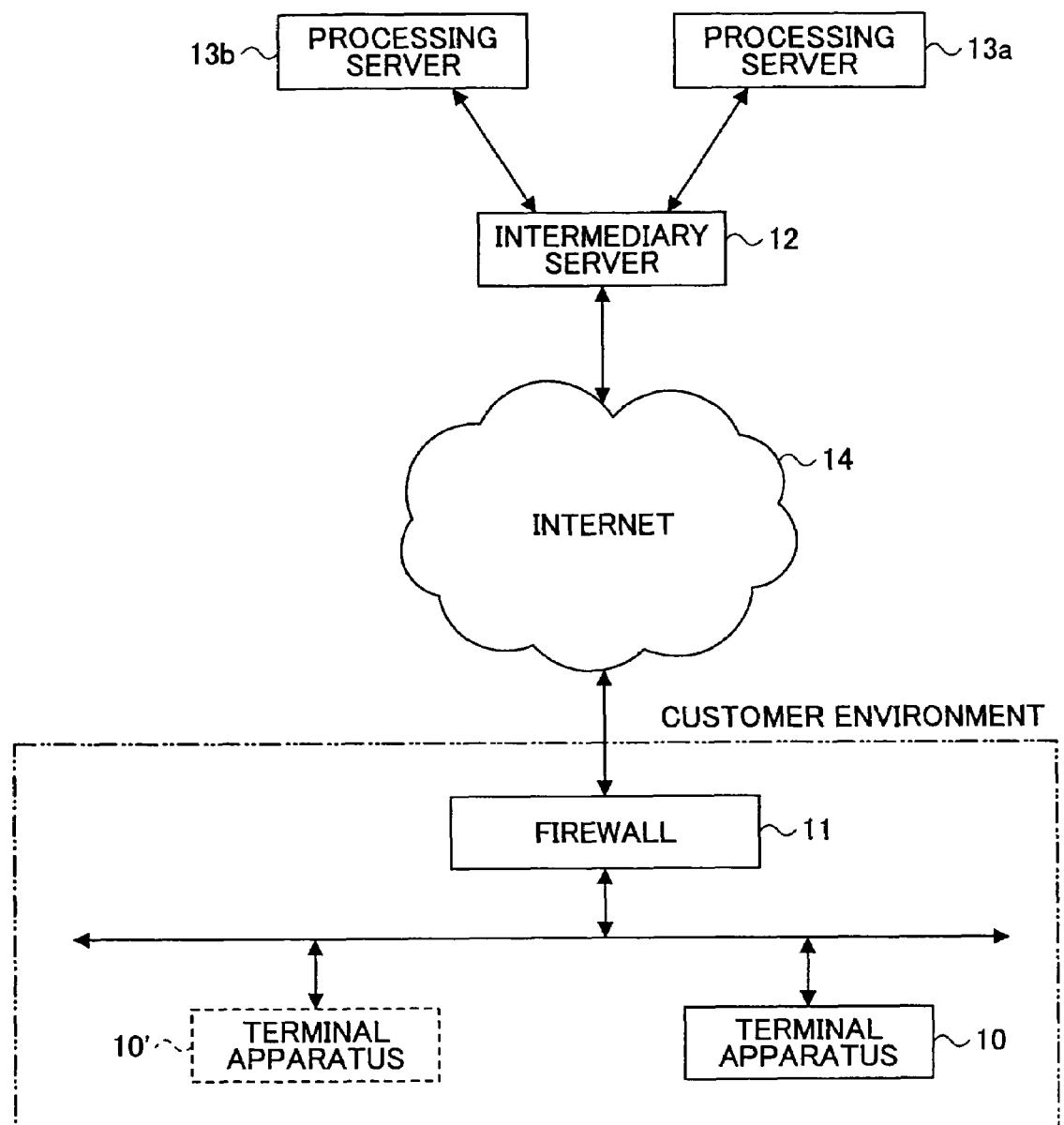
FIG. 1 is a block diagram illustrating a configuration of an embodiment of an intermediary server being an intermediary apparatus of the invention and a distributed-processing system being a communications system configured using the intermediary server.

First, an embodiment is described of an intermediary server being an intermediary apparatus of the invention and a distributed-processing system being a communications system configured to use the intermediary server. FIG. 1 is a block diagram illustrating a configuration of the distributed-processing system.

As illustrated in FIG. 1, this distributed-processing system comprises a terminal apparatus 10 being a first communications apparatus, a plurality of processing servers 13 being second communications apparatuses and an intermediary server 12 intermediating communications between the first and second communications apparatuses. Then, within the distributed-processing system, a terminal apparatus 10 is placed in a customer (user-side) installation environment so that the terminal apparatuses and the intermediary server 12 are configured to be in communication via the Internet 14. Moreover, a system is configured in which, when using at the terminal apparatus 10 functions which a processing server 13 provides, only by transmitting from the terminal apparatus 10 a request to the intermediary server 12, the intermediary server 12 transfers the request to an appropriate processing server 13 and the terminal apparatus 10 is able to use the functions which the processing server 13 provides.

It is noted that the terms "intermediary server" and "processing server" used herein for ease of understanding the system are not intended to restrict these apparatuses to an apparatus functioning as a "server" on a network.

Moreover, as the terminal apparatus 10, while the use of a known PC (Personal Computer) having a communications function is possible, use of various electronic apparatuses having a the communications function is possible, for example, an image-processing apparatus such as a printer, a facsimile apparatus, a digital copier, a scanner apparatus, a digital multi-functional machine, a networked consumer-electronic appliance, an automated vending machine, a medical device, a power-supply apparatus, a ventilation system, a metering system for such gas, water and electricity, an automobile and an airplane.

Moreover, as for the terminal apparatus 10, as illustrated with broken lines, it can be provided in multiple numbers and different types of terminal apparatuses can be set to co-reside.

Furthermore, while the terminal apparatus 10 in each customer environment is connected to a LAN (Local Area Network), the LAN is connected to the Internet 14 via a firewall 11 in view of security considerations.

Now, as the firewall 11 is normally set up to block a communications request from the outside, the intermediary server 12 is not able to transmit information to the terminal apparatus 10 inside the firewall 11 only by transmitting a communications request such as a HTTP (Hyper Text Transfer Protocol) request. Therefore, in order for the intermediary server 12 and the terminal apparatus 10 to exchange information a special protocol needs to be adopted.

Moreover, as for the processing servers 13, while only two units connected to the intermediary server 12 are shown herein, they may be placed in an arrangement forming various hierarchical structures or the arrangement may be changed during system operation. Even in this way, as a forwarding destination of a command is managed in the intermediary server 12 as described below, changing forwarding-destination management data makes it possible to easily deal with a change in the system configuration.

Furthermore, while connections between the processing servers 13 and the intermediate server 12 are illustrated as lines different from the connection with the Internet 14, it is of course possible to configure the connections such that the servers as described above can communicate via the Internet 14.

Moreover, in such a distributed-processing system, the processing server 13 is implemented with application programs for performing an operation in response to an operational request from the terminal apparatus 10 and transmitting an operational request to the terminal apparatus 10. The intermediary server 12 is implemented with application programs for intermediating an operational request between the terminal apparatus 10 and each processing server 13 and transmission/reception of an operational response to the operational request. Furthermore, the intermediary server 12 is also implemented with application programs for implementing functions as a processing server. Then, each of these nodes in the distributed-processing system including the terminal apparatus 10 is provided for transmitting "an operational request" for a process to a method of the applications programs mutually implemented and acquiring "an operational response" being a result of the requested process with a RPC (remote procedure call).

It is noted herein that a method is to be defined as a logical function specifying input and output formats. Then in this case, the operational request becomes a procedure call for calling the function as described above and the operational response becomes an execution result of the function called by the function call. Also contained in the operational request is a report without an execution result which is meaningful.

FIGS. 2A through 2D illustrates the relationship between these operational requests and operational responses. It is noted that the firewall 11 does not exist is not taken into account in these figures.

Figure 2A:
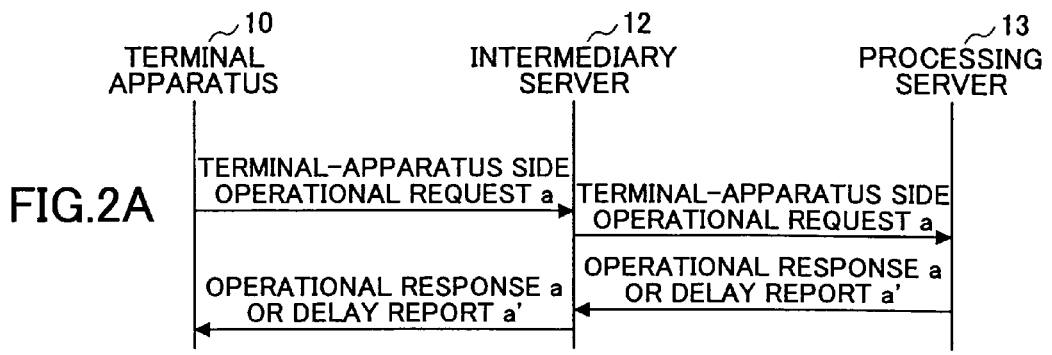
FIG. 2A is a diagram illustrating a relationship between an operational request and an operational response in the distributed-processing system illustrated in FIG. 1.

FIG. 2A is a case in which an operational request to a processing server 13 takes place at a terminal apparatus 10. In this case, the model is such that the terminal apparatus 10 generates a terminal apparatus-side operational request a and the processing server 13 which received this via an intermediary server 12 returns an operational response a to this operational request.

Now, as described below, at the terminal-apparatus 10 side, with no need to grasp which processing server 13 the operational request is eventually transferred to, merely transmitting the operational request to the intermediary server 12 provides for the intermediary server 12 to transfer the operational request to an appropriate processing server 13 and to receive the operational response from the processing server 13 for returning to the terminal apparatus 10. Moreover, a case may also be envisaged in which the terminal apparatus-side operational request a is sequentially intermediated by multiple intermediary servers 12 so as to arrive at the processing server 13.

Moreover, in FIG. 2A, a case of returning not only the response a but also a delay report a' is shown. This is due to the fact that, when the processing server 13 receives from a connecting intermediary server 12 the terminal apparatus-side operational request a and determines that it is not able to return, while connecting with the intermediary server as described above, a response to the operational request, it reports the fact that a response is going to be delayed and disconnects the connection state for a time and passes over again a response to the operational request as described above at the time of a subsequent connection.

Figure 2B:
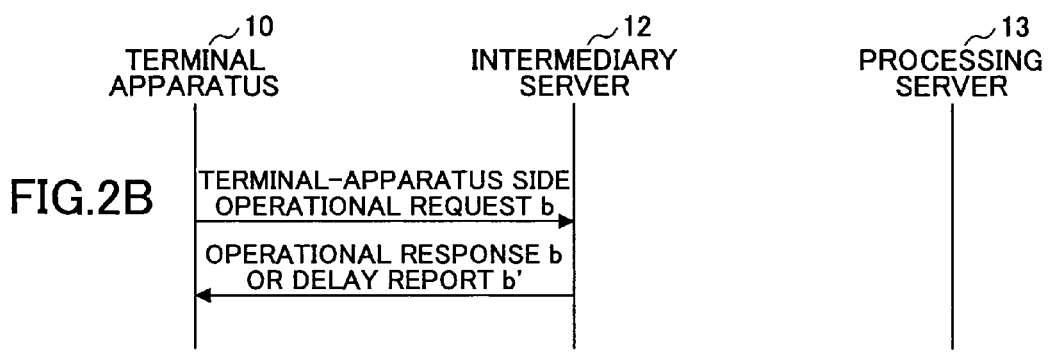
FIG. 2B is another diagram illustrating a relationship between an operational request and an operational response in the distributed-processing system illustrated in FIG. 1.

FIG. 2B is for a case in which an operational request to the intermediary server 12 is generated at the terminal apparatus 10. In this case, the model is such that the terminal apparatus 10, for example, generates a terminal apparatus-side operational request b and the intermediary server 12 which received this returns the operational request b to the operational request. It is noted that, even in this case, at the terminal-apparatus 10 side there is no need to handle it differently from the case in FIG. 2A. Then, as in the case in FIG. 2A, transmitting an operational request to the intermediary server 12 provides for the intermediary server 12 side to determine an operational request to be executed by itself and, when recognizing that it is to be executed by itself, to execute an operation in the operational request in lieu of a transfer to the processing server 13.

Moreover, even in the case in FIG. 2B, returning a delay report b' when a response cannot be returned promptly is the same as in the case in FIG. 2A.

Figure 2C:
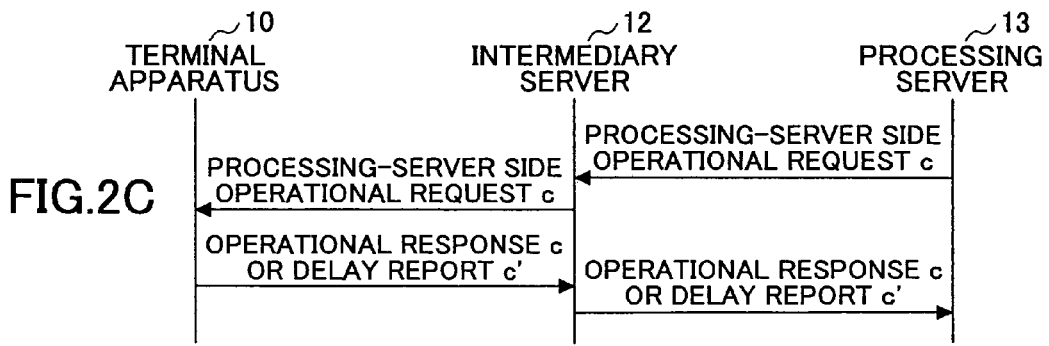
FIG. 2C is yet another diagram illustrating a relationship between an operational request and an operational response in the distributed-processing system illustrated in FIG. 1.

FIG. 2C is a case in which an operational request to the terminal apparatus 10 takes place at the processing server 13. In this case, the model is such that the processing server 13 generates a processing server-side operational-request c and the terminal apparatus 10 which has received this via the intermediary server 12 returns an operational response c to the operational request.

Figure 2D:
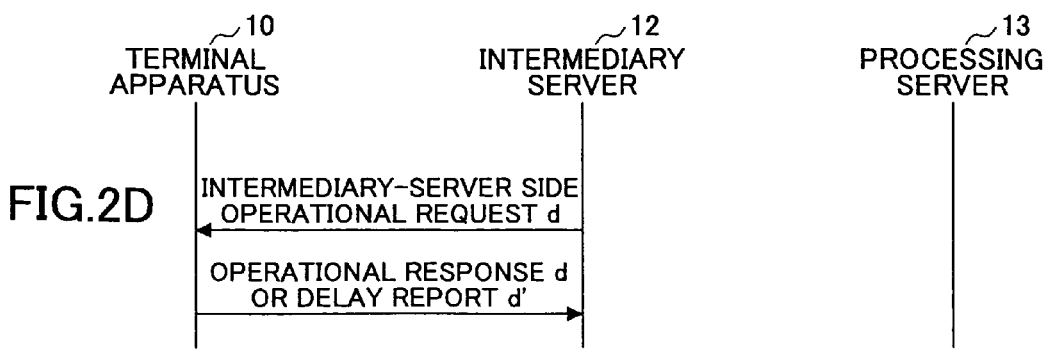
FIG. 2D is yet another diagram illustrating a relationship between an operational request and an operational response in the distributed-processing system illustrated in FIG. 1.

FIG. 2D is a case in which an operational request to the terminal apparatus 10 takes place at the intermediary server 12. In this case, the model is such that the intermediary server 12 generates an intermediary server-side operational-request d and the terminal apparatus 10 which has received this returns an operational response d to the operational request.

Even in these cases in FIGS. 2C and 2D, with no need to recognize at the terminal apparatus-side which server the operational response is returned to, transmitting all operational responses to the intermediary server 12 provides for transferring at the intermediary server 12 side to appropriate destinations (including itself).

As for the delay report, the cases in FIGS. 2C and 2D are the same as the cases in FIGS. 2A and 2B.

It is noted that herein SOAP (Simple Object Access Protocol) is adopted as a protocol for delivering arguments and return values with RPC, providing for the operational request and the operational response as described above to be described herein as SOAP messages.

In this embodiment, when transmitting/receiving an operational request and an operational response to the operational request received mutually between multiple communications counterparts such as the processing server 13, with the intermediary server 12 being an intermediary apparatus for intermediating the transmission/reception, the intermediary server 12 is able to transfer an operational request to the processing server 13 to be a forwarding destination according to the type of the operational request received from the terminal apparatus 10 and to return an operational response from the processing server 13 to the terminal-apparatus 10 of the source of the operational request. Here, the configuration may be such that an operational request is transmitted only from the communications apparatus as described above and the communications counterpart as described above transmits to the communications apparatus as described above only an operational response to the operational request.

Then, as a communications protocol for actually transferring the operational requests and responses, what is appropriate for the system configuration can be adopted, for example, HTTP (HyperText Transfer Protocol), SMTP (Simple Mail Transfer Protocol), or FTP (File Transfer Protocol), etc., may be adopted. Herein, out of these, an example of adopting the HTTP is described.

Next, a more specific example is used to describe this embodiment.

Now, a remote control system is described that uses, from an image-processing apparatus 100 as the first communications apparatus, a service provided by a sales-management server 103a and an information-management server 103b performing as the second communications apparatus and intermediates communications between these apparatuses with an equipment-management server 102 as an intermediary apparatus of the invention. In this system, the image-processing apparatus 100 may in addition use a service provided by the equipment-management server 102.

FIG. 3, which is a conceptual diagram illustrating an example configuration of the distributed-processing system, differs from FIG. 1 only in that the terminal apparatus 10 is changed to the image-processing apparatus 100 and each server is assigned a specific name so that an explanation of the overall system configuration is omitted.

It is noted that while this example is such that only one unit of the image-processing apparatus 100 is illustrated, the fact that multiple image-processing apparatuses including this one unit may be provided is illustrated in FIG. 1. While the terminal apparatus is illustrated as only one unit of the image-processing apparatus 100 for brevity of explanation below, for some processes and data, an example with multiple terminal apparatuses is shown without any remarks to show that it is possible to easily expand and apply this embodiment even to the case of providing multiple terminal apparatuses. Even in this case, treating one of the multiple terminal apparatuses as the image-processing apparatus 100 makes it possible to also apply the system as illustrated in FIG. 3 without any problems.

Now, the image-processing apparatus 100 is a digital multi-functional machine which is provided with functions of a copier, a facsimile and a scanner, etc., of communicating with an external apparatus, and which is implemented with application programs for providing a service concerning these functions.

Moreover, the equipment-management server 102 has a function as an intermediary server for intermediating communications between the processing server 103 and the image-processing apparatus 100 as well as the function of providing services related to remote management and maintenance of the image-processing apparatus 100.

The sales-management server 103a has a function of providing services, which relate to accepting orders and selling of disposables and supplies in the image-processing apparatus 100. Then, the information-delivery server 103b has a function of providing services for delivering to the users of the image-processing apparatus 100 various information items such as news and guidance or product introductions.

Now, each of these nodes is provided for transmitting an "operational request" for processing to a method of application programs mutually implemented and acquiring an "operational response" being a result of the requested process with a RPC (remote procedure call).

It is noted that in the explanations below, the equipment-management server 102 is called an intermediary server 102 and the sales-management server 103 and the information-delivery server 103b collectively are called a processing server 103.

FIGS. 4A through 4D illustrate the relationships between these operational requests and operational responses. It is noted that firewalls 11 are not considered even in these figures.

FIG. 4A is a case in which an operational request to a processing server 103 takes place at the image-processing apparatus 100. In this case, the model is such that the image-processing apparatus 100 generates an image-processing apparatus-side operational request a (below also called as "a terminal-apparatus command") and the processing server 103 which received this via the intermediary server 102 returns an operational response a (below also called "a command response" or just "a response") to this command. It is noted that a case may also be envisaged such that the image equipment-side operational request a is sequentially intermediated so as to arrive at the processing server 103.

FIG. 4B shows a case in which an operational request to an intermediary server 102 takes place at the image-processing apparatus 100. In this case, the model is such that the image-processing apparatus 100, for instance, generates an image-processing apparatus-side operational request b and the intermediary server 102 which receives this returns an operational response b to the command.

In these cases in FIGS. 4A and 4B, the fact that there is no need to grasp at the image-processing apparatus 100 side where the operational requests are eventually transferred to is the same as in the case in FIGS. 2A through 2D.

FIG. 4C is a case in which an operational request to an image-processing apparatus 100 takes place at the processing server 103. In this case, the model is such that the processing server 103 generates a processing server-side operational request c (below also called "a processing-server command") and the image-processing apparatus 100 which has received this via the intermediary server 102 returns an operational response c to this operational request.

FIG. 4D is a case in which an operational request to an image-processing apparatus 100 takes place at the intermediary server 102. In this case, the model is such that the intermediary server 102 generates an intermediary server-side operational request (below also called "an intermediary-server command") d and the image-processing apparatus 100 which has received this returns an operational response d to the command.

In these cases in FIGS. 4C and 4D, the fact that there is no need to track at the image-processing apparatus 100 side where the operational responses are eventually transferred to is the same as in FIGS. 2A through 2D.

Moreover, in all of FIGS. 4A thorough 4D the fact that a delay report is returned when a response cannot be returned promptly is the same as in the case of FIG. 2A.

Thus, at the RPC level, the operational request and the operational response are treated symmetrically between the image-processing apparatus 100 and the processing server 103 and between the image-processing apparatus 100 and the intermediary server 102. However, they are not symmetrical at the communications level.

Next, a communications sequence in this communications system is described.

Figure 5:
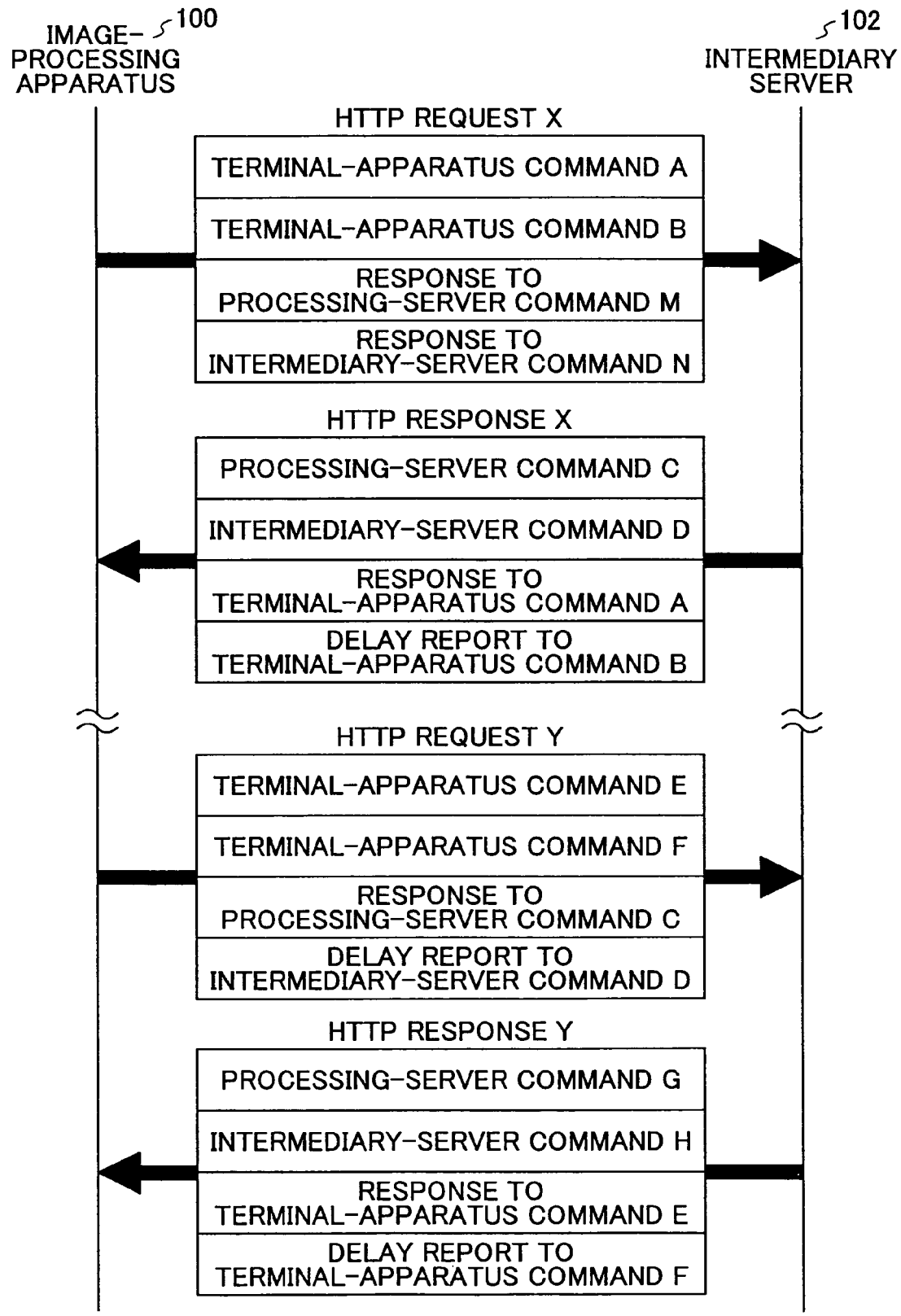
FIG. 5 is a diagram illustrating an example communications sequence between the image-processing apparatus and the intermediary server that are illustrated in FIG. 3.

First, an example communications sequence is illustrated in FIG. 5 between an image-processing apparatus and an intermediary server.

As illustrated in this figure, the image-processing apparatus 100 and the intermediary server 102 communicate by mutually transmitting/receiving a HTTP communications request and a HTTP communications response to the communications request.

However, as there is a firewall 11 between the image-processing apparatus 100 and the intermediary server 102, as illustrated in this figure, communications are always conducted in a procedure such that a HTTP request is transmitted from the image-processing apparatus 100 to the intermediary server 102 as a communications request and a HTTP response is returned from the intermediary server 102 to the image-processing apparatus 100 as a communications response to this communications request. For example, the procedure is such that the intermediary server 102 returns a HTTP response X to a HTTP request X which the image-processing apparatus 100 has transmitted, and in the same manner, a HTTP response Y is returned to a HTTP request Y.

Then, in a HTTP request from the image-processing apparatus 100, a provision is made such as to described therein for transmission for a terminal-apparatus command, being an operational request from the image-processing apparatus 100 to the intermediary server 102 or the processing server 103, a response to a processing-server command transmitted to the image-processing apparatus 100 via the intermediary server 102 from the processing server 103 (a command response), and a response to an intermediary-server command transmitted from the intermediary server 102 to the image-processing apparatus 100.

Now, as for the terminal-apparatus command, at the image-processing apparatus 100 side, it suffices only to grasp which one of the intermediary server 102 and the processing server 103 the command is to be transmitted to.

Then, in the HTTP response from the intermediary server 102, a provision is made to describe a processing-server command as being an operational request from the processing server 103 to the image-processing apparatus 100, and an intermediary-server command as being an operational request from the intermediary server 102 to the image-processing apparatus 100 and a response to a terminal-apparatus command from the image-processing apparatus 100 to the intermediary server 102 or the processing server 103.

As for the response, there is no need to be able to specifically designate which one of the intermediary server 102 and the processing server 103 the response is from by providing for grasping which terminal-apparatus command the response is made to.

Moreover, as understood from this example, as for terminal-apparatus commands A and B, for instance, it is possible to describe in the HTTP request X for transferring and to describe a response to that or a delay report in the HTTP response X corresponding to the HTTP request X. However, as for processing-server command C and intermediary-server command D, it is possible to describe in the HTTP response X corresponding to 'the HTTP request X for transferring and to describe a response to that or a delay report in the HTTP response Y being the next HTTP request.

Moreover, while in the above-described cases in FIGS. 4A or 4B the image-processing apparatus 100 is able to establish a connection with the intermediary server 102 immediately after generating a terminal-apparatus command and to include this in a HTTP request for delivering, in the cases in FIGS. 4C or 4D as the firewall 11 installed at the image-processing apparatus 100 side blocks a HTTP request from the intermediary server 102 it would not be possible to immediately access the image-processing apparatus 100 from the intermediary-server 102 side so as to deliver the processing-server command.

Figure 6:
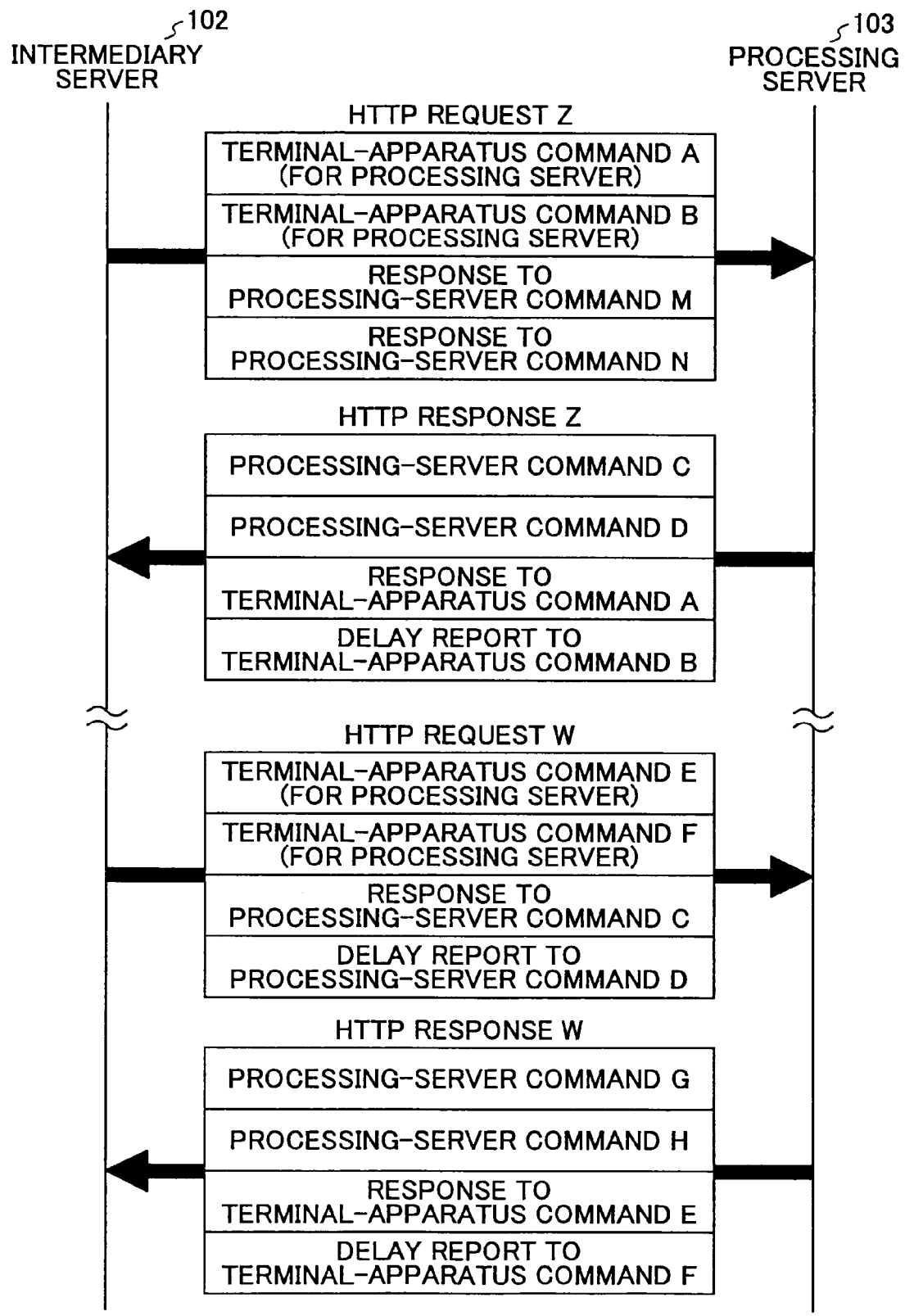
FIG. 6 is a diagram illustrating an example communications sequence between the intermediary server and the processing server that are illustrated in FIG. 3.

Next, an example communications sequence is illustrated in FIG. 6 between the intermediary server and the processing server.

It is not necessarily the case that there is a firewall between an intermediary server 102 and a processing-server 103. However, in order to eliminate the burden at the processing server-side 103 of managing the party to communicate to and managing the timing to request communications, as illustrated in this figure, the communications always provides for performing a sequence such as to transmit a HTTP request from the intermediary server 102 to the processing server 103 as a communications request and to return from the processing server 103 to the intermediary server 102 a HTTP communications response to the communications request. For example, the sequence is such that the processing server 103 returns a HTTP response Z to the HTTP request Z which the intermediary server 102 has transmitted and in the same manner a HTTP response W is returned to a HTTP request W.

Then, a provision is made in the HTTP request to describe for transmission what is determined to be transferred to the processing server 103 out of responses to terminal-apparatus commands received from the image-processing apparatus 100 and responses to processing-server commands transmitted to the image equipment 100 that are received from the image-processing apparatus 100. Moreover, a provision is made in the HTTP response to describe for transmission a processing-server command being an operational request from the processing server 103 to the image-processing apparatus 100 and a response to the terminal-apparatus command transferred to the processing server 103. It is noted that, when transmitting a delay report, the delay report may be described in lieu of the response as described above.

Now, an arbitrary number (which may be zero) of each of the terminal-apparatus command, the intermediary-server command, the processing-server command, and the response and the delay report to these may be described in one HTTP request or HTTP response. Then, the contents described in the one HTTP request or HTTP response are logically batched for transferring.

Then, in this way, batching to transfer operational requests and operational responses with different destinations and sources makes it possible to reduce the number of connections required to transfer necessary information and reduce overhead so as to make communications more efficient.

Figure 7:
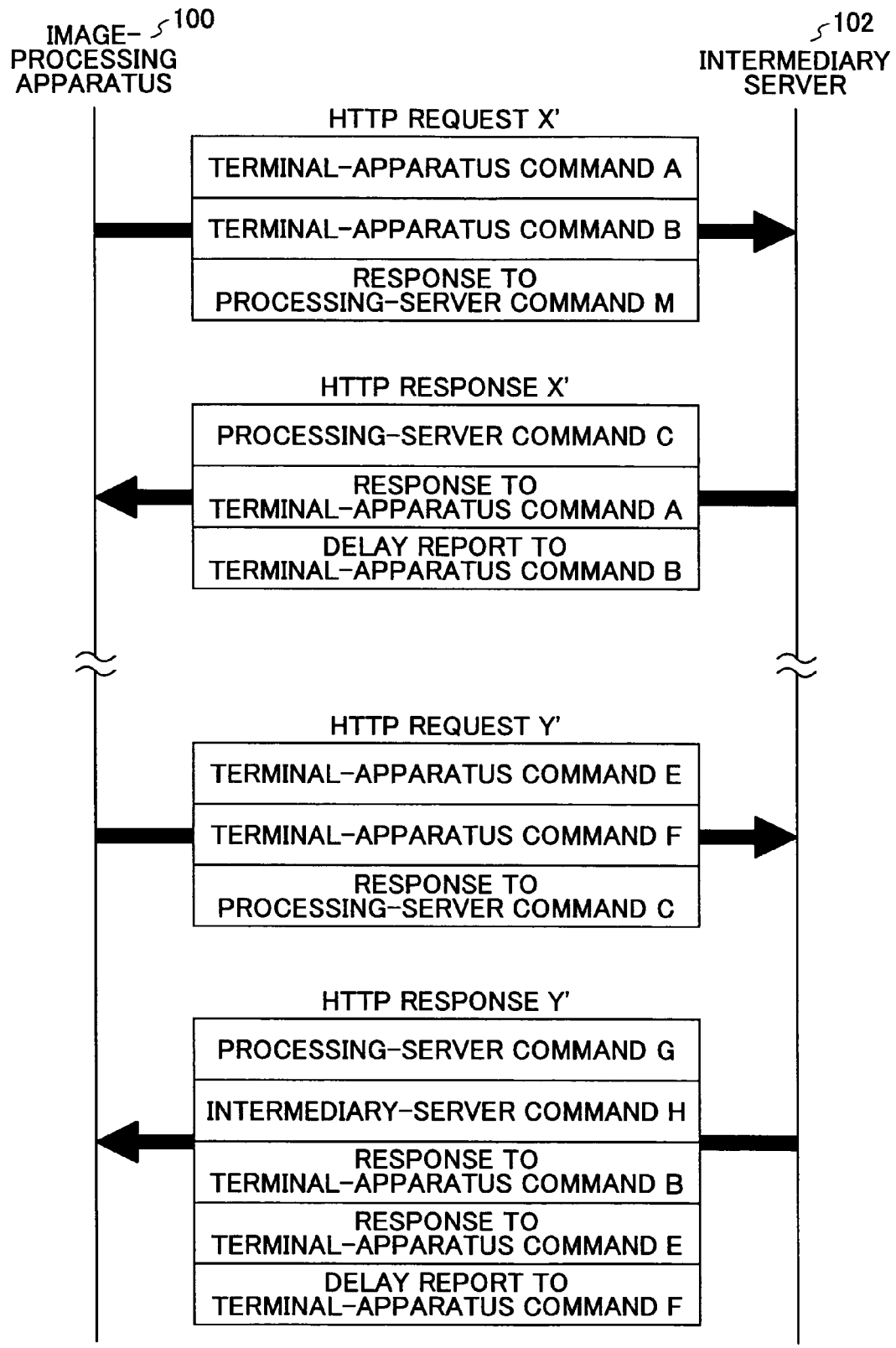
FIG. 7 is a diagram illustrating another example of the communications sequence illustrated in FIG. 5.

FIG. 7 illustrates another example communications sequence between the image-processing apparatus and the intermediary server.

While FIGS. 5 and 6 illustrate quite simple example sequences for explanation purposes, FIG. 7 illustrates an example such that the number of commands and command responses described in each HTTP request and HTTP response is not constant.

Moreover, when a delay report to a command is transmitted, there is no need to return a response at the next transmission opportunity. For example, as with a terminal-apparatus command B illustrated in FIG. 7, a provision may be made for describing in a HTTP response Y' following a HTTP response X' which describes therein a delay report so that a response is not returned and a further subsequent HTTP response (not illustrated) is returned. of course the above also applies to an intermediary-server command and a processing-server command and there is no need to describe a response to the command in a HTTP request following a HTTP request which describes therein a delay report.

Now, as each command and command response is generated independently and is to be used for processing, in order to perform a batch transfer as described above between the image-processing apparatus 100 and the intermediary server 102 and between the intermediary server 102 and the processing server 103, there is a need for the process to combine these commands and command responses before transferring and to separate them after transferring. Next, a hardware configuration of each apparatus as well as a functional configuration for performing such process and a procedure of the process as described above.

For brevity of explanation, in the explanation below a description of the process regarding delay reporting is omitted.

Figure 8:
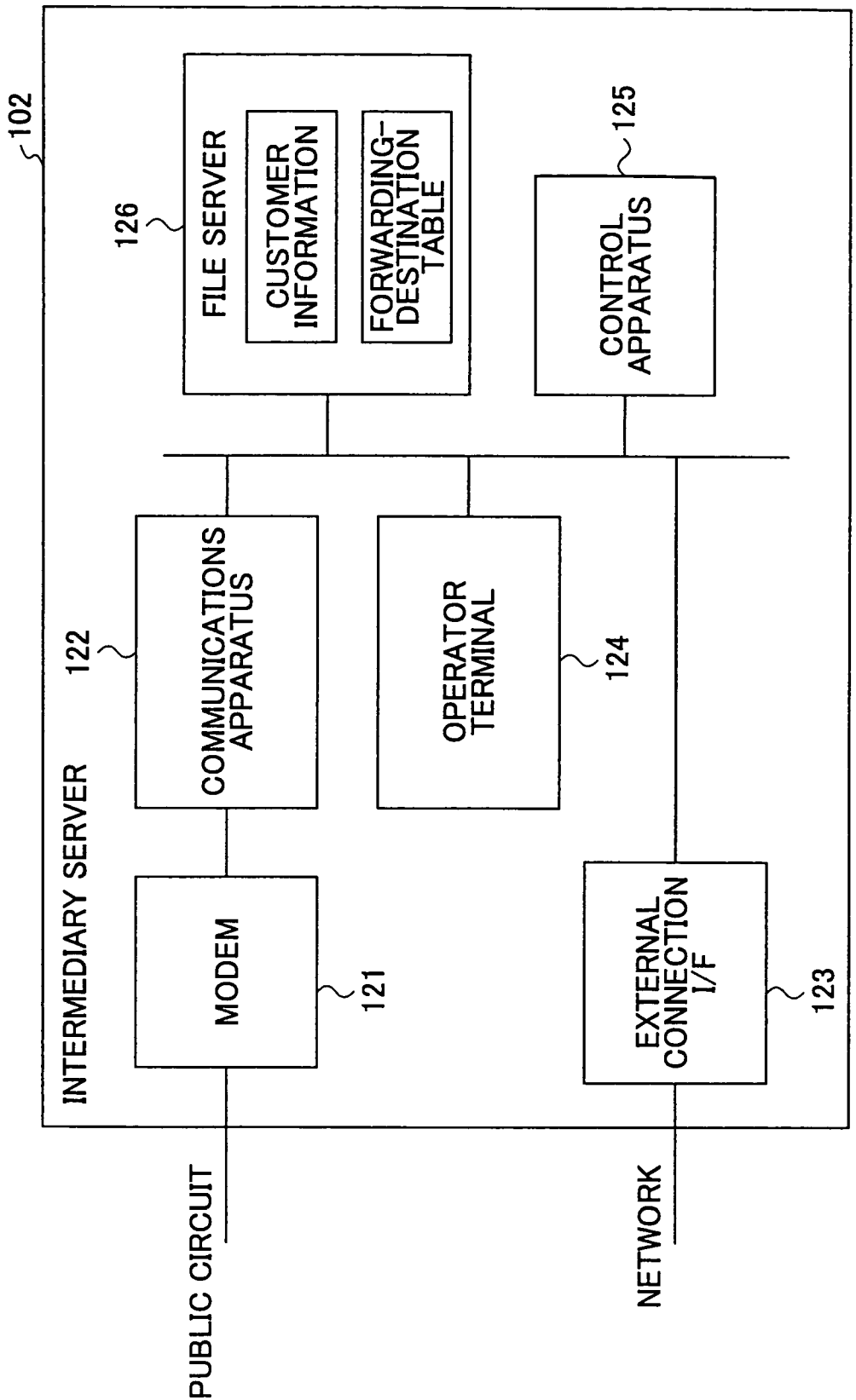
FIG. 8 is a diagram illustrating an overview hardware configuration of the intermediary server illustrated in FIG. 3.

First, FIG. 8 illustrates an overview hardware configuration of an intermediary server.

FIG. 8 is a block diagram illustrating an example overview configuration of an intermediary server 102.

The intermediary server 102 consists of a modem 121, a communications terminal 122, an external-connection I/F (interface) 123, an operator terminal 124, a control apparatus 125, a file server 126, etc.

The modem 121 in communication with an image-processing apparatus 100 at the equipment user-side (for example, the user using the image-processing apparatus ) via a public circuit (not illustrated) modulates/demodulates data transmitted/received. Moreover, the communications terminal 122 controls communications by the modem 121. Then, the modem 121 and the communications terminal 122 function as communications means.

The external connection I/F 123 is an interface for conducting communications via a network with the Internet 14 or dedicated circuits, etc. Then, communications are conducted with the image-processing apparatus 100 at the equipment user-side and the processor server 103 via this interface. Moreover, a proxy server, etc., may be provided for security management.

The operator terminal 124 accepts input of various data through an operator operating on input apparatuses such as a keyboard, etc. Data to be input include, for example, customer information such as an IP address and a telephone number (a telephone number to be called) for use in communicating with an image-processing apparatus 100 at each customer environment.

The control apparatus 125, comprising a microcomputer consisting of a CPU, a ROM and a RAM, etc., which are not illustrated, has centralized control over the whole intermediary server 102. The CPU operating according to required programs (executing the required programs as needed) and selectively using each section as needed makes it possible to perform various processes.

The file server 126 comprising a storage device (not illustrated) such as a hard-disk apparatus (not illustrated) in which various data are respectively stored as a database (DB) such as the IP address and the telephone number of the image-processing apparatus 100 at each customer environment, data received from the apparatus, identification information of the image-processing apparatus to be controlled, data input from the operator terminal 124, a forwarding-destination table described below for indicating a forwarding destination of each command and command response, and programs related to the invention.

It is noted that the configuration of the management apparatus is not limited to the above so that it may be configured using one PC unit, for example.

Figure 9:
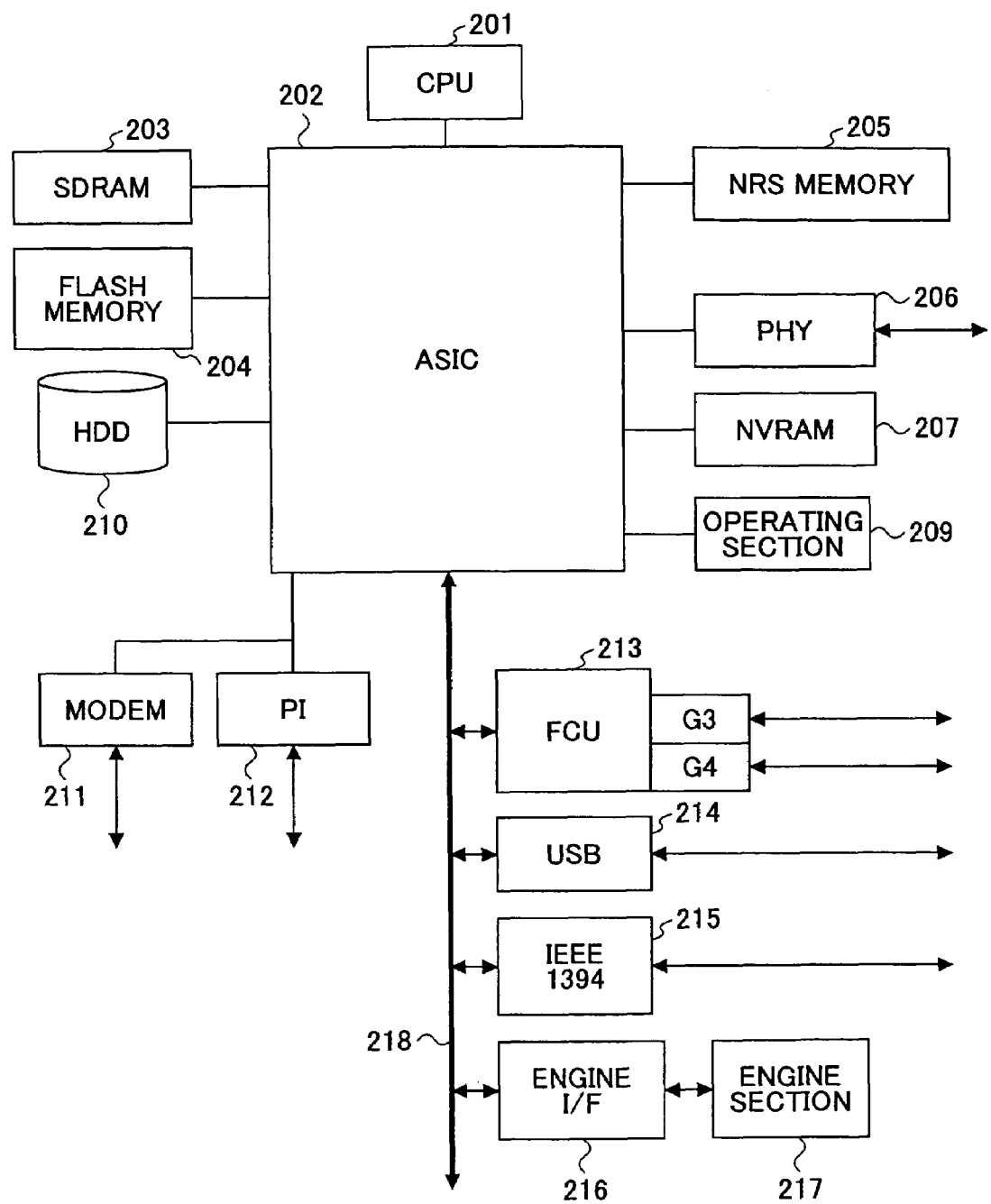
FIG. 9 is a block diagram illustrating an overview hardware configuration of the image-processing apparatus illustrated in FIG. 3.

Next, a hardware configuration of an image-processing apparatus is illustrated in FIG. 9.

The image-processing apparatus 100, herein constructed as a digital multi-functional machine comprising a printer, a facsimile (FAX) apparatus, a digital copier, a scanner apparatus, a document-management apparatus, etc., comprises a CPU 201, an ASIC (Application Specific Integrated Circuit) 202, a SDRAM 203, a flash memory (non-volatile memory) 204, an NRS memory 205, a PHY (physical media interface) 206, a NVRAM (non-volatile memory) 207, an operating section 209, a HDD (hard-disk drive) 210, a modem 211, a PI (Personal Interface) 212, a FCU (Facsimile Control unit) 213, a USB (Universal Serial Bus) 214, an IEEE (Institute of Electrical and Electronic Engineers) 1394 215, an engine interface (I/F) 216 and an engine section 217. These items as described above are hardware resources for performing image processing such as image reading, image formation and image-information transmission.

The CPU 201 is operational-processing means for performing data processing (control of each function) via the ASIC 202.

The ASIC 202, a multi-functional device consisting of such interfaces as a CPU interface, a SDRAM interface, a local-bus interface, a PCI interface, a MAC (Media Access Controller), and a HDD interface, etc., seeks to share devices to be controlled by the CPU 201, and supports to increase the efficiency of development of applications (application software) and common system services from an architectural aspect.

Moreover, to this ASIC 202 are directly connected an operating section 209 by such means as an operation panel for accepting an operational instruction, etc., of each engine section, as well as a PHY 206. Moreover, the FCU 213, the USB 214, the IEEE 1394 215 and the engine I/F 216 are connected to the ASIC 202 via a PCI bus 218 and the modem 211 and the PI 212, etc., are directly connected.

Then, the CPU 201 as described above, reading the required control programs from storage means such as the flash memory 204 and the HDD 210, etc., via this ASIC 202 and extracting into the DRAM 230, etc., for execution makes it possible to function as processing means for processing information.

SDRAM 203 is a program memory for storing various programs including an operating system, or a main memory used for a work memory, etc., for the CPU 201 to use in performing data processing. It is noted that a DRAM or a SRAM may be used in lieu of this SDRAM 203.

Flash memory 204 which is a non-volatile memory (storage means) for use, for example, as a program memory for storing a boot loader (boot program) for starting up the image-processing apparatus 100, an OS image being an OS file, and various programs for performing the below-described process, and as a fixed-parameter memory for storing various fixed parameters, etc., provides for keeping the stored contents even when the power is turned off. It is noted that a non-volatile memory integrating a backup circuit using a RAM and a battery or other non-volatile memories such as an EEPROM may be used.

The NRS memory 205, a non-volatile memory storing an NRS application described below, allows for a NRS function to be added as an option.

The PHY 206 is an interface for communicating with an external apparatus via a LAN. The NVRAM 207 which is a non-volatile memory (storage means) for use, for example, as a memory for storing model serial number identification information of this image-processing apparatus 100, as a memory for storing an initial value for the operation by the operating section 209, as a memory for storing an initial value of each application (APL), as a memory for storing each counter information set (charge counter data, etc.), and as a memory for storing the setting status of itself and the communications counterpart, network-address information, and model information such as protocol, provides for keeping the stored contents even when the power is turned off. It is noted that a non-volatile RAM which has integrated therein a backup circuit using a RAM and a battery, or a non-volatile memory such as an EEPROM and a flash memory may be used.

The operating section 209 is operating and displaying means (operating means and displaying means).

HDD 210 is storage means (a storage medium) for storing and saving data regardless of whether the power is on or off. It is also possible to have programs or other data within the flash memory 204 as described above, or data within the NVRAM 207 stored in the HDD 210. Moreover, it is preferable that data to be collected, updated or transmitted periodically are also stored in this HDD 210.

The modem 211, modulating/demodulating means, when transmitting data to the intermediary server 102 via the public circuit modulates the data into a form which can be passed on over the public circuit. Moreover, when the modem 211 receives modulated data sent from the intermediary server 102, the data are demodulated.

The PI 212, comprising a RS485-compatible interface, is connected to the public circuit via a line adapter (not illustrated).

The FCU 213 controls, via the public circuit, communications with external apparatuses including an image-processing apparatus such as a digital copier having a facsimile apparatus or a modem function (a facsimile-communications function), or a digital multi-functional machine.

The USB 214 and the IEEE 1394 215 are respectively a USB standard interface and an IEEE 1394 standard interface for communicating with peripheral equipment.

The engine I/F 216 is an interface for connecting the engine section 217 to the PCI bus 218.

As for the engine section 217, an engine for reading/forming images consisting of a known scanner engine and plotter engine, etc., and a post-processing unit for performing post processes such as sorting, punching and stapling on sheets having formed therein images with the plotter engine.

In such an image-processing apparatus 100, when the power is turned on (when the power is on), the CPU 201 starts up via the ASIC 202 the boot loader within the flash memory 204, reads out the OS image within the flash memory 204, and loads the image in the SDRAM 203 for extracting a usable OS. Then, when extracting the OS is completed, the OS is started up. Then, reading out as required programs such as applications within the flash memory 204 or NRS applications within the NRS memory 205, loading them in SDRAM 203 for extracting and starting up makes it possible to realize various functions.

Figure 10:
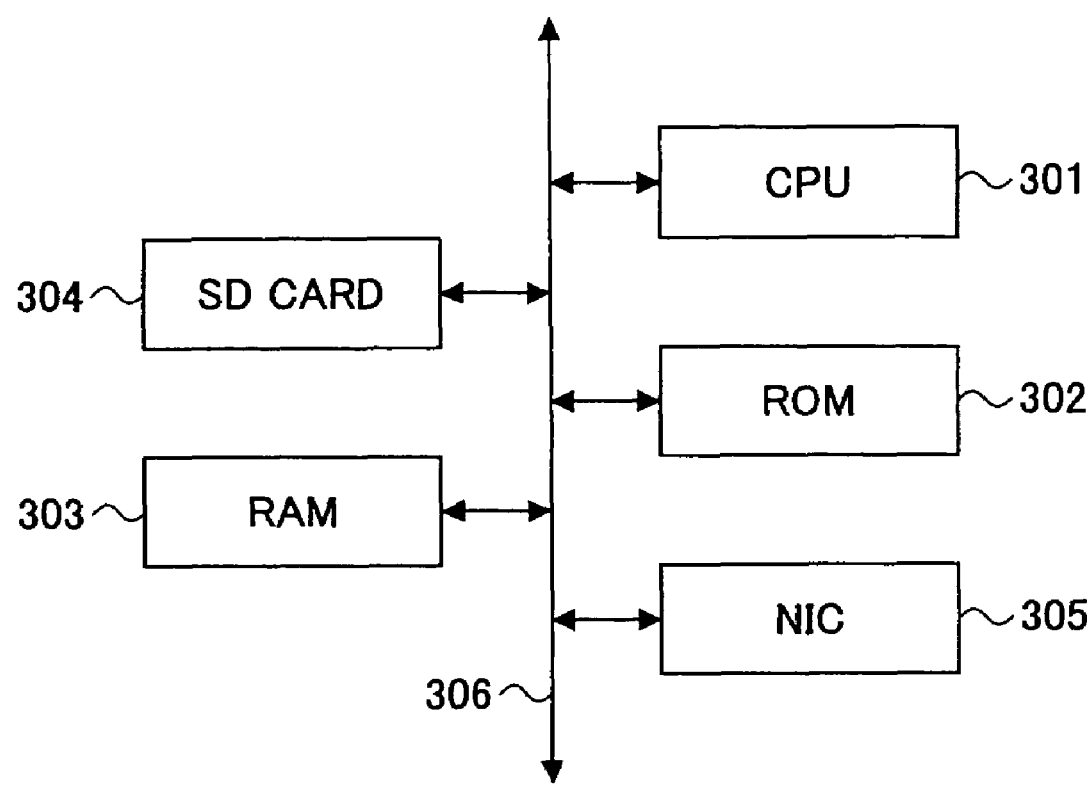
FIG. 10 is a block diagram illustrating an overview hardware configuration of the processing server illustrated in FIG. 3.

Next, a hardware configuration of the processing server 103 is illustrated in FIG. 10.

As illustrated, each processing server 103 comprises a CPU 301, a ROM 302, a RAM 303, a SD (Secure Digital) card 304 and a network interface card (NIC) 305 which are connected via a system bus 306.

Explaining in more detail these elements, first the CPU 301 is control means for having overall control of the whole processing server 103 by means of application programs stored in the ROM 302. Then, the ROM 302 is a read-only memory having stored therein various fixed data sets such as control programs for the CPU 301 to use.

The RAM 303 is a memory for temporary storage that is for use as a work memory, etc., for the CPU 301 to perform data processing. The SD card 304 is a non-volatile memory which provides for keeping the storage contents even when the apparatus power is turned off. The NIC 305 is communications means for transmitting/receiving information with a communications counterpart via networks including the Internet 14.

It is noted that, as a matter of course, hardware may be added to these basic elements as required.

Figure 11:
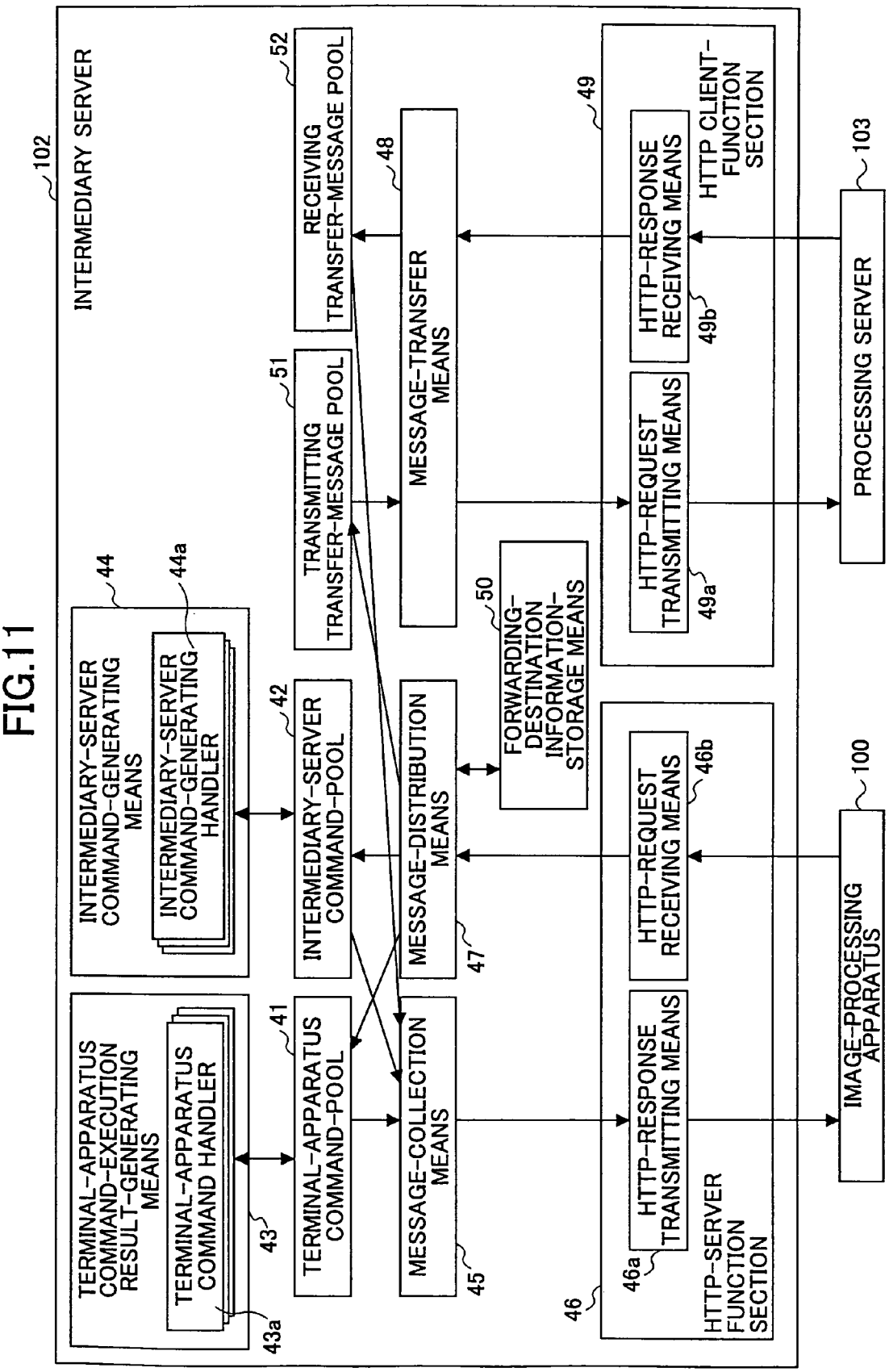
FIG. 11 is a functional block diagram illustrating a configuration of functions for processing related to commands and command responses out of functions of the intermediary server illustrated in FIG. 3.

Next, a functional block diagram in FIG. 11 illustrates a configuration of functions for processing related to commands and command responses out of functions of the intermediary server 102.

Out of the functions illustrated in FIG. 11, a terminal-apparatus command-pool 41, an intermediary-server command-pool 42, a transmitting transfer-message pool 51 and a receiving transfer-message pool 52 are provided in any rewritable storage means. For example, they may be provided in a flash memory or a SDRAM or a HDD in the control apparatus 125, or they may be provided in the file server 126. The functions of terminal-apparatus command-execution result-generating means 43, intermediary-server command-generating means 44, message-collection means 45, message-distribution means 47 and message-transfer means 48 are realized with the CPU of the control apparatus 125. Moreover, the functions of a HTTP-server function section 46 and a HTTP-client function section 49 are realized with the CPU of the control apparatus 125 and the external connection I/F 123. The function of a forwarding-destination information-storage means 50 is realized with non-volatile storage means such as a flash memory or a HDD in the control apparatus 125.

These functions are described in more detail.

First, the terminal-apparatus command-pool 41 is a pool for registering what is determined to be executed by the intermediary-server 102 itself out of terminal-apparatus commands received from the image-processing apparatus 100 in association with responses to these commands and information identifying these commands and source information, etc.

Moreover, the intermediary-server command pool 42 is a pool for registering an intermediary-server command in association with a response to this command, and identifying information and destination information, etc., for this command.

In these pools as described above, creating a command sheet in a table format for each command so as to store therein information provides for associating the command with identifying information and information on the response, etc.

The terminal-apparatus command-execution result-generating means 43 corresponds to response-generating means. Then, it comprises a terminal-apparatus command-handler 43a being an application for reading out a terminal-apparatus command from the terminal-apparatus command-pool 41 so as to execute the command, the terminal-apparatus command-handler 43a having a function of generating a response to the terminal-apparatus command and registering the response in the terminal-apparatus command pool 41 in association with the command ID of the terminal-apparatus command. It is noted that a provision is made for registering in the terminal-apparatus command-pool 41 as a terminal-apparatus command-sheet in a table format a terminal-apparatus command received from the image-processing apparatus 100 in association with an ID identifying this command and management information, etc., for managing this command. Then, even a command response generated by the terminal-apparatus command-execution result-generating means 43 is registered in a terminal-apparatus command-sheet for a terminal-apparatus command executed when registering in the terminal-apparatus command-pool 41.

Moreover, it is possible to provide in the terminal-apparatus command-handler 43a the functions of reading out from the terminal-apparatus command-pool 41 multiple types of terminal-apparatus commands and generating a response to each terminal-apparatus command. Moreover, it is also possible to provide, when the terminal-apparatus command includes execution-priority order information for executing a process preceding the intermediary server 102, the function of reading out preferentially in the descending priority order for executing.

It is noted that the terminal-apparatus command-handler 43a may be a module for calling an application necessary for executing a terminal-apparatus command so as to execute the command, rather than the application itself.

Now, FIG. 12 illustrates an example data structure in a terminal-apparatus command-sheet of the intermediary server.

As illustrated in this figure, in the intermediary server 102, in the terminal-apparatus command-sheet is provided regions for storing data of "command ID", "source information", "method name", "input parameter", "state", "output parameter" and "command destination". Then, of these "command ID", "method name" and "input parameter" correspond to a terminal-apparatus command (and an ID assigned thereto), while "state" and "command destination" correspond to management information. "Output parameter" is an execution result of an intermediary-server command and what is in a command response which the intermediary server 102 returns.

What is in each data item is described.

First, "method name" which is what is in a request to the intermediary server 102 indicates the type of a function to be called in the intermediary server 102. "Input parameter", a data set accompanying "method name", is an argument for calling a function.

"Source information" indicates information identifying a command source, or an apparatus which generated a command. For a terminal-apparatus command, information identifying the image-processing apparatus 100 is to be registered. Moreover, this is information indicating the destination for transmitting a response to a command.

All terminal-apparatus commands to be stored in the terminal-apparatus command pool 41 are to be executed by the intermediary server 102 itself so that there is no need to manage the command destination.

"Command ID" is identifying information for identifying a terminal-apparatus command. "State", a data set indicating the state of the process regarding the terminal-apparatus command, evolves as the process proceeds as follows: "unprocessed"→"process completed"→"responded", or "unprocessed"→"being processed"→"process completed"→"responded". In the "output parameter" is stored a response generated by the terminal-apparatus command-execution result-generating means 43. The "output parameter" is unused until the execution of the terminal-apparatus command is terminated and the "state" as described above becomes "process completed". "Command destination" is reference information indicating a module for executing a terminal-apparatus command.

Reverting to the explanation of FIG. 11, the intermediary-server command-generating means 44 corresponds to request-generating means. Then, it has the functions of generating an intermediary-server command, assigning identifying information (ID) for identifying this command, assigning destination information of this command and management information for managing this command, and associating these sets of information so as to register in the intermediary-server command pool 42 as an intermediary-server command-sheet in a table format. This process is performed by the intermediary-server command-generating handler 44a out of which a portion generating an intermediary-server command corresponds, for example, to an application comprised in the intermediary server 102. Moreover, a function may be provided in the intermediary-server command-generating handler 44a that assigns to the generated intermediary-server command a priority order for having the image-processing apparatus 100 to execute each command.

Now, FIG. 13 illustrates an example data structure in an intermediary-server command-sheet of the intermediary server 102.

As illustrated in this figure, in the intermediary server 102, in the intermediary-server command-sheet is provided regions for storing data of "command ID", "destination information", "method name", "input parameter", "state", "destination of command execution result" and "output parameter". Then, of these "command ID", "method name" and "input parameter" correspond to an intermediary-server command (and an ID assigned thereto), while "state" and "destination of command execution result" correspond to management information. "Output parameter" is what is in a command response received from the image-processing apparatus 100 to be the command destination.

What is in each data item is described.

First, "method name" which is what is in a request to the image-processing apparatus 100 indicates the type of a function to be called in the image-processing apparatus 100. "Input parameter", a data set accompanying "method name", is an argument for calling a function.

"Destination information" indicates information identifying an apparatus in which a command is to be executed, or an apparatus to be the command destination. For an intermediary-server command, information identifying the image-processing apparatus 100 is to be registered herein. It is noted that an ID, a unique name or an IP address, etc., may be used.

As the intermediary-server command is always generated by the intermediary server 102 itself, there is no need to manage command source information.

"Command ID" is identifying information for identifying an intermediary-server command. "State", a data set indicating the progress status of the process regarding the terminal-apparatus command, evolves as the process proceeds as follows: "untransmitted"→"awaiting response"→"response received".

"Destination of command execution result" is reference information indicating a module for reporting, when receiving a response to the intermediary-server command described in the sheet, of the fact so as to have the necessary process executed. The module referred to is often but does to have to be a handler which has registered an intermediary-server command. In the "output parameter" is stored the contents when a command response is received. The "output parameter" is unused until a command response is received from the image-processing apparatus 100.

Reverting to the explanation of FIG. 11, the message-collection means 45 corresponds to collection means. Then, it has the functions of reading out from the terminal-apparatus command-pool 41 a command response which the terminal-apparatus command-execution result-generating means 43 has generated in association with a command ID and source information of a terminal-apparatus command corresponding to the command response, reading out from the intermediary command-pool 42 an intermediary-server command which the intermediary-server command-generating means 44 has generated in association with a command ID and destination information of the command, reading out a message for transfer that is described in a message sheet for transfer of the receiving transfer-message pool 52 detailed below and generating a transmitting message of these.

It is noted that it is possible to provide for the message-collection means 45 to read out in the descending priority order when a priority order is specified in a command response, a terminal-apparatus command, or a message for transfer.

Now transmitting messages are the command responses, commands and command IDs as described above which are described as SOAP messages using XML (Extensible Markup Language) being a structured language. Then the message-collection means 45 generates one SOAP message as a transmitting message for each one command response or command. Moreover, at that time, a command ID of each command is provided in the SOAP header while what is in the command response or command is described in the SOAP body. In communications using SOAP, a message called a SOAP envelope consisting of the SOAP header and the SOAP body is written in XML and is exchanged using a protocol such as HTTP.

Such generating of a SOAP message from commands or command responses may be performed by executing a required conversion program (serializer) generated based on a WSDL (Web Service Description Language) and serializing data.

As for the message for transferring, a provision is made for storing it in the state of a SOAP envelope described in XML and using it as it is as a transmitting message.

Moreover, the HTTP-server function section 46 comprises HTTP-response transmitting means 46a for transmitting a HTTP response and HTTP-request receiving means 46b for receiving a HTTP request. Then, the HTTP-response transmitting means 46a, corresponding to second transmitting means, has the function of generating a HTTP response describing therein a transmitting message which the message-collection means 45 has generated for transmitting to the image-processing apparatus 100. Here, any number of transmitting messages may be included in one HTTP response and a transmitting message related to a command response, and a transmitting message related to an intermediary-server command, and a transmitting message related to a transfer message may be arbitrarily set to co-reside. Of course, transmitting messages related to transfer messages which different processing servers have generated may co-reside.

Now, a provision is made for the HTTP-response transmitting means 46a to include for transmission in one HTTP response all transmitting messages which the message-collection means 45 has generated regardless of which message the transmitting message is related to. However, it is possible to set an upper limit on the number of transmitting messages to be included in one HTTP response.

Now, the HTTP response is transmitted even in case there are no data to be read out when the message-collection means 45 attempts reading out an intermediary-server command, a command response, or a transfer message, and no SOAP messages to be transmitted are eventually generated. Then, this reading out is to be attempted when the HTTP-request receiving means 46b receives a HTTP request from the image-processing apparatus 100.

The reason for the process is that as described above, it is not possible to transmit a HTTP request from the intermediary server 102 through the firewall 111 to the image-processing apparatus 100.

Moreover, the HTTP-request receiving means 46b, corresponding to first receiving means, has a function of receiving a HTTP request from the image-processing apparatus 100. Then herein, in the HTTP request, receiving messages arbitrarily co-reside with a receiving message containing a terminal-apparatus command, a command ID associated with the command, a receiving message containing a response to an intermediary-server command or a processing-server command, and a command ID associated with the command.

Now receiving messages are the commands, command responses, and command IDs, etc., as described above which are SOAP messages. Then, no distinction is made at the time of receiving as to whether a receiving message is a message destined for the intermediary server 102 or a message to be transferred to other apparatuses such as the processing server so that there is no need for destination or forwarding-destination information to be included in the receiving message for that purpose.

The message-distribution means 47 has the function of distributing data included in the HTTP request which the HTTP-request receiving means 46b has received into the terminal-apparatus command-pool 41, the intermediary-server command pool 42, and the transmitting transfer-message pool 51 so as to register the distributed data.

More specifically, it refers to a forwarding-destination table stored in the forwarding-destination information-storage means 50, which functions as forwarding-destination determining means to determine the forwarding destination according to the type of command or command response received, and determines a pool in which to register based on the result. While details are described below, the forwarding-destination table designates for each set of commands or command responses a forwarding destination for a command or a command response belonging to the set. Then searching the forwarding-destination table with a command or command response as the key makes it possible to acquire information of a forwarding destination to forward the command or command response to.

Then, when the forwarding destination of a received command (terminal-apparatus command) is the intermediary server 102 itself, a terminal-apparatus command-sheet is provided in the terminal-apparatus command-pool 41 so that the terminal-apparatus command and the command ID associated with the command are registered. Moreover, when the forwarding destination of the received command response is the intermediary server 102 itself, as the response is a response to an intermediary-server command, the command ID associated with the command is collated with the command ID of the intermediary-server command-sheet stored in the intermediary-server command-pool 42 so as to specify the corresponding intermediary-server command and register the specified command as "output parameter" for the intermediary-server command.

Then here, the HTTP request is divided so as to take out each receiving message included in the divided HTTP request and the data are converted to a format required to be registered into the table, and the converting may be performed by means of executing a required conversion program (deserializer) generated based on WSDL.

On the other hand, as for a command or command response for which a destination other than the intermediary server 102 is the forwarding destination, messages related to the command or command response are registered in the transmitting transfer-message pool 51 in order to be transferred to other apparatuses. Then, when registering in the transmitting transfer-message pool 51, a transfer-message sheet is created for registering.

FIG. 14 illustrates an example data structure in a transfer-message sheet.

As illustrated in this figure, in the transfer-message command-sheet of the transmitting transfer-message pool 51 are provided regions for storing "forwarding-destination information", "entity-header information" and "XML data of message".

Then, out of these, in "forwarding-destination information", is registered information on the forwarding destination is determined according to the type of command or command response which the message-distribution means has received. Information (detailed below) in the entity header of the part in which the message is described is registered in "entity-header information" while what is in the SOAP envelope related to the message is registered in "XML data of message". Here, as for the transfer message, as it suffices to transfer it regardless of what is in the message, there is no need to convert the data format of the SOAP envelope.

It is noted that a provision is made for, when the message-distribution means 47 registers a message in the transmitting transfer-message pool 51, referring to source information of the HTTP request in which the message is described and generating a header describing therein message source information for adding in the entity-header information.

Once again reverting to the explanation of FIG. 11, the message-transfer means 48 has the functions of reading out a transfer message registered in the transmitting transfer-message pool 51 so as to generate a transmitting message, and registering a message which the HTTP-response receiving means of the HTTP-client function section 49 has received in the receiving transfer-message pool 52.

First, as for generating the transmitting message, for each forwarding destination, a transfer message to be transmitted to the forwarding destination is read out. Then here, as a message is registered in the transfer-message sheet in the SOAP envelope state described in XML, it may be used as it is as a transfer message. Moreover, in the SOAP message, a part for transmitting is generated that describes therein the message, affixing the entity header registered in "entity-header information" of the same sheet.

Moreover, as for registering in the receiving transfer-message pool 52, a transfer-message sheet for registering a received message is created for registering. However, the format of the sheet differs slightly from the case of the transmitting transfer-message pool 51.

FIG. 15 illustrates an example data structure in a transfer-message sheet of the receiving transfer-message pool 52.

As illustrated in this figure, in the transfer-message sheet of the receiving transfer-message pool 52 are provided regions for storing "entity-header information" and "XML data of message".

Then, out of these, information on the entity-header of the part in which a message is provided (details described below) is registered in "entity-header information" and what is in the SOAP envelope related to the message is registered in "XML data of message". Here, the fact that there is no need to convert the data format of the SOAP envelope is the same as in the case of the transmitting transfer-message pool 51.

In the case of the receiving transfer-message pool 52, while there is no "forwarding-destination information", this is to provide for describing information on the message-transfer route in the entity-header.

Once again reverting to the explanation of FIG. 11, the HTTP-client function section 49 comprises HTTP-request transmitting means 49a for transmitting a HTTP request and HTTP-response receiving means 49b for receiving a HTTP response. Then, the HTTP-request transmitting means 49a, corresponding to first transmitting means, has the functions of generating a HTTP request describing therein a transmitting message which the message-transfer means 48 has generated and transmitting the message to the processing server 103. Here, any number of transmitting messages may be included in one HTTP request or a transmitting message related to a command response and a transmitting message related to an image-equipment command may arbitrarily be set to co-reside. In the first place, for transferring a message, there is no need to recognize what is in the message as long as the forwarding destination can recognize it. Then, transmitting messages related to commands, command responses, or transfer messages with differing sources may be set to co-reside.

Now, a provision is made for the HTTP-request transmitting means 49a to include for transmission in one HTTP request all transmitting messages which the message-transfer means 48 has generated for one forwarding destination regardless of what the transmitting message is related to. It is noted that it is also possible to set an upper limit for the number of transmitting messages to be included in one HTTP request.

Moreover, when the message-transfer means 48 attempts to read out a transfer message for a certain forwarding destination, the HTTP request is to be transmitted even when there are no data read out and no SOAP messages to be transmitted are eventually generated. Then, the attempt to read out is to be performed periodically. For example, it is possible to read out with a timer every 60 minutes.

The reason for the process is, as described above, to provide for not being able to transmit even when there is information to be transmitted from the processing server 103 and the intermediary server 102 unless the intermediary server 102 makes a request for communicating. Even when there are no data to transmit from the intermediary server 102, periodically transmitting a request for communicating to each processing server 103 so as to provide an opportunity for transmitting information from each processing server 103 to the intermediary server 102 makes it possible to prevent information requiring transfer from staying in the processing server 103 over a long period of time.

It is noted that, as a matter of course, reading by means of message-transfer means 48 and transmitting a HTTP request by means of a HTTP-request transmitting means 49a may be performed as required in a non-periodic manner. For example, a provision may be made for, when information required to be transmitted urgently is registered in the transmitting transfer-message pool 51, the message-distribution means 47 to report to the message-transfer means 48 of the fact so as to have the information read out.

Moreover, the HTTP-response receiving means 49b, corresponding to second receiving means, has the function of receiving a HTTP response from the processing server 103. Then here, in the HTTP response are included a receiving message including a processing-server command, a command ID associated with the command, a receiving message including a response to a terminal-apparatus command, and a command ID associated with the command that arbitrarily co-reside.

Then, receiving messages are the commands, command responses, or command IDs as described above that are SOAP messages. Then, these messages which are messages to be transferred to the image-processing apparatus 100, as described above, are to be registered in the receiving transfer-message pool 52 by means of the message-transfer means 48, read out at an appropriate timing by means of a message-collection means 45 and transmitted to the image-processing apparatus 100 by means of the HTTP-response transmitting means 46a.

It is noted that, at the time of registering in the receiving transfer-message pool 52, there is no need to change the process depending on the forwarding destination of the message. Moreover, a provision is made for, when the message-collection means 45 reads a message from the receiving transfer-message pool 52 so as to generate a transmitting message, generating a part of the entity header after deleting information on the destination to transmit the message from now on out of information on the transfer route described in "entity-header information".

Next, an example HTTP request that the intermediary server 102 having the function as described above receives from the processing server 102 is illustrated in FIG. 16.

As illustrated in FIG. 16, this HTTP request is provided with a multi-part message according to MIME (Multipurpose Internet Mail Extension) as a body portion, each part of the multi-part respectively describing an entity header and having embedded therein a SOAP envelope (omitting a detailed illustration). In the example in FIG. 16, while each element divided by "MIME_boundary" makes up independent parts of a first part, a second part, a third part, and a fourth part, the number of parts which can be included in a HTTP body is not limited to four. The number may be any number including zero.

A SOAP envelope which is embedded in a HTTP request so as

Next, an example HTTP request that the intermediary server 102 transmits to the processing server 103 is illustrated in FIG. 18.

As illustrated in FIG. 18, this HTTP request is the same in format as the HTTP request illustrated in FIG. 16. It is noted that what is in the SOAP envelope differs as a matter of course depending on what is in the command or command response. Then, the SOAP envelopes embedded in this HTTP request for delivering consists of those containing therein a terminal-apparatus command and those containing therein a response to a processing-server command.

Then, in the entity header of each part, as a "X-Received-From" header, information indicating the source of a SOAP message described in the part is added by means of message-distribution means 47 of the intermediary server 102. Then, as described below, the processing server 103 may determine the transfer route of a response to a terminal-apparatus command, or processing-server command based on this information.

Moreover, FIG. 19 illustrates an example HTTP response that the intermediary server 102 receives from the processing server 103.

As illustrated in FIG. 19, this HTTP response is the same in format to the HTTP response illustrated in FIG. 18. It is noted that what is in the SOAP envelope differs as a matter of course on what is in the command or command response. Then, the SOAP envelopes which are embedded in this HTTP response for delivering consist of those containing therein a processing-server command and those containing therein a terminal-apparatus command.

Moreover, in the entity header of each part is added information indicating transfer-route and destination of a SOAP message contained in the part. Then, the message-collection means 45 of the intermediary server 102 may recognize the forwarding destination of the message based on this information.

Then, the HTTP request or HTTP response in the format as described above which is one transferable message may be generated by combining a multiple number of SOAP envelopes of the respective parts without changing the format. Moreover, dividing the HTTP request or HTTP response in such a format so as to take out the SOAP envelope of each part also makes it possible to use as it is in a communication in which one SOAP envelope is provided in a HTTP request or HTTP response that is with other communications apparatuses with a typical Web service (SOAP RPC) function.

It is noted that there is no need to provide the destination and the transfer route of the SOAP message in a message communicated between the image-processing apparatus 100 and the intermediary server 102.

Next, specific example parts provided in these HTTP requests or HTTP responses are illustrated in FIGS. 20 through 31.

FIG. 20 illustrates an example part of a terminal-apparatus command to the intermediary (equipment management) server 102.

In this example, first, in the "X-SOAP Type" header of the entity-header part is information indicating whether a SOAP message provided in this part is a SOAP request or a SOAP response. In this example, the value "Request" indicates that it is a SOAP request or a SOAP message containing a command.

Moreover, the "SOAPAction" header, indicating what is in the SOAP request, in this example indicates what is in the request by a URI (Uniform Resource Identifier) being "http://www. . . . ". It is noted that as the "SOAPAction" header is not added when the SOAP message is a SOAP response, it is also possible to determine at the message receiving-side whether the SOAP message is a SOAP request or a SOAP response based on whether there is this header.

Then, as an attribute of the "Envelope" tag, name spaces are declared. Moreover, herein other than the name spaces defined as the standard in SOAP, the name spaces specified with URIs "http://www.example.com/header" and "http://www.example.com/maintenance/server" are declared. Therefore, it is known that a XML tag with a name-space prefix "n" is a tag belonging to a name space specified with the URI "http://www.example.com/header" while a XML tag with a name-space prefix "ns" is a tag belonging to a name space specified with the URI "http://www.example.com/maintenance/server".

Moreover, the SOAP header "12345" being the ID of this terminal-apparatus command is what is in the "request ID" XML tag.

In the SOAP body is information specifying a method to be called in the intermediary server 102 the "error report" tag (corresponding to "method name" and indicates command type) just below the "Body" tag and as elements of the tags "error ID" and "description" there below arguments (corresponding to "input parameter") for calling the method. Herein what is to be reported in an error report is described.

It is noted that the message-distribution means 47 of the intermediary server 102 is to recognize according to the command type that the command described in this part is to be executed at the intermediary server 102. Therefore, this part does not provide the destination or the forwarding-destination of the command and there is no need to recognize at the image-processing apparatus 100 side which apparatus this command is to be eventually executed at.

FIG. 21 illustrates an example part of a response to the terminal-apparatus command illustrated in FIG. 20.

In this example, first, the value "Response" of the "X-SOAP Type" header of the entity-header part indicates that the SOAP message in this part is a SOAP response or a SOAP message providing a command response.

Moreover, also in this example, name-space declarations are the same as in the example illustrated in FIG. 20. Moreover, in the SOAP header "12345" being the ID of the terminal-apparatus command which generated the response is what is in the "command ID" XML tag.

In the SOAP body are provided the "error-report response" tag (indicating command-response type) just below the "Body" tag that is as an indication of a response to the "error report" command and as elements of the tags there below what is in the command response. Herein information on the fact that the error report has been successfully received is provided. Then, this information, as described below, is stored in the "output parameter" item of the terminal-apparatus command-sheet in the image-processing apparatus 100.

In this distributed-processing system, as there is no need to recognize at the image-processing apparatus 100 side which apparatus this command response was generated at, the source of the command response is not described in this part.

FIG. 22 illustrates an example description of a part for transferring from the image-processing apparatus 100 to the intermediary server 102 a terminal-apparatus command for a processor server (a sales-management server) 103*a*.

Also in this example, as in the case of FIG. 20, the value "Request" of the "X-SOAP Type" header indicates that the SOAP envelope in this part is a SOAP request and the "SOAPAction" header information indicates what is in the SOAP request.

Moreover also as in the case of FIG. 20, as an attribute of the "Envelope" tag, name spaces are declared. Then herein, other than the name spaces defined as the standard in SOAP, the name spaces specified with URIs "http://www.example.com/header" and "http://www.example.com/sales/server" are declared.

In the SOAP header "12346" being the ID of this image-equipment command is what is in the "request ID" XML tag.

In the SOAP body is information specifying a method to be called in the processing server 103*a* the "order paper" tag just below the "Body" tag and as elements of the tags "product name" and "quantity" there below arguments for calling the method. Herein the specifics of paper ordered are described.

It is noted that the message-distribution means 47 of the intermediary server 102 is to recognize according to the command type that the command described in this part is to be transferred to the processing server 103*a*. Therefore, this part does not provide the destination or the forwarding-destination of the command and there is no need to recognize at the image-processing apparatus 100 side which apparatus this command is to be eventually executed at.

FIG. 23 illustrates an example description of a part for transferring from the intermediary server 102 to the processor server 103*a* a command illustrated in FIG. 22 As this part is for transferring to the processing server 103*a* the same command as what is illustrated in FIG. 22, it provides almost the same contents as the part illustrated in FIG. 22. However, in the entity-header portion is added a "X-Received-From" header providing therein information indicating that the command described in this part has been transmitted from "Client A" (to be the image-processing apparatus 100). Then, this information is used for designating a transfer route for returning a command response after a command is executed.

Moreover, while information identifying the image-processing apparatus 100 being the command source is provided herein, when a command is transferred over a multiple number of apparatuses, a "X-Received-From" header is sequentially added for each transfer so that information identifying an apparatus being the command source is provided at the top-most level while information identifying an apparatus being the latest forwarding source as viewed from the apparatus which generated the part is provided at the bottom-most level.

It is noted that also herein, there is no need to provide in this part the destination of the command. The reason is that the intermediary server 102 only recognizes the forwarding-destination to transfer the command to next and there is no need to recognize which apparatus the command is to be eventually transferred to.

FIG. 24 illustrates an example description of a part for transferring from the processing server 103a to the intermediary server 102 a response to the terminal-apparatus command for the processing server 103a.

Also in this example, as in the case of FIG. 21, the value "Response" of the "X-SOAP Type" header of the entity-header portion indicates that the SOAP message in this part is a SOAP response.

Moreover, in the "X-Send-To" header is provided a transfer route for transferring the command response beyond the intermediary server 102. Herein while information identifying the image-processing apparatus 100 to be the eventual destination is provided, when the transfer route extends over a multiple number of apparatuses, multiple "X-Send" headers are provided so as to sequentially provide therein information identifying apparatuses for the route, providing at the bottom-most level information identifying an apparatus to be the next forwarding destination and providing at the top-most level information identifying an apparatus to be the eventual destination.

Moreover, also in this example, name-space declarations are the same as in the example illustrated in FIG. 22. Moreover, in the SOAP header "12346" being the ID of the terminal-apparatus command which generated the response is described what is in the "command ID" XML tag.

In the SOAP body are provided the "order paper response" tag just below the "Body" tag that is an indication of a response to the "order paper" command and as elements of the tags there below what is in the command response. Herein information on the fact that the paper order was successfully received and information for reporting the charges are provided.

In this distributed-processing system, as there is no need to recognize at the intermediary server 102 side which apparatus the command response is generated at, the source of the command response is not described in this part.

FIG. 25 illustrates an example description of a part for transferring from the intermediary server 102 to the image-processing apparatus 100 a command response illustrated in FIG. 24.

As this part is for transferring to the image-processing apparatus 100 a command response which is the same as what is illustrated in FIG. 24, almost the same contents as what are in the part illustrated in FIG. 24 are provided therein. However, since there is no longer a need for information on the transfer route to transfer to the image-processing apparatus 100, the "X-Send-To" header of the entity-header portion is deleted.

FIG. 26 illustrates an example part of an intermediary-server command to the image-processing apparatus. Also in this example, as in the case of FIG. 20, the value "Request" in the "X-SOAP Type" header indicates that the SOAP envelope in this part is a SOAP request while the "SOAPAction" header information indicates what is in the SOAP request. As it is possible to directly transfer a command from the intermediary server 102 to the image-processing apparatus 100, the "X-Send-To" header indicating the transfer-route information is not included.

Then, as in the case of FIG. 20, name spaces are declared as an attribute of the "Envelope" tag. Moreover herein, other than the name spaces defined as the standard in SOAP, the name spaces specified with URIs "http://www.example.com/header" and "http://www.example.com/maintenance/client" are declared.

In the SOAP header "98765" being the ID of this intermediary-server command is what is in the "request ID" XML tag.

Then, in the SOAP body is provided information specifying a method to be called in the image-processing apparatus the "temperature-sensor value acquisition" tag just below the "Body".tag and as elements of the tags "sensor ID" there below arguments for calling the method. Herein an ID of a sensor for acquiring the sensor value is provided.

Moreover, as a provision is made for recognizing at the image-processing apparatus 100 that it suffices for the time being to transmit to the intermediary server 102 a command response to a command received, the part does not include information on the command source.

FIG. 27 illustrates an example response to the intermediary-server command illustrated in FIG. 26.

Also in this example, as in the case of FIG. 21, the value "Response" of the "X-SOAP Type" header of the entity-header portion indicates that the SOAP message in this part is a SOAP response.

Moreover, in the processing server 103a, command transfer-route and destination can be recognized with a transfer route for transferring beyond the intermediary server 102 a command being described in the "X-Send-To" header as in the case of FIG. 24.

Moreover, also in this example, name-space declarations are the same as in the example illustrated in FIG. 26. Then, in the SOAP header "98765" being the ID of the intermediary-server command which generated the response is as what is in the "command ID" XML tag.

In the SOAP body are the "temperature sensor value acquisition response" tag just below the "Body" tag that is an indication of a response to the "temperature sensor value acquisition" command and as elements of the tags there below what is in the command response. Herein information on the temperature value indicated by a sensor to which value acquisition is requested is included.

It is noted that the message-distribution means 47 of the intermediary server 102 is to recognize according to the command response type that the command response in this part is to the processing-server command and is to be made to an intermediary-server command and to be destined for the intermediary server 102. Therefore, there is no need in this part to include the destination or the forwarding-destination of the command response and there is no need to recognize at the image-processing apparatus 100 side which apparatus this command response is to be eventually transferred to.

FIG. 28 illustrates an example of a part for transferring from the processing server 103a to the intermediary server 102 a processing-server command for the image-processing apparatus.

Also in this example, as in the case of FIG. 20, the value "Request" of the "X-SOAP Type" indicates that the SOAP envelope in this part is a SOAP request, and the "SOAPAction" header information indicates what is in the SOAP request.

Moreover, as an attribute of the "Envelope" tag, name spaces are declared as in the case of FIG. 20. Then herein, other than the name spaces defined as the standard in SOAP, the name spaces specified with URIs "http://www.example.com/header" and "http://www.example.com/sales/client" are declared.

In the SOAP header "77777" being the ID of this processing-server command is what is in the "request ID" XML tag.

In the SOAP body is information specifying a method to be called in the image-processing 100 the "new-product information report" tag just below the "Body" tag and as elements of the tags "product name" and "unit price" there below arguments for calling the method. Herein a product name and a unit price of a new product are included.

As described below, as it is possible for the intermediary server 102 to transfer a command response to an appropriate forwarding destination even when it is not known as to where the command has been transmitted from, this part does not include information on the command source.

FIG. 29 illustrates an example of a part for transferring from the intermediary server 102 to the image-processing apparatus 100 the processing-server command illustrated in FIG. 28.

As this part is for transferring to the image-processing apparatus 100 a processing-server command which is the same as what is illustrated in FIG. 28, almost the same contents as what are in the part illustrated in FIG. 28 are included. However, as there is no longer a need for information on the transfer route to transfer to the image-processing apparatus 100, the "X-Send-To" header of the entity-header portion is deleted.

As a provision is made at the image-processing apparatus 100 side to recognize that it suffices for the time being to transmit to the intermediary server 102 a command response to a command received and as there is no need to recognize where the command response is transferred to thereafter, this part does not include information on the command source.

FIG. 30 illustrates an example of a part for transferring from the image-processing apparatus 100 to the intermediary server 102 a response to the processing-server command as illustrated in FIG. 28.

Also in this example, as in the case of FIG. 21, the value "Response" of the "X-SOAP Type" header of the entity-header portion indicates that the SOAP message in this part is a SOAP response.

Moreover, also in this example, name-space declarations are the same as in the example illustrated in FIG. 28. Moreover, in the SOAP header "77777" being the ID of the processing-server command which generated the response is what is in the "command ID" XML tag.

In the SOAP body are the "new product information report response" tag just below the "Body" tag that is as an indication of a response to the "new product information report" command and as elements of the tags there below what is in the command response. Herein information on the fact that the report was successfully accepted is included.

It is noted that the message-distribution means 47 of the intermediary server 102 is to recognize according to the command response type that the command response described in this part is to be transferred to the processing server 103a. Therefore, this part does not include the destination or the forwarding-destination of the command response and there is no need to recognize at the image-processing apparatus 100 side which apparatus this command response is to be eventually transferred to. Moreover, there is no need for the intermediary server 102 to recognize which apparatus this command response is eventually transferred to.

FIG. 31 is an example of a part for transferring from the intermediary server 102 to the processing server 103a the command response illustrated in FIG. 30.

As this part is for transferring to the processing server 103a a command response which is the same as what is described in FIG. 30, the same contents as the part illustrated in FIG. 30 are provided. While the "X-Received-From" header is added in the entity-header portion as in the case of FIG. 23, as there is no need for a response to the command response to be returned, herein this description is not mandatory. The fact that the destination of the command response is not included in the part is the same as in the case of FIG. 23.

Next, flowcharts in FIGS. 32 through 41 are used to describe the process executed in the intermediary server 102 having the configuration and function as described above. The process illustrated in these flowcharts is to be performed by the CPU of the control apparatus 125 (to refer to this CPU whenever just "CPU" is referred to in the explanations of FIGS. 32 through 41 unless otherwise noted) executing required control programs.

Figure 32:
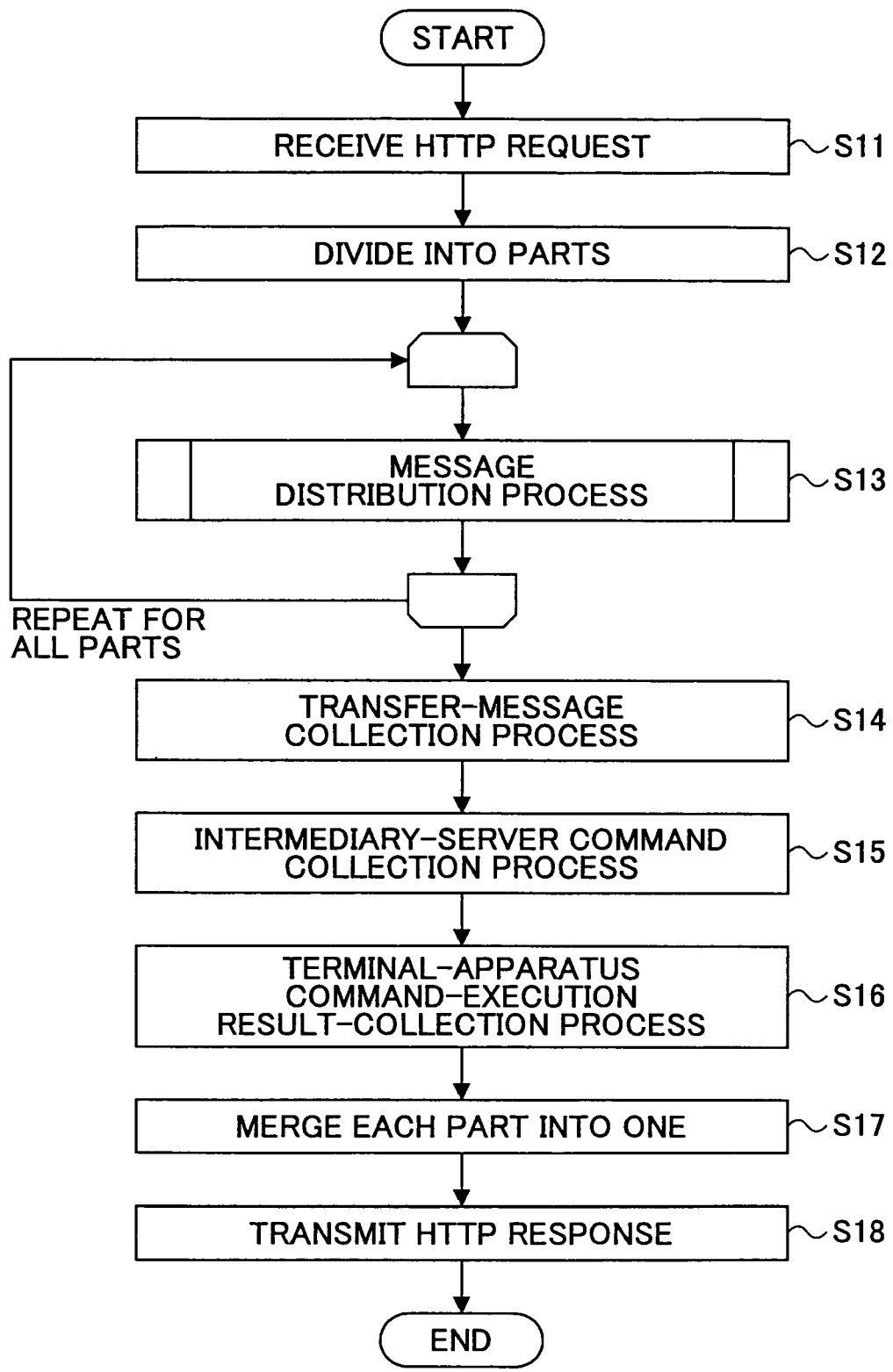
FIG. 32 is a flowchart illustrating a basic operation in the intermediary server illustrated in FIG. 3 of the process of collecting and distributing messages in communication with the image-processing apparatus.

First, FIG. 32 illustrates a flowchart of a basic operation of the process of collecting and distributing messages.

When a HTTP request is transmitted from the image-processing apparatus 100, the CPU starts the process illustrated in the flowchart in FIG. 32.

Then, first the HTTP request is received from the image-processing apparatus 100 (S11) and the HTTP body of the received request is divided into each part (S12). Here the dividing into to each part is to divide into elements divided by "MIME_boundary" and here the dividing is done for all parts.

Thereafter, the message-distribution process in S13 is repeated sequentially for all parts obtained by dividing. Then, at the time the process is done for all parts the process proceeds to step S14.

In the process up to here, the set of steps S11 and S12 is a first receiving procedure in which the CPU functions as HTTP-request receiving means 46b. Moreover, in step S13, the CPU functions as message-distribution means 47.

The process of step S14 and beyond is the process related to the transmission of a HTTP response to the image-processing apparatus 100. Then, in this process, first the CPU performs a transfer-message collection process (S14). This process which is for collecting messages to be transferred from the receiving transfer-message pool 52 to the image-processing apparatus 100 includes a process for generating from a message collected a part related to transferring.

Thereafter, an intermediary-server command-collection process is performed (S15). This process which is for collecting an intermediary-server command to be transmitted from the intermediary-server command-pool 42 to the image-processing apparatus 100 includes a process of generating from data collected a part with the SOAP envelope.

Thereafter, parts generated in steps S14 through S16 are merged into one so that a HTTP response including all the parts is generated (S17) and the HTTP response is transmitted to the image-processing apparatus 100 (S18). It is noted that the process in steps S14 through S16 may be in random order.

In the process up to here, the CPU functions as the message-collection means 45 in steps S14 through S16. Moreover, a set of steps S17 and S18 is a second transmission procedure process in which the CPU functions as the HTTP-response transmitting means 46a.

Next, flowcharts illustrating per portion in more detail are used to describe the process illustrated in the flowchart in FIG. 32.

Figure 33:
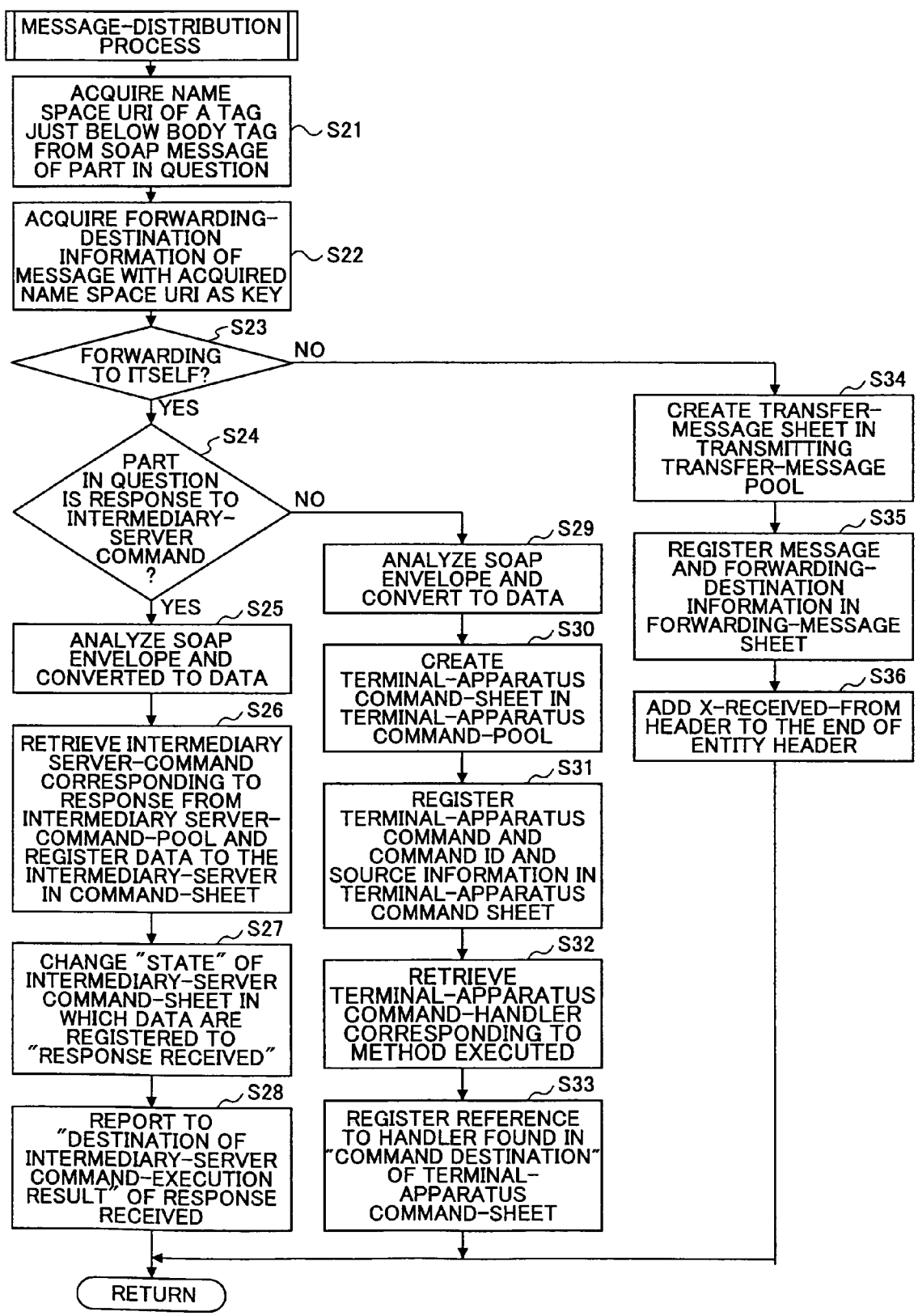
FIG. 33 is a flowchart illustrating the message-distribution process illustrated in FIG. 32.

FIG. 33 is a flowchart illustrating in more detail what is in the message-distribution process illustrated in FIG. 32.

In this process, the CPU first acquires a name space URI just under the Body tag from the SOAP message of the part in question (S21). As illustrated in the examples in FIGS. 20 through 31, in the SOAP message in a tag just below the Body tag a tag indicating the type of a command or command response is provided. Moreover, in this tag is provided a name-space prefix (for example, "ns" in the case of FIG. 20) so that a name-space URI of the tag may be acquired from the name-space prefix and what is defined for the name space in the "Envelope" tag. Moreover, as the name space URI is used for grouping tags, it is possible to consider that commands or command responses having the same name space URIs are commands or command responses belonging to the same group.

Next, with the obtained name-space URI as the key, the forwarding-destination table stored in the forwarding-destination information-storing means 50 is searched and information on the forwarding destination of the message of the part in question is acquired (S22).

FIG. 34 illustrates an example of this forwarding-destination table.

As illustrated in this figure, the forwarding-destination table stores therein per name-space URI information on the forwarding-destination of a command or command response belonging to the name space. Then, its is preferable that the forwarding-destination information be stored as an IP address or a host name. Here, there is as a matter of course no harm in assigning the same forwarding destination to different name-space URIs.

Then, searching this table with the name-space URI acquired in step S21 as the key makes it possible to acquire a forwarding destination of the message of the part in question. Here, there is no need to distinguish as to whether the message of the part in question is related to a command or a command response. For example, when the part in question is the part as illustrated in FIG. 20, as the tag just under the "Body" tag belongs to the name space "http://www.example.com/maintenance/server", it is known that the forwarding destination of the message related to the part is the intermediary server 102 itself. It is noted that preferably an error process is performed when the name-space URI is not included in the forwarding-destination table.

Next, whether the forwarding destination acquired in step S22 is the intermediary server 102 (itself) or not is determined. Then, when it is determined to be itself, it is known that the part in question is a response to an intermediary-server command or a terminal-apparatus command to be executed by the intermediary server.

Then, it is determined as to which of the two described above the part in question is. FIG. 33 S24 determines whether it is a response to an intermediary-server command. Then, this determination may be performed according to whether the "SOAPAction" header exists in the part in question or according to what is in the "X-SOAP-Type".

Then, when it is a response to an intermediary-server command, the process related to registering the response is performed in steps S25 through S28.

In other words, first the SOAP envelope of the part is analyzed so as to convert the data into a format which can be registered in an intermediary-server command sheet (S25), then an intermediary-server command corresponding to the response is retrieved from the intermediary-server command-pool 42 and response data are registered in the "output parameter" item of the intermediary-server command-sheet for the intermediary-server command (S26). It is noted that there is to be a command ID which is the same as what is added at the time of transmitting the intermediary-server command added as "command ID" information so that it is possible to perform the search of the intermediary-server command with this information as the key.

When the data registration is finished, the "state" of the intermediary-server command-sheet registering therein data is changed to "response received" so that the fact is indicated (S27). Then, the fact that there is a response is reported to the destination registered in the "destination of command execution result" (S28). This reporting makes it possible for the application, etc., which generated the intermediary-server command to recognize that there is a response to the command it generated and perform the process according to the response.

For example, when an application dealing with an error taking place at the image-processing apparatus 100 generates an intermediary-server command for acquiring the sensor value of the temperature sensor of the image-processing apparatus 100, once this command is transmitted to the image-processing apparatus 100, the image-processing apparatus 100 returns a command response including the sensor value. Then, at the intermediary server (equipment-management server) 102 side, once this command response is received, which intermediary-server command the response is to is confirmed based on the command ID included therein and the command response in correspondence with the intermediary-server command found is registered. Then, the fact that there is a response is reported to the application dealing with the error taking place that is registered as the destination of the command-execution result. The application referring to the intermediary-server command-sheet when receiving this report can acquire the execution result of the command generated from the "output parameter" item.

Once the process up to step S28 as described above is finished, the process of FIG. 33 is finished so as to return to where it came from.

Moreover, the part in question, when it is not a response to the intermediary-server command in step S24, is a terminal-apparatus command to be executed by the intermediary server, and the process related to registering the command is performed in steps S29 through S33.

In other words, first the SOAP envelope of the part is analyzed so as to convert to data in a format which can be registered in a terminal-apparatus command sheet (S29), a terminal-apparatus command sheet for registering the terminal-apparatus command is created in the terminal-apparatus command-pool 41 (S30) and a terminal-apparatus command, a command ID, and the source information are registered in the terminal-apparatus command-sheet (S31).

Here, what is in the terminal-apparatus command is registered in the "method name" and "input parameter" of the terminal-apparatus command-sheet while the command ID described in the part is registered in the "command ID". Moreover, as for the "source information", source information on the HTTP request described in the part in question may be acquired for registering. Furthermore, when there is a "X-Received-From" header in the entity header of the part in question, the contents are also registered as transfer-route information. In addition, the initial value of the "state" is "unprocessed" while the initial value of the "output parameter" is NULL.

Then, once the registering with the items as described above is finished, reference information to a handler (terminal-apparatus command-handler 43a) for executing a method stored in "method name" of the terminal-apparatus command sheet is searched with reference to information on the correspondence between the method and the handler provided in advance (S32) and the reference information found is registered in the item "command destination" of the terminal-apparatus command-sheet.

Once the process up to step S33 as described above is finished, the process in FIG. 33 is terminated so as to return to where it came from.

Moreover, when the forwarding destination is not itself in step S23, as the message of the part in question is to be transferred, the process related to registering transfer messages is performed in steps S34 through S36.

In other words, first a transfer-message sheet for registering the message is created in the transmitting transfer-message pool (S34), and a message and forwarding-destination information on the message are registered in the transfer message sheet (S35).

Here, the entity header of the part in question is registered as it is in the item "entity-header information" and what is in the SOAP envelope is registered as it is in the item "XML data of message". Moreover, as for the "forwarding-destination information", information acquired in step S22 is registered.

Then, once the registering into the items as described above is finished, at the end of the entity header registered in the "entity-header information", a "X-Received-From" header is added and source information on the HTTP request in which the part in question is described is provided as the source information on the message (S36).

When the process up to and including S36 as described above is finished, the process in FIG. 33 is terminated so as to return to where it came from.

While the process returns to the process in FIG. 32 when the process in FIG. 33 is finished, as illustrated here, when there is a next part the process in FIG. 33 is to be repeated for that part.

Next, in FIG. 35, the transfer-message collection process illustrated in step S14 in FIG. 32 is illustrated in more detail.

In this process, the CPU first collects in the bottom-most level of the "X-Send-To" header from the receiving transfer-message pool 52 a transfer message sheet describing therein the source of the HTTP request received in step S11 in FIG. 32 (S41). It is noted that information registered in the transfer message sheet in the receiving transfer-message pool 52 is as illustrated in FIG. 15 and the "X-Send-To" header is registered in the item "entity-header information" out of the items as described above.

Next, the process of step S42 and step S43 is repeated sequentially for all transfer message sheets collected in step S41.

Then, in this process, first a part of the transfer message described in the transfer message sheet in question is created (S42). This process is to add the entity header registered in the item "entity-header information" to the SOAP envelope registered in the item "XML data of message" of the sheet in question. It is noted that as there is no need to pass on to the forwarding destination apparatus the contents of the "X-Send-To" header at the bottom-most level in the entity header, a provision is made to eliminate this header.

Moreover once the creation of the part is completed, the transfer-message sheet in question is deleted from the receiving transfer-message pool 52 (S43). Then, once the process as described above is performed for all sheets collected, the process proceeds to what is illustrated in step S15 of FIG. 32.

Figure 36:
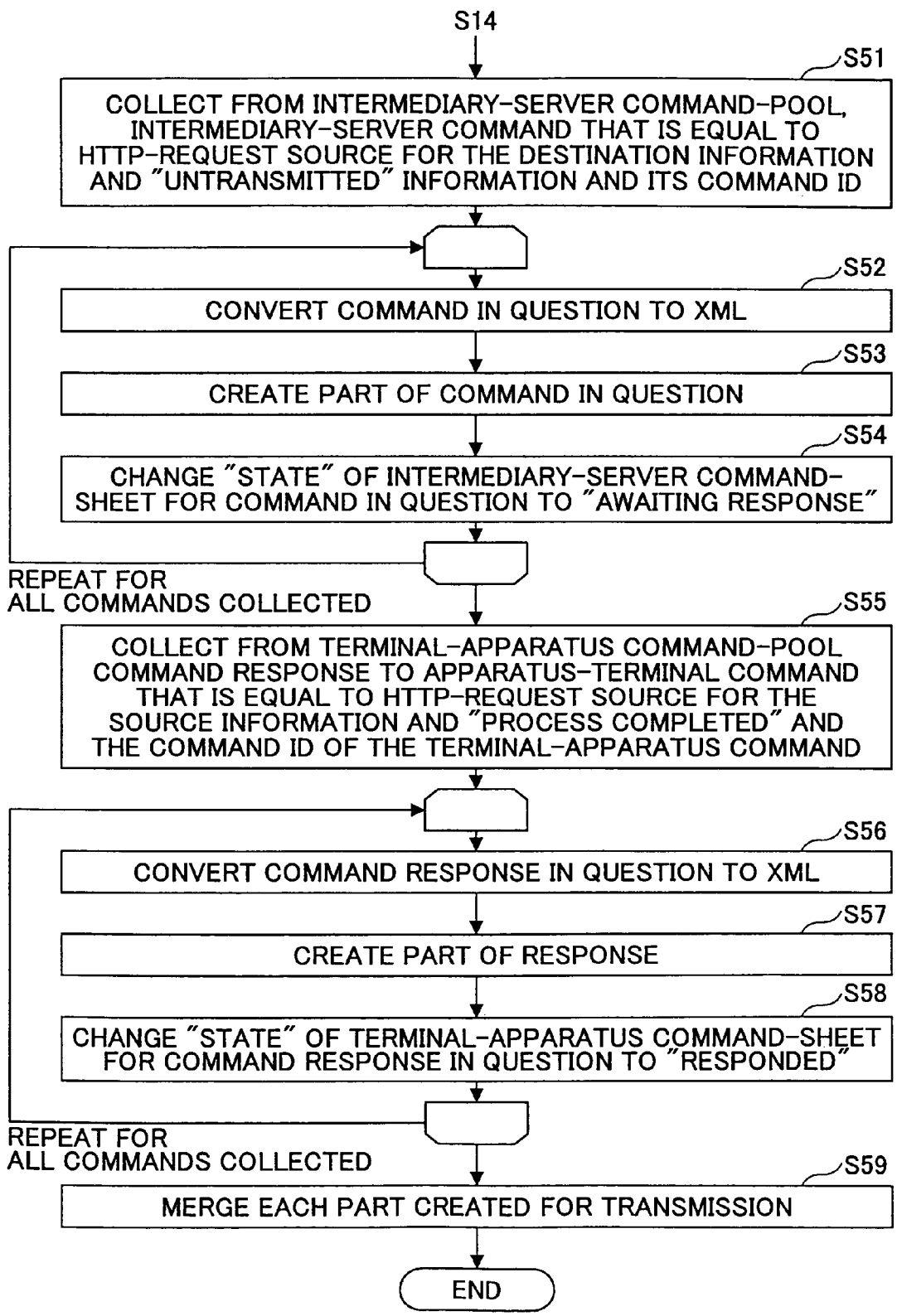
FIG. 36 is a flowchart illustrating in more detail the process in and after step S15 of FIG. 32.

Next, FIG. 36 illustrates in more detail the process in and after step S15 of FIG. 32.

In this process, the CPU first collects from the intermediary-server command pool 42 as an intermediary-server command to be transmitted the contents of "method name" and "input parameter" of the intermediary-server command-sheet which is equal to the source of the HTTP request received in step S11 of FIG. 32 in the destination information and is "untransmitted" in "state", and also collects the contents of "command ID" as the command ID of the command (S51). The "state" being "untransmitted" that indicates that the command is not yet transmitted to the image-processing apparatus 100 after it is generated by the intermediary-server command-generating means 44 so that a command to be transmitted to the image-processing apparatus 100 may be extracted based on the above.

Thereafter, the process of steps S52 through S54 are sequentially repeated for all intermediary-server commands collected in step S51. In this part of the process, first the intermediary-server command in question and the command ID are converted to a XML document (SOAP envelope) in which these information sets are respectively contained in the SOAP body and SOAP header (S52) and an entity header is added thereto so that a part related to the command in question is generated (S53). Then, the "state" of the intermediary-server command-sheet in which the intermediary-server command in question is described is changed to "awaiting response" (S54). The "state" being "awaiting response" indicates that the command has already been transmitted to the image-processing apparatus 100.

Then once the process as described is performed for all intermediary-server commands collected, the process proceeds to step S55.

Here, the CPU collects from the terminal-apparatus command-pool 41 what is to be transmitted out of command responses to terminal-apparatus commands the contents of "output parameter" of the terminal-apparatus command-sheet which is equal to the source of the HTTP request received in step S11 of FIG. 32 in the destination information and is "process completed" in "state", and also collects the contents of "command ID" as the command ID of the corresponding terminal-apparatus command (S55). In the intermediary server 102, the "state" being "process completed" that indicates that the process corresponding to the terminal-apparatus command is not yet reported to the image-processing apparatus 100 after it is generated by the terminal-apparatus command-execution result-generating means 43 so that a command response to be transmitted to the image-processing apparatus 100 may be extracted based on the above.

Thereafter, the process of steps S56 through S58 are sequentially repeated for all command responses collected in step S55. In the process as described above, first the command response in question and the command ID collected together with the response are converted to a XML document (SOAP envelope) in which these information sets are respectively contained in the SOAP body and SOAP header (S56), and an entity header is added thereto so that a part related to the command in question is generated (S57). The process as described above is the same as the process of steps S52 and S53 except that what are to be processed are different. Then, next the "state" of the terminal-apparatus command-sheet in which the command response in question is described is changed to "responded" (S58). The "state" being "responded" indicates herein that the command response has already been reported to the image-processing apparatus 100.

Then after the process up to here is completed in its entirety, the CPU merges each part generated in step S53, S55 or step S42, generates a multi-part HTTP response as illustrated in FIG. 17 so as to transmit it to the image-processing apparatus 100 (S59) and finishes the process.

As described above, performing the process of distributing and collecting messages as described using FIGS. 32 and 36 makes it possible for the intermediary server 102 to collectively receive from the image-processing apparatus 100 multiple operational requests and operational responses and also to automatically recognize appropriate forwarding destinations even when there are no destinations provided therein and handle according to the forwarding destinations.

Moreover, the process as described above makes it possible to collectively transfer to the image-processing apparatus 100 multiple operational requests to be transferred to the image-processing apparatus 100 that are generated by itself or received from other apparatuses.

It is noted that the change in the "state" that is performed in step S54 or S58 may be done after actually finishing the transmission. In this way, it becomes possible to set a command and a command response which have been planned for transmission to be transmitted once again even when a communications error takes place so that the system reliability is improved. The same holds for deleting the transfer-message sheet performed in step S43 in FIG. 35.

Moreover, while herein an explanation is made such that a provision is made for merging for transmission after generating all parts to be transmitted and for dividing into each part for processing after receiving all parts, there is no need to set the process in this way.

As for transmission, a provision may be made such that first a HTTP header is transmitted and, each time a part is generated, the part is sequentially transmitted, and, once transmission of all the parts have been completed, data on the fact are transmitted. Even in this way, when the data set transmitted in the processes described above is one HTTP response which is a logical continuation having only one HTTP header, transferring is possible in one session and the negotiation process is needed only once so that the same advantages as in the case of merging for transmission may be obtained. Moreover, the memory capacity required for buffering data to be transmitted may be reduced so that a large amount of data may be handled with a low-cost communications apparatus.

Moreover, even at the receiving side, a provision may be made such that the process for each part is sequentially performed whenever each part is received. The fact that the memory capacity may be reduced in such a case as described above is the same as at the transmitting side.

Next, a process regarding an execution of a terminal-apparatus command is described.

Figure 37:
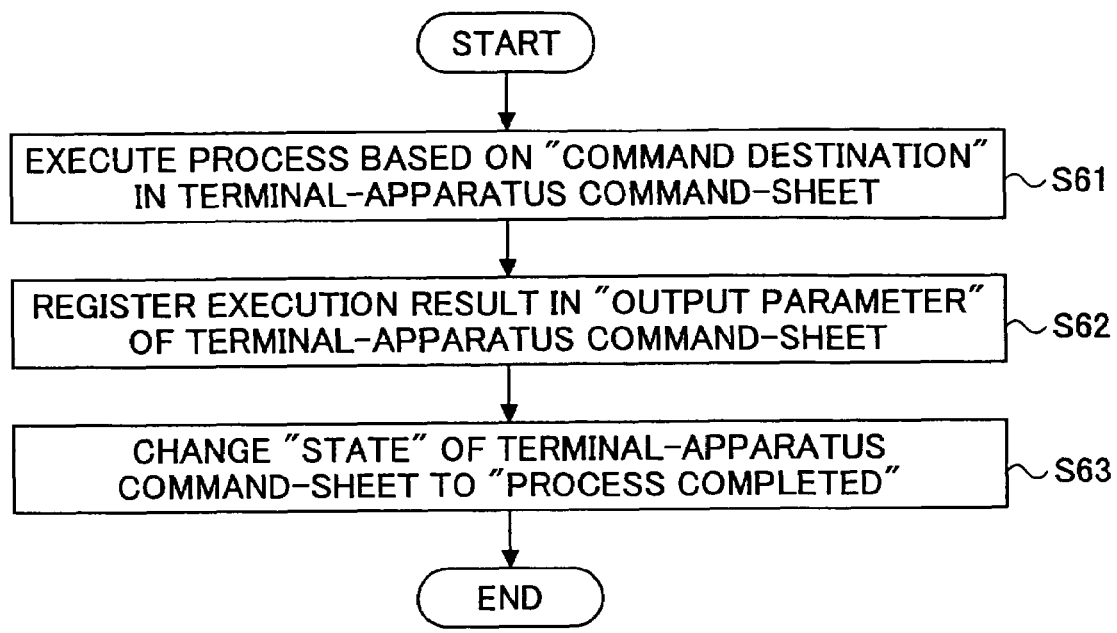
FIG. 37 is a flowchart illustrating an example process regarding execution of a terminal-apparatus command in the intermediary server illustrated in FIG. 3.

FIG. 37 illustrates one example of the process as described above.

As the process regarding the execution of the terminal-apparatus command, it is possible that first the process illustrated in the flowchart in FIG. 37 is performed after the process of step S33 illustrated in FIG. 33 or immediately after registering in the terminal-apparatus command-pool 41 the terminal-apparatus command. In the process as described above, the CPU functions as terminal-apparatus command-execution result-generating means 43.

Then, in the process as described above, first an application, etc., is called based on information in "destination of command" of the terminal-apparatus command sheet for the terminal-apparatus command registered, and data in "method name" and "input parameter" are delivered so as to have the process related to the terminal-apparatus command executed (S61). It is noted that the process itself which is related to the terminal-apparatus command, though not illustrated in this flowchart, is to be separately executed by the CPU using the handler.

Then, once this is completed, the execution result is acquired so as to be registered in the "output parameter" item of the terminal-apparatus command-sheet (S62), the "state" of the terminal-apparatus command-sheet is changed to "process completed", and the fact that the process is completed is indicated (S63). Performing the process as described above makes it possible to execute a terminal-apparatus command and to allow for transmitting to the image-processing apparatus 100 as a command response the result of the execution.

Figure 38:
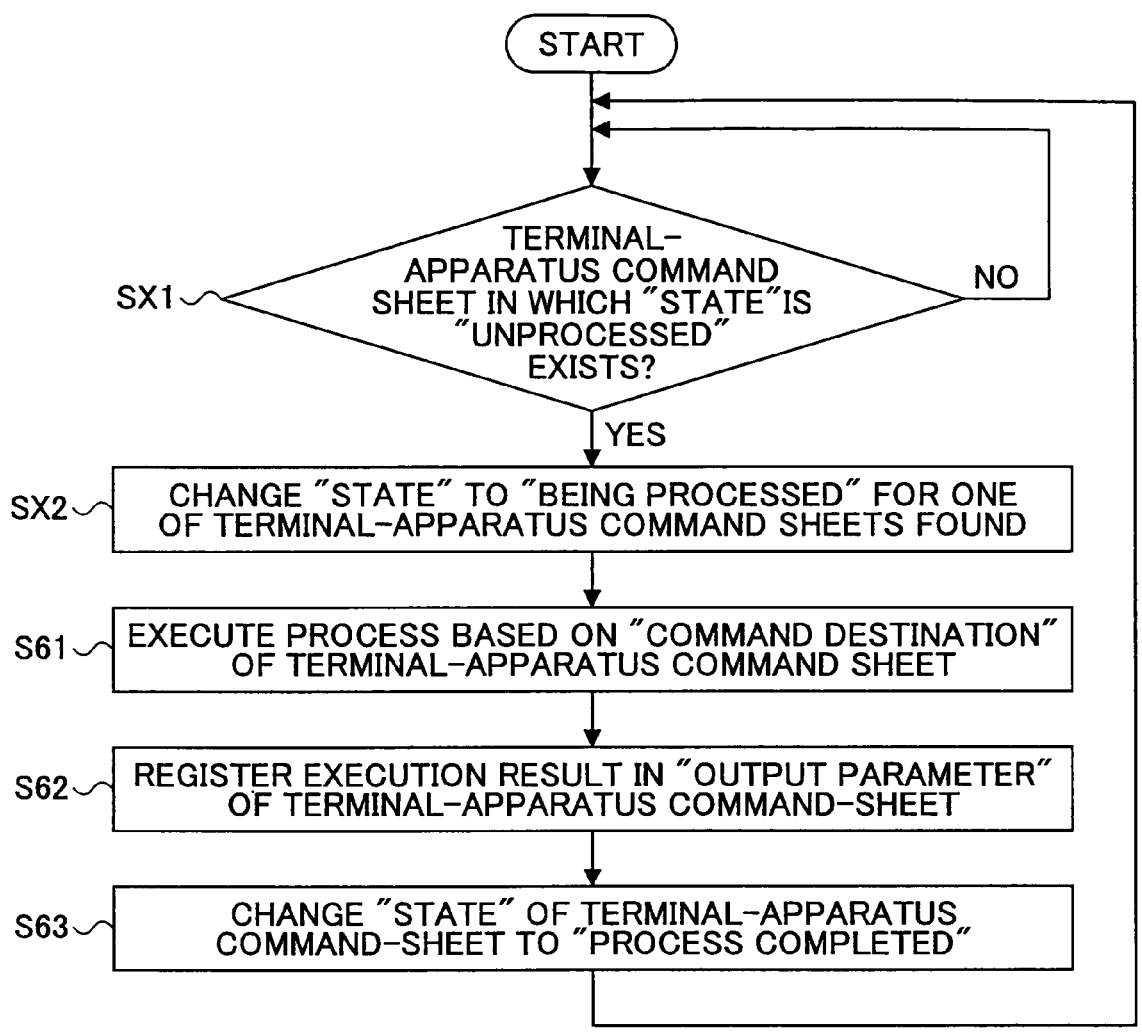
FIG. 38 is a flowchart illustrating another example process regarding the execution of the terminal-apparatus command in the intermediary server illustrated in FIG. 3.

Moreover, as the process regarding the execution of the terminal-apparatus command, a provision may be made for performing the process illustrated in FIG. 38 independently from the process related to the transmission/reception of messages with the image-processing apparatus 100 illustrated in FIG. 32. Even in this process, the CPU functions as terminal-apparatus command-execution result-generating means 43.

This process is for the CPU to initiate at the time of starting up the intermediary server 102. Then, in this process, first it is determined whether there is in the terminal-apparatus command-pool 41 a terminal-apparatus command sheet which is "unprocessed" in "state" (SX1) and, if not, the process stands by until such terminal-apparatus command sheet is found. It is noted that, as described above, the "unprocessed" state is the initial value of the "state" in the terminal-apparatus command sheet and indicates that the process is not specifically performed after the command registration.

When the "unprocessed" terminal-apparatus command-sheets are found in step SX1, one of them is set to be processed and the "state" of the terminal-apparatus command-sheet is changed to "being processed" (SX2).

Thereafter, the process of steps S61 through S63 which is the same as in the case of FIG. 37 is performed so as to execute the terminal-apparatus command described in the terminal-apparatus command-sheet to be processed, and once the process as described above is completed the process returns to step SX1 so as to repeat the process.

It is noted that a provision may be made for the process as described above to be simultaneously performed in multiple threads (for example, in four threads). As the "state" of the terminal-apparatus command-sheet which is what is to be processed is not "unprocessed", simultaneously processing in multiple threads does not result in setting in duplicate one terminal-apparatus command-sheet as what is to be processed.

Providing for the process as described above makes it possible to execute a terminal-apparatus command at an arbitrary timing so that, even when there is a command which takes time to execute, the subsequent process does not tie up. Then, it is possible to allow for transmitting to the image-processing apparatus as command responses the result in the order that the execution is finished.

Figure 39:
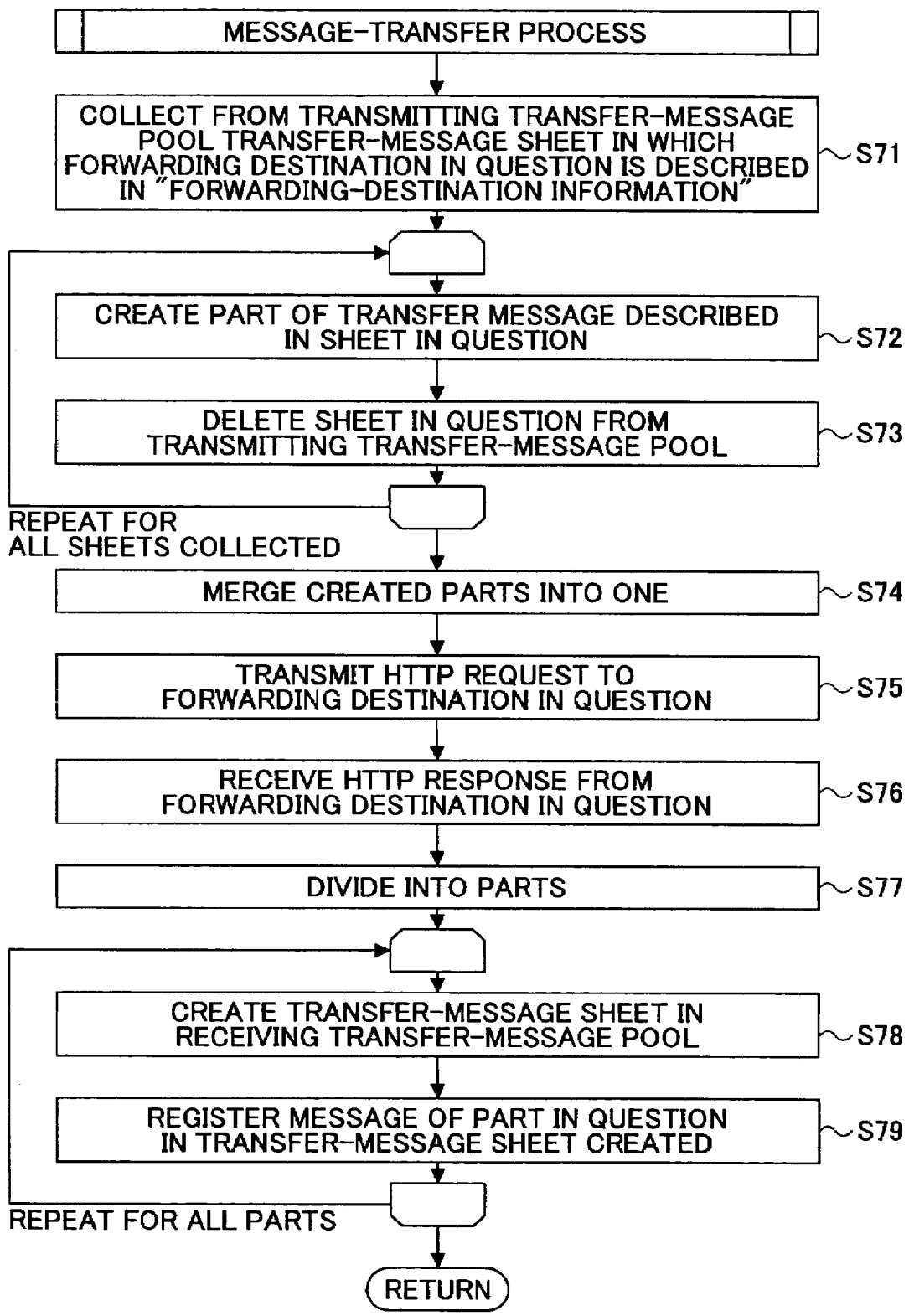
FIG. 39 is a flowchart illustrating a process of transferring messages with the processing server in the intermediary server illustrated in FIG. 3.

Next FIG. 39 illustrates a flowchart of the process related to transferring messages with the processing server. This process is for the CPU to execute for any forwarding destination (to be the processing server 103 herein) described in the forwarding-destination table illustrated in FIG. 34 at an appropriate timing.

In this process, a transfer-message sheet in which a forwarding destination in question is registered in the item "transfer-destination information" is collected (S71). Then, the process of step S72 and S73 is sequentially repeated for all transfer-message sheets collected in step S71.

Then, in the process as described above, first a part of the transfer message described in the transfer-message sheet in question is created (S72). This process is to add to the SOAP envelope registered in the item "XML data of message" of the sheet in question the entity header registered in the item "entity-header information".

Moreover, when creating the part is finished, the transfer-message sheet is question is deleted from the transmitting transfer-message pool 51 (S73). Then when the process as described above is performed for all sheets collected, the generated parts are merged into one (S74), the multi-part HTTP request as illustrated in FIG. 18 is generated so as to be transmitted to the forwarding destination in question (S75).

In the process up to here, in steps S71 through S73, the CPU functions as message-transfer means 48. Moreover, the process of the steps S74 and S75 is a first transmitting procedure process in which the CPU functions as HTTP-request transmitting means 49a.

It is noted that the fact that a provision may be made for performing the process of deleting the transfer-message sheet performed in step S73 after the transmission has actually been completed is the same as in the case of FIG. 35 S43.

Then, as a communications response to a HTTP request transmitted, a HTTP response is received from the forwarding destination in question (S76). Then the HTTP body of the HTTP response received is divided into parts (S77). Here the dividing into parts is, as in the case of step S12 in FIG. 32, to divide into elements divided by "MIME_boundary" and here the dividing is done for all parts.

Then thereafter, the process of steps S78 and S79 is sequentially repeated for all parts obtained by dividing.

In the process as described above, first a transfer-message sheet for registering therein a message in question is created in the receiving transfer-message pool 52 (S78) and the message in question is registered in the transfer-message sheet (S79). Here, the entity header of the part in question is registered as it is in the item "entity-header information" and the contents of the SOAP envelope as it is are registered in the item "XML.data of message". The "X-Send-To" header is also not deleted at this time.

Once the process as described above has been completed for all parts obtained in step S77, the process in FIG. 39 is finished.

In the process as described above, the process of steps S76 and S77 is a second receiving procedure process in which the CPU functions as HTTP-response receiving means 49b. In the steps S78 and S79, the CPU functions as message-transfer means 48.

Figure 40:
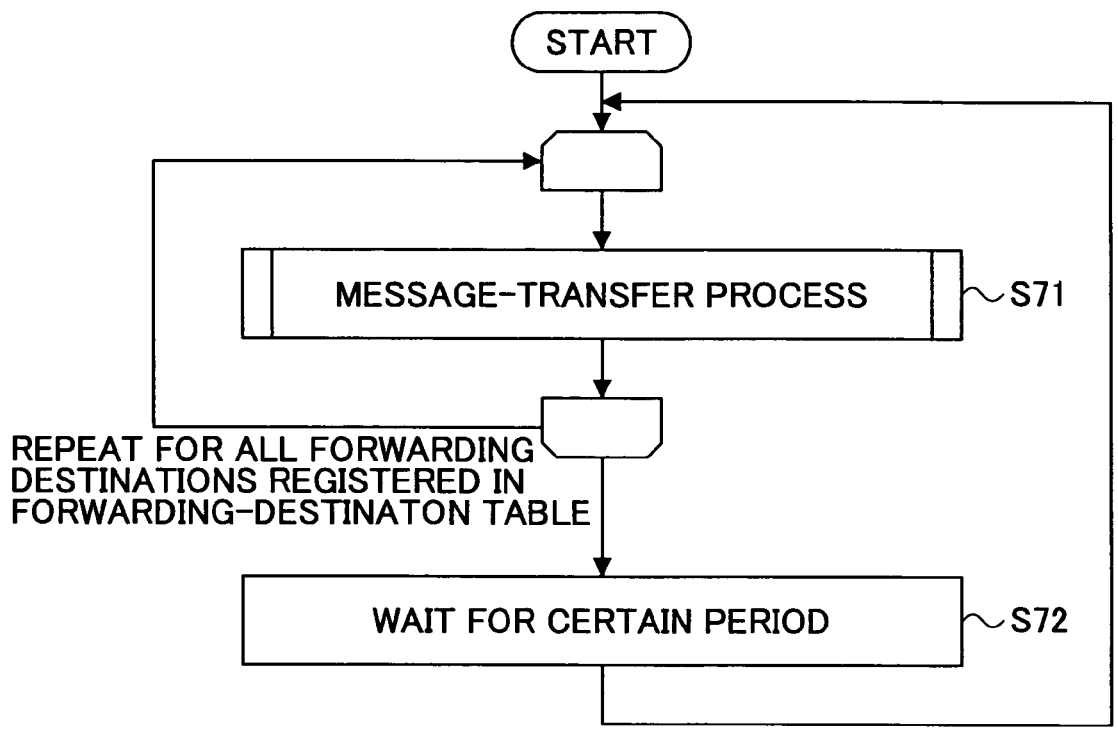
FIG. 40 is a flowchart illustrating a process of execution-timing control in the message-transfer process illustrated in FIG. 39.

Now, FIG. 40 illustrates a flowchart of a process related to execution-timing control of the message-transfer process illustrated in FIG. 39.

This process is to initiate at the time of the CPU starting up the intermediary server 102. Then, this process is to perform per predetermined period of time the message-transfer process illustrated in FIG. 39 sequentially for all forwarding destinations described in the forwarding-destination table illustrated in FIG. 34. In this case, even when the same forwarding destination appears in the forwarding-destination table multiple times, it suffices to perform the message-transfer process once for one forwarding destination.

Providing for periodically performing the message transfer process for all forwarding destinations to transfer messages to so as to transmit a HTTP request being a communications request, even when providing for communicating from the intermediary server 102 to the forwarding destination by always transmitting a communications request from the intermediary server 102 side, makes it possible to provide an opportunity to transmit information from the forwarding destination to the intermediary server 102 and to prevent information requiring transfer to the intermediary server 102 from staying in the processing server 103, etc., over a long period of time.

It is noted that as a matter of course the message-transfer process may be performed as needed at a non-periodic timing. For example, a provision may be made for, when information which needs to be transmitted urgently is registered in any pool, the message-distribution means 47 report to the message-transfer means 48 the fact so as to have the message-transfer process performed. In this way, when a command is registered, it can be transferred immediately to the forwarding destination. It is a matter of course that the message-transfer process may be performed as needed at a non-periodic timing, for example.

As described above, performing the process related to transferring of messages as illustrated in FIGS. 39 and 40 makes it possible for each of multiple forwarding destinations to collectively transfer the operational requests and operational responses to transfer to the forwarding destination, to collectively receive operational requests and operational responses to be transmitted from the forwarding destination to the image-processing apparatus 100 and to store in a state such that the respective information sets as described above can be independently transmitted to the image-processing apparatus 100.

Figure 41:
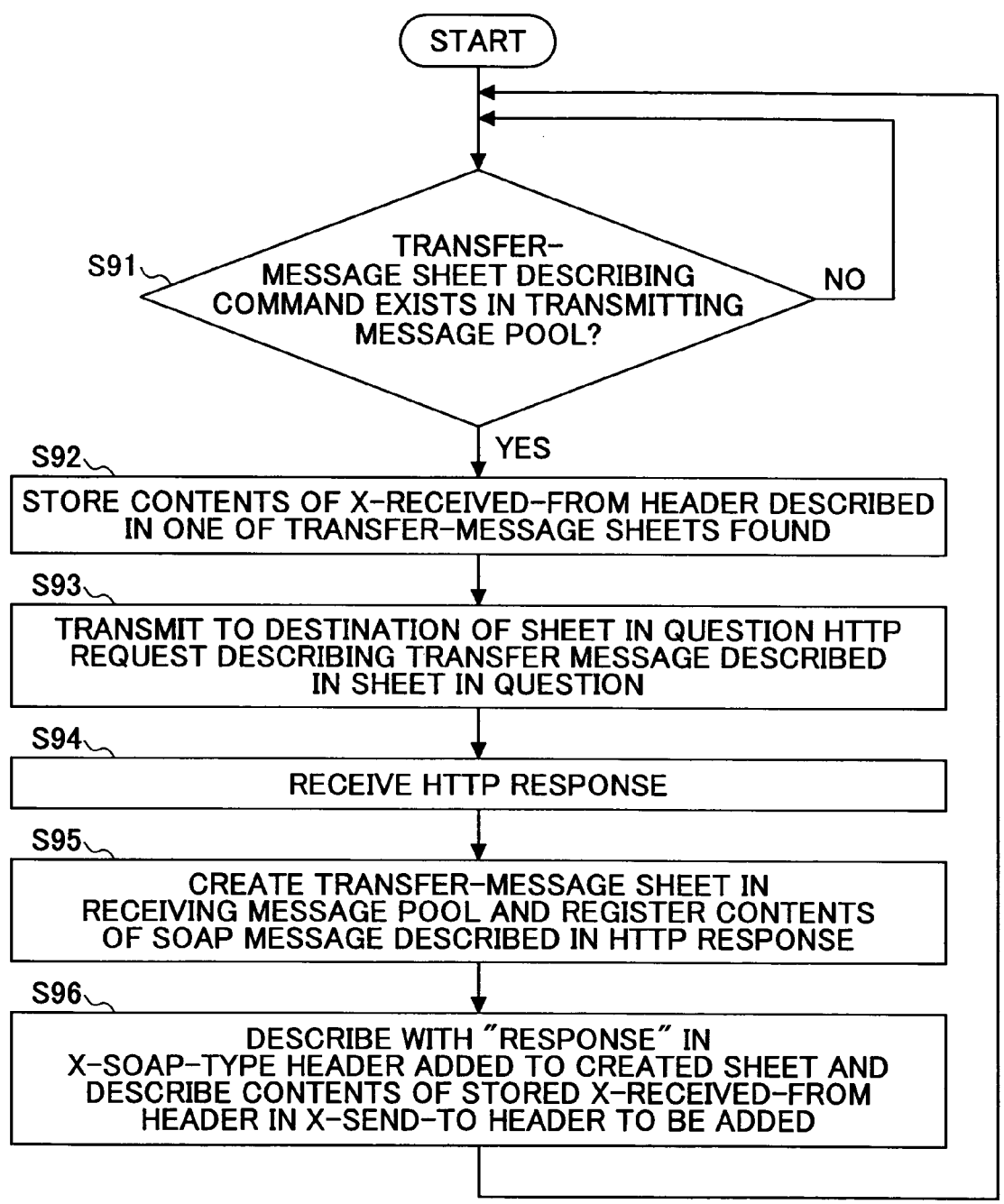
FIG. 41 is a flowchart illustrating another example process in transferring a terminal-apparatus command in the intermediary server illustrated in FIG. 3.

It is noted that, in a case such that it suffices to handle only commands from the image-processing apparatus 100 side, it is also possible to perform the process as illustrated in the flowchart in FIG. 41 in lieu of or in addition to the process as illustrated in FIGS. 39 and 40.

This process is to be initiated at the time of the CPU starting up the intermediary server 102 as in the case of FIG. 38. Then, in this process, first it is determined as to whether there are transfer-message sheets describing therein a command in the transmitting transfer-message pool 51 (S91) and, if not, the process stands by until such transfer-message sheet is found.

When the transfer-message sheets describing therein the command are found in step S91, one of them is set to be what is to be processed so that what is in the "X-Received-From" header described in the transfer-message sheet is stored (S92). Then, referring to the "forwarding-destination information", a HTTP request describing the transfer message (SOAP request) described in the sheet in question is transmitted to the forwarding destination (S93). It is noted that for generating the transfer message, it suffices to add a necessary HTTP header to the SOAP envelope registered in the item "XML data of message". Here, the entity-header information registered in the item "entity-header information" may be used.

Thereafter, while a HTTP response to a HTTP request transmitted is received from a forwarding destination (S94), it is to describe therein a SOAP response to a SOAP request transmitted. Then, a transfer-message sheet is created in the receiving transfer-message pool 52 and what is in the SOAP message described in the received HTTP response is registered in the transfer-message sheet created (S95). For this registration, it suffices to register the SOAP envelope portion as it is in the item "XML data of message" and to register portions necessary in the HTTP header in the item "entity-header information".

Then, the "X-SOAP-Type" header and "Response" as its contents as well as the "X-Send-To" header is added to the "entity-header information" of the transfer-message sheet created and the contents of the "X-received-From" header stored in step S92 is described therein (S96). Then, the process returns to step S91 so as to repeat the process.

The process as described above makes it possible to obtain a command response from a command forwarding-destination so as to register the contents in the receiving transfer-message pool 52 so that the command response registered as in the case of registering with the process of FIG. 39 and FIG. 40 may be collected by means of the message-collection means 45 so as to be transmitted to the image-processing apparatus 100.

Moreover, providing for such process as described above makes it possible to transfer the command for executing even when the apparatus of the forwarding destination does not deal with the collective transferring as illustrated in FIG. 39. Then, a provision may also be made for transferring this immediately to the forwarding destination when the command is registered.

The above completes an explanation of the process related to transferring of each command and command response, executed in the intermediary server 102.

Next, a functional configuration for handling commands and command responses at the image-processing apparatus 100 side is explained. For hardware, it is as explained using FIG. 9.

Figure 42:
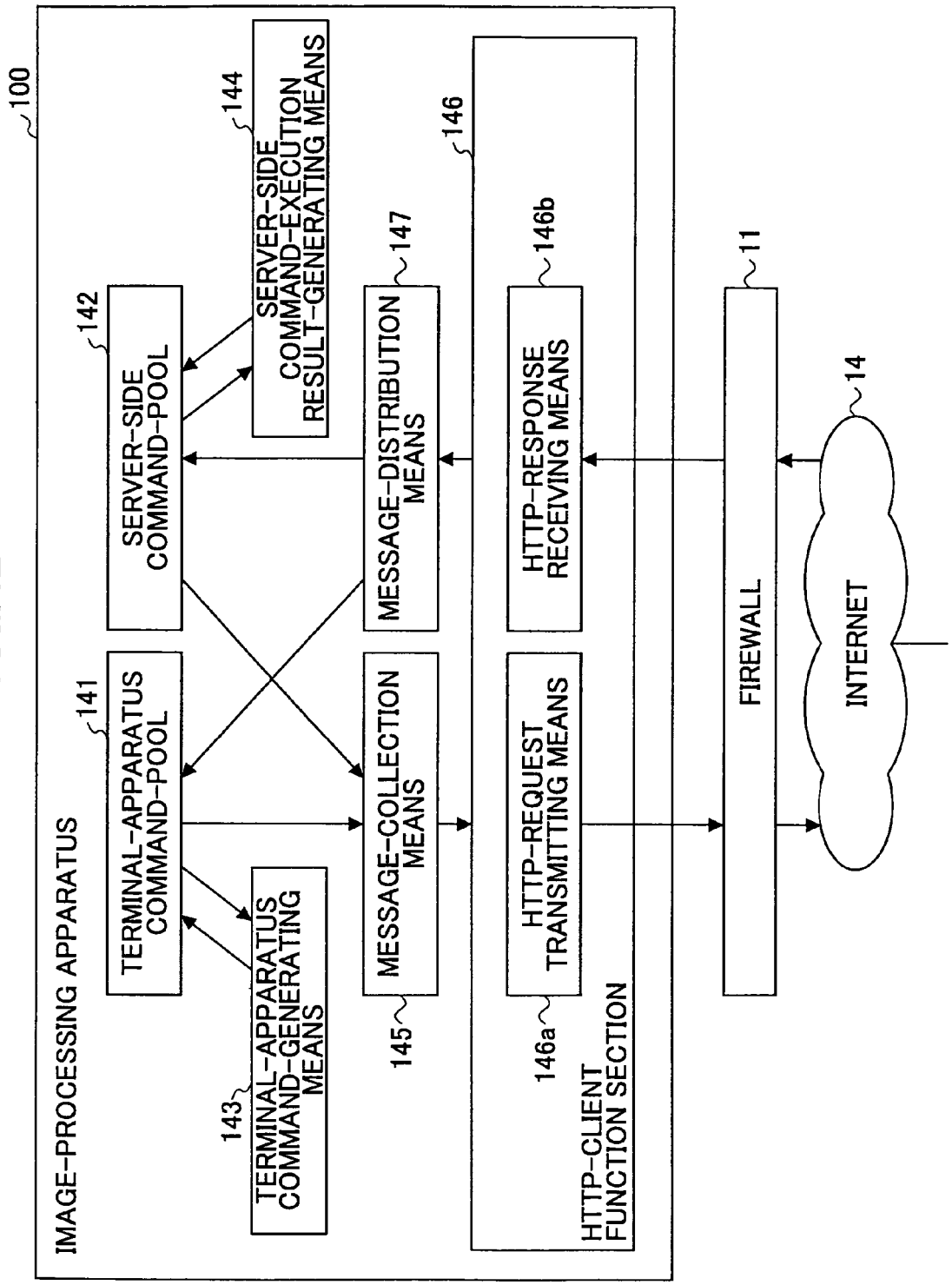
FIG. 42 is a functional block diagram illustrating a configuration of functions for processing related to commands and command responses out of the functions of the image-processing apparatus illustrated in FIG. 3.

FIG. 42 is a functional block diagram illustrating a configuration of functions for processing related to commands and command responses out of the functions of the image-processing apparatus 100.

Out of the functions illustrated in FIG. 42, a terminal-apparatus command pool 141 and a server-side command pool 142 are to be provided in any rewritable storage means. They may be provided in the NVRAM 207 or in the SDRAM 203 or HDD 210. The functions of terminal-apparatus command-generating means 143, server-side command-execution result-generating means 144, message-collection means 145 and message-distribution means 147 are realized with the CPU 201. Moreover, the function of the client-function section 146 is realized with the CPU 201 and the PHY 206.

It is noted that in the image-processing apparatus 100 as a provision is made for handing the command source in the same manner regardless of whether it is the intermediary server 102 or the processing server 103, in the explanation regarding the image-processing apparatus 100, the intermediary-server command and the processing-server command are to be collectively referred to as "a server-side command".

These functions are further explained in detail.

First, the terminal-apparatus command-pool 141 is a pool in which a terminal-apparatus command, a response to this command and information identifying this command are registered in association. Moreover, the server-side command pool 142 is a pool in which a server-side command, a response to this command and information identifying this command are registered in association. In these pools, creating per command a command sheet in a table format so as to store therein information provides for associating a command and information such as identifying information and responses.

The terminal-apparatus command-generating means 143 corresponds to request-generating means. Then, it has the functions of generating a terminal-apparatus command, assigning identifying information (ID) identifying this command, then adding management information for managing this command and associating these information sets as described above as a terminal-apparatus command-sheet in a table form so as to register them in the terminal-apparatus command-pool 141. Out of the above, the portion generating the terminal-apparatus command corresponds to an application provided in the image-processing apparatus 100, for example. Moreover, a function may be provided in the terminal-apparatus command-generating means 143 for assigning to the terminal-apparatus command generated a priority order for having each command executed at the forwarding destination.

Now, FIG. 43 illustrates an example data structure in a terminal-apparatus command-sheet of the image-processing apparatus 100.

As illustrated in this figure, in the image-processing apparatus 100, the terminal-apparatus command-sheet is provided with regions for storing data of "command ID", "method name", "input parameter", "state", "destination of command-execution result" and "output parameter". Then out of these, "command ID", "method name" and "input parameter" correspond to a terminal-apparatus command (and an ID assigned thereto), while "state" and "destination of command-execution result" correspond to management information. "Output parameter" is what is in a command response returned from an apparatus executing the process related to the command.

Information in each item is the same as information in an item having the same name as the items in the terminal-apparatus command-sheet or the intermediary-server command sheet in the intermediary server 102 so that the explanation is omitted. It is noted that, as there is no need for the image-processing apparatus 100 to recognize to which apparatus a terminal-apparatus command is to be transferred to after it is transmitted to the intermediary server 102, the item "destination information" is not provided.

Reverting to the explanation of FIG. 42, the server-side command-execution result-generating means 144 corresponds to response-generating means. Then, it is an application for reading out for execution a server-side command from the server-side command-pool 142. Then, it has the functions of generating a response to the server-side command, and associating the response with the command ID of the server-side command so as to register in the server-side command-pool 142. It is noted that a provision is made such that the server-side command received from the intermediary server 102 is associated with the ID for identifying this command and management information for managing this command so as to be registered in the server-side command pool 142 as a server-side command sheet in a table format. Then, the command response generated by the server-side command-execution result-generating means 144 is also registered in the server-side command sheet for the server-side command executed.

Moreover, it is possible that the server-side command-execution result-generating means 144 is provided with the functions of reading out multiple types of server-side commands from the server-side command pool 142 and generating a response to each-server side command. Moreover, it is also possible that, when the server-side command includes information on executing priority-order for having the image-processing apparatus 100 execute with priority the process, it is provided with the function of preferentially reading out in the descending priority order for execution.

It is noted that the server-side command-executing result-generating means 144 may be a module for calling an application necessary for executing a server-side command so as to have the command executed, rather than the application itself.

Now, FIG. 44 illustrates an example data structure in a server-side command-sheet of the image-processing apparatus 100.

As illustrated in this figure, in the image-processing apparatus 100, the server-side command-sheet is provided with regions for storing data of "command ID", "method name", "input parameter", "state", "output parameter", and "command destination". Then out of these, "command ID", "method name" and "input parameter" correspond to a server-side command (and an ID assigned thereto), while "state" and "command destination" correspond to management information. "Output parameter" is an execution result of the server-side command and is what is in a command response returned from the image-processing apparatus 100.

Information in each item is the same as information in an item having the same name as the items in the intermediary-server command-sheet or the terminal-apparatus command sheet in the intermediary server 102 so that the explanation is omitted. It is noted that, as there is no need for the image-processing apparatus 100 to recognize to which apparatus a response to a server-side command is transferred to after it is transmitted to the intermediary server 102, the item "source information" is not provided.

Once again reverting to the explanation of FIG. 42, the message-collection means 145 corresponds to collection means. Then, it has the functions of reading out from the server-side command-pool 142 a result of associating a command response generated by the server-side command-execution result-generating means 144 and a command ID of a server-side command corresponding to the response, reading out from the terminal-apparatus command-pool 141 a result of associating a terminal-apparatus command generated by the terminal-apparatus command-generating means 143 and a command ID of this command, and generating a transmitting message from these information sets as described above.

It is noted that, when a command response or a terminal-apparatus command is specified with an executing priority-order, a provision may be made for the message-collection means 145 to sequentially read out the respective information sets as described above in the descending executing priority-order.

As for the description format or the generating method of transmitting messages, it is the same as what is described for the intermediary server 102.

Moreover, the HTTP client-function, section 146 is provided with HTTP-request transmitting means 146*a* for transmitting a HTTP request and HTTP-response receiving means 146*b* for receiving a HTTP response.

Then, the HTTP-request transmitting means 146*a*, corresponding to transmitting means, has the functions of generating a HTTP request including a transmitting message generated by the message-collection message 145 and transmitting the request to the intermediary server 102. Here, any number of transmitting messages may be included in one HTTP request, or transmitting messages related to a command response and transmitting messages related to a terminal-apparatus command may arbitrarily be set to co-reside.

Then, a provision is made for the HTTP-request transmitting means 146*a* to transmit in one HTTP request all transmitting messages generated by the message-collection means 145 regardless of what the transmitting messages are related to as described above. It is noted that it is possible to set an upper limit on the number of transmitting messages to be included in one HTTP request.

Then, when the message-collection means 145 attempts reading out a terminal-apparatus command or a command response, etc., a HTTP request is to be transmitted even when there are no data to be read and, as a result, no SOAP messages to be transmitted are generated. Then, this attempt for reading out is to be done periodically. For example, it is possible to read out with a timer every 60 minutes.

The reason for the process is, as described above, that transmitting is not possible even when there is information to be transmitted from the intermediary server 102 to the image-processing apparatus 100 unless a request for communicating is made from the image-processing apparatus 100. Even when there are no data to transmit from the image-processing apparatus 100, periodically transmitting a request for communicating to the intermediary server 102 so as to provide an opportunity for transmitting information from the intermediary server 102 to the image-processing apparatus 100 makes it possible to prevent information requiring transfer from staying in the intermediary server 102 over a long period of time.

It is noted that as a matter of course reading out by means of message-collection means 145 and the subsequent transmitting of a HTTP request by means of HTTP-request transmitting means 146*a* may be performed as required at a non-periodic timing. For example, a provision may be made for, when information which needs to be transmitted urgently is registered in any pool, the terminal-apparatus command-generating means 143 or the server-side command-execution result-generating means 144 report to the message-collection means 145 the fact so as to have the information as described above read out.

Moreover, the HTTP-response receiving means 146*b*, corresponding to receiving means, has the function of receiving a HTTP response from the intermediary server 102. Then herein, a receiving message including a server-side command and a command ID associated with the command and a receiving message including a response to a terminal-apparatus command and a command ID associated with the command arbitrarily coexist in the HTTP response.

Here, as for the description format of the receiving message, it is the same as what is described for the intermediary server 102.

Message-distribution means 147 corresponds to distribution means. Then, it has the function of distributing data included in a HTTP response received by the HTTP-response receiving means 146*b* into the terminal-apparatus command-pool 141 and the server-side command pool 142.

Specifically, a server-side command and a command ID associated with the command is registered in a server-side command sheet provided in the server-side command pool 142 and, for a response to a terminal-apparatus command, a command ID associated with the command is collated with a command ID of a terminal-apparatus command sheet stored in the terminal-apparatus command-pool 141 so as to specify the corresponding terminal-apparatus command for registering as "output parameter" the terminal-apparatus command.

Also for the data conversion method for this registering, it is the same as what is described for the intermediary server 102.

Next, the process of executing in the image-processing apparatus 100 having the configuration and the function as described above is described using the flowcharts in FIGS. 45 through 47. The process illustrated in these flowcharts is to be performed by the CPU 201 of the image-processing apparatus 100 executing control programs required.

Figure 45:
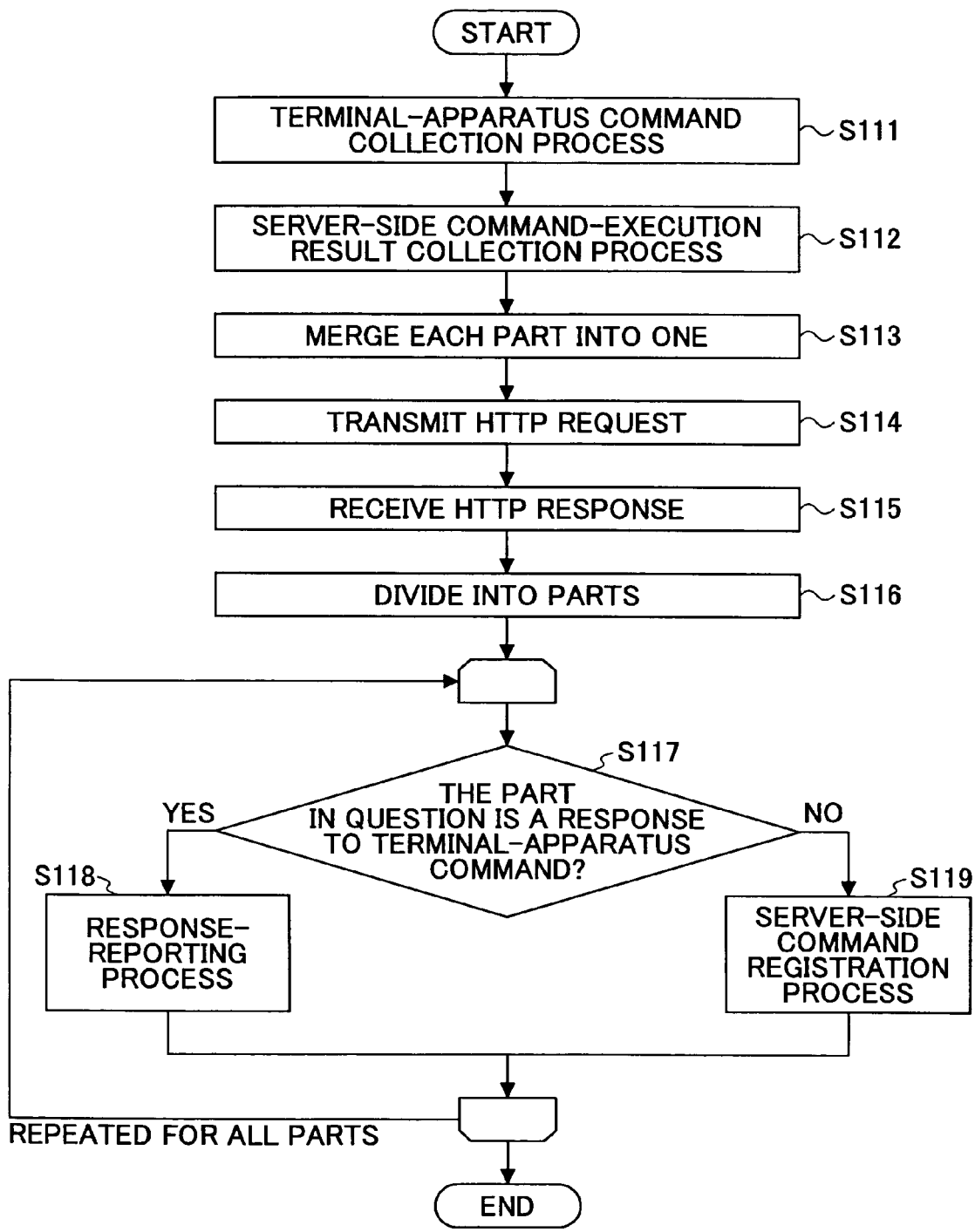
FIG. 45 is a flowchart illustrating a basic operation of the process of collecting and distributing messages in the image-processing apparatus in the illustrated in FIG. 3.

First, FIG. 45 illustrates a basic operation of the process of collecting and distributing messages.

The CPU 201 initiates the process illustrated in FIG. 45 when a timing arrives such that message-collection means 145 attempts reading out a terminal-apparatus command or a command response, etc.

Then, first the process of collecting a terminal-apparatus message is performed (S111). This is the process of collecting a terminal-apparatus command to be transmitted from the terminal-apparatus command-pool 141 to the intermediary server 102 and includes the process of generating from data collected a part using the SOAP envelope.

Next, the process of collecting a server-side command-execution result being a response to a server-side command is performed (S112). This is the process of collecting a command response to be transmitted from the server-side command pool 142 to the intermediary server 102 and again includes the process of generating from collected data a part using the SOAP envelope.

Thereafter, parts generated in the process of steps S111 and S112 are merged into one and a HTTP request including all parts is generated (S113) and the HTTP request is transmitted to the intermediary server 102 (S114).

In the process up to here, the CPU 201 functions as message-collection means 145 in steps S111 and S112 and as HTTP-request transmitting means 146a in steps S113 and S114.

Next, a HTTP response is received from the intermediary server 102 as a communications response to a HTTP request (S115). Then, the HTTP body of the received HTTP response is divided into parts (S116). Here the dividing into parts is to divide into elements divided by "MIME_boundary" and here the dividing is done for all parts.

Then thereafter, the process of steps S117 through S119 is sequentially repeated for all parts obtained by dividing. In this process, it is determined whether the part in question is a part describing therein a response to a terminal-apparatus command (S117). Then, the process of response reporting is performed when it is a response to a terminal-apparatus command (S118). Moreover, when it is not a response to a terminal-apparatus command, the process of registering a server-side command is performed since the part in question is a part describing therein a server-side command (S119).

After step S118 or S119, the process returns to step 117 and the process is repeated for the next part in question. Then, once the process as described above is performed for all parts, the process illustrated in FIG. 45 is finished.

In the process up to here, the CPU 201 functions as HTTP-response receiving means 146b in steps S115 and S116 and as message-distribution means in steps S117 through S119.

Next, the process illustrated in the flowchart in FIG. 45 is described using a flowchart illustrating each portion in more detail.

Figure 46:
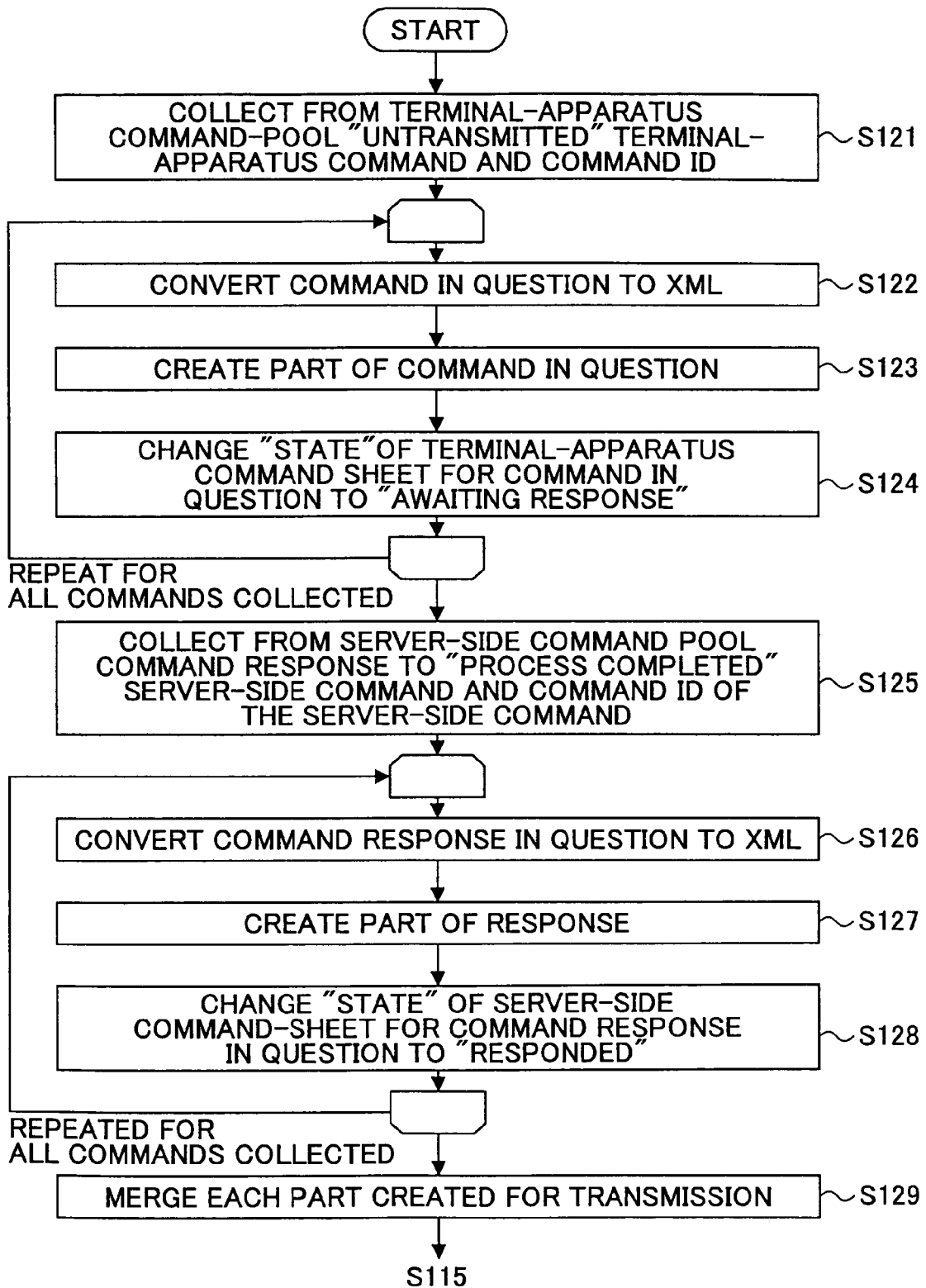
FIG. 46 is a flowchart illustrating in more detail the process of steps up to and including S114 of FIG. 45.

FIG. 46 is a flowchart illustrating in more detail the process of the portion of steps up to and including S114 of FIG. 45.

In this process, the CPU 201 first collects from the terminal-apparatus command-pool 141 as a terminal-apparatus command to be transmitted the contents of "method name" and "input parameter" of the terminal-apparatus command-sheet which is "untransmitted" in "state", and also collects as a command ID of the command the contents of the "command ID" (S121). The "state" being "untransmitted" indicating that a command is not yet reported to the intermediary server 102 after its having been generated by means of terminal-apparatus command-generating means 143 makes it possible to extract a command to be transmitted based on the above.

Thereafter, the process of steps S122 through S124 is sequentially repeated for all terminal-apparatus commands collected in step S121. In the process as described above, first a terminal-apparatus command in question and its command ID are converted to the SOAP envelope in which the information sets as described above are included in the SOAP body and the SOAP header respectively (S122), and the entity-header is added thereto so as to generate a part related to the command in question (S123). Then, "state" of the terminal-apparatus command sheet which described therein the terminal-apparatus command in question is changed to "awaiting response" (S124). The "state" being "awaiting response" indicates that a command has already been reported to the intermediary server 102.

After the process as described above has been completed in its entirety, the CPU 201 collects from the server-side command-pool 142 as a command response to a server-side command that is to be transmitted the contents of "output parameter" of the server-side command-sheet which is "process completed" in "state", and also collects as a command ID of the corresponding server-side command the contents of the "command ID" (S125). The "state" being "process completed" indicating that the process corresponding to the server-side command is not yet reported to the intermediary server 102 after it has been generated by means of server-side command-execution result-generating means 144 makes it possible to extract a command response to be transmitted based on the above.

Thereafter, the process of steps S126 through S128 is sequentially repeated for all command responses collected in the step S125. The process as described above is the process of first converting a command response in question and a command ID collected with the response to a SOAP envelope in which the respective information sets as described above are included in the SOAP body and the SOAP header (S126) and adding thereto the entity header so as to generate a part related to the command response in question (S127). The process as described above is the same as the process of steps S122 and S123 except that what is to be processed is different. Then next, "state" of server-side command-sheet which described therein the command response in question is changed to "responded" (S128). "State" being "responded" illustrates that the command response has already been reported to the intermediary server 102.

Then, after the process up to here has been completed in its entirety, the CPU 201 merges each part generated in step S123 or S127 and generates a multi-part HTTP request as illustrated in FIG. 16 for transmitting to the intermediary server 102 (S129).

It is noted that a provision may be made for the change of "state" performed in step S124 or S128 to be performed after the transmission has actually been completed. The process as described above makes it possible to set the command and command response planned for transmission to be what are to be retransmitted even when a communications error takes place so that system reliability is improved.

The above process completes the process related to transmitting a HTTP request so that the process proceeds to the process corresponding to steps S115 and steps after S115 of FIG. 45.

Figure 47:
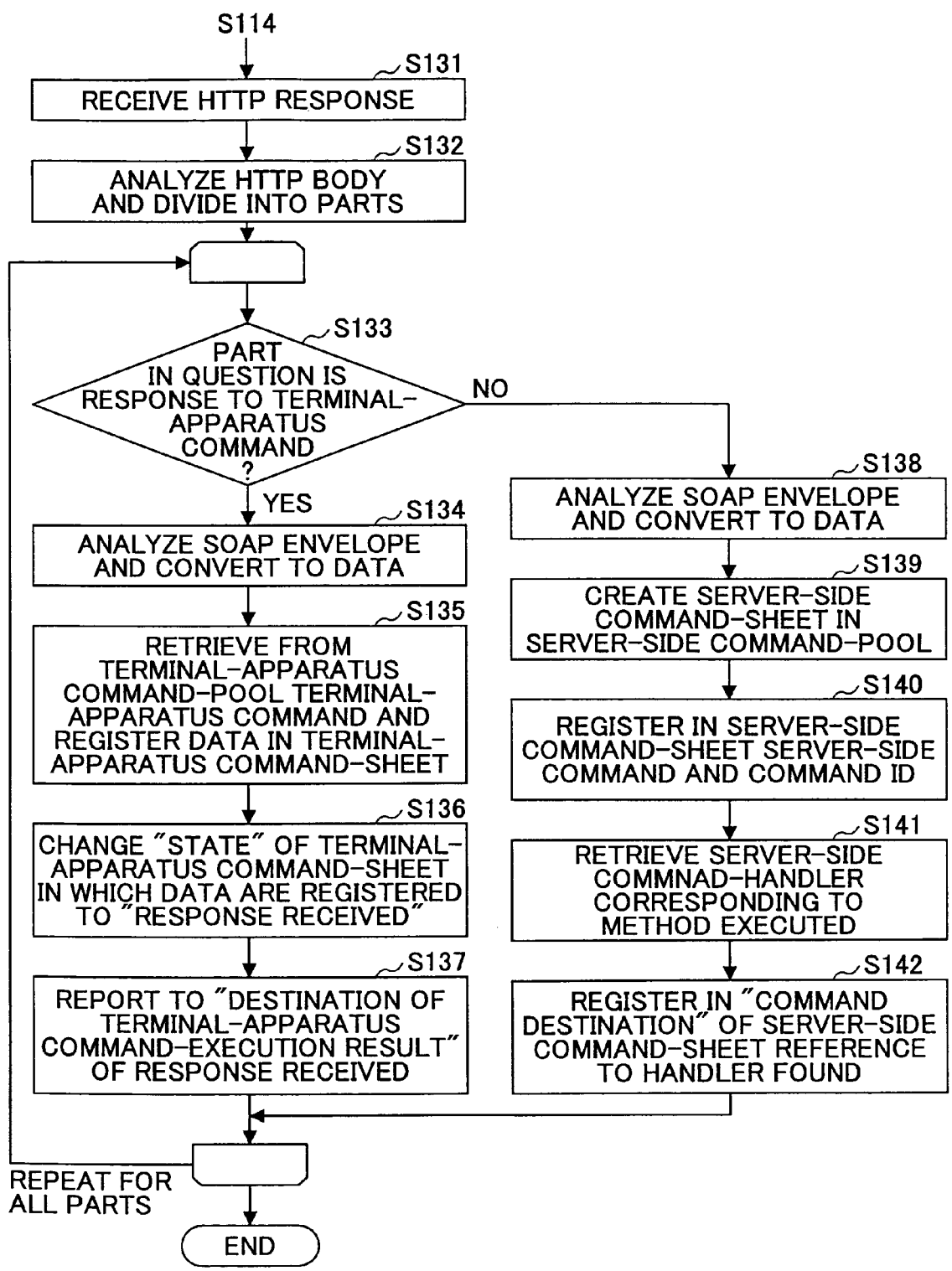
FIG. 47 is a flowchart illustrating in more detail the process of step S115 and steps after S115 of FIG. 45.

FIG. 47 is a flowchart illustrating in more detail the process of the portion of step S115 and steps after S115 of FIG. 45. The process following step S129 of FIG. 46 in this figure corresponds to step S131.

In this process, the CPU 201 first awaits receiving a HTTP response to a HTTP request transmitted and receives this from the intermediary server 102 (S131). Upon receiving this, the HTTP body is analyzed for dividing into each part (S132).

Then thereafter the process of steps S133 through steps S142 is sequentially repeated for each part obtained by dividing.

In the process of this portion, first it is determined as to whether the part in question is a response to a terminal-apparatus command (S133). As described above, as it is possible that a server-side command and a response to the terminal-apparatus command are included in the HTTP response, it is determined as to which of the two as described above the part in question is. Then, this determining may be done according to whether the "SOAPAction" header exists in the part in question or according to the contents of the "X-SOAP-Type".

When it is determined to be a response to a terminal-apparatus command in step S133, the process related to registering the response of steps S134 through S137 is performed.

In other words, first the SOAP envelope of the part is analyzed so as to convert to data in a format which can be registered in the terminal-apparatus command-sheet (S134), a terminal-apparatus command corresponding to the command response is retrieved from the terminal-apparatus command-pool 141, and data of the command response are registered in the item "output parameter" of the terminal-apparatus command sheet for the terminal-apparatus command (S135). It is noted that to the command response is to be assigned a command ID which is the same as what is assigned at the time of transmitting the terminal-apparatus command so that retrieving the terminal-apparatus command may be done with this information as the key.

Once registering of data has been completed, the "state" of the terminal-apparatus command-sheet in which data are registered is changed to "response received" so as to indicate the fact (S136). Then, the fact that there was a response is reported to the destination registered in "destination of command-execution result" (S137). This reporting makes it possible for the application, etc., which has generated the terminal-apparatus command to recognize that there is a response to the command generated and to perform the process depending on the response.

For example, in case an application which is a source of an error report has generated a terminal-apparatus command to perform error reporting, when this command is transmitted to the intermediary server 102, the intermediary server 102 returns a command response indicating that the command has been received correctly. Then, at the image-processing apparatus 100 side, when the command response is received, which terminal-apparatus command the response is to is confirmed based on the command ID included therein and the command response is registered in correspondence with the terminal-apparatus command found. Then, the fact that there is a response is reported to the error-report source application which is registered as an execution-result destination of the command. The application referring to the terminal-apparatus command-sheet when this report is received can obtain the execution result of the command generated from the item "output parameter".

When the process of steps up to and including S137 is finished, in case there is a following part the process from step S133 is repeated for the part.

On the other hand, when there is not a response to a terminal-apparatus command in step S133, the part is related to a server-side command so that the process of registering the command is performed in steps S138 through S142.

In other words, first the SOAP envelope of the part is analyzed so as to convert to data in a format which can be registered in a server-side command sheet (S138), then the server-side command-sheet for registering the server-side command therein is created in the server-side command pool 142 (S139) and the server-side command and the command ID are registered in the server-side command-sheet (S140).

Here, the contents of the server-side command are registered in the items "method name" and "input parameter" of the server-side command sheet and the command ID which was described in the part is registered in the item "command ID". Moreover, the initial value of "state" is "unprocessed" and the initial value of "output parameter" is NULL.

Then, once registering of the items as described above is finished, reference information to a handler (included in the server-side command-execution result-generating means 144) for causing a method stored in "method name" of the server-side command sheet to be executed is retrieved with reference to information on correspondence between the method and the handler that is provided in advance (S141) and the reference information found is registered in the item "command destination" of the server-side command sheet (S142).

Once the process of steps up to and including S142 as described above is finished, when there is a following part the process of step S133 and beyond is repeated for the part.

When the process of steps S133 through S142 is finished for all parts, the process illustrated in the flowchart of FIG. 47 is finished.

The process as described above makes it possible to transmit to the intermediary server 102 collectively operational requests to be transmitted to the intermediary server 102 and operational responses to the operational request received from the intermediary server 102. Moreover, operational requests from the intermediary server 102 or the processing server 103 and operational responses to operational requests transmitted to the intermediary server 102 can be collectively received from the intermediary server 102 for processing.

It is noted that while herein the above describes a provision such that all parts to be transmitted are first generated and then merged for transmitting and all parts are first received and then divided into each part for processing, there is no need to perform the process as in the above. The fact is the same as in the case of the intermediary server 102 that a provision may be made to sequentially transmit whenever each part is generated or to sequentially perform the process related to each part whenever each part is received.

Moreover, as for the process related to executing a server-side command, a provision may be made for the process described for the intermediary server 102 using FIG. 37 or 38 to be executed for the server-side command-sheet.

Now, transmitting the operational request generated by the image-processing apparatus 100 for the time being to the intermediary server 102 results in the intermediary server 102 transferring to an appropriate forwarding destination (processing server) and obtaining therefrom and returning an operational response. Therefore, for the image-processing apparatus 100, there is no harm in performing the process of transmitting/receiving on the assumption that operations related to all operational requests are being performed by the intermediary server 102.

Moreover, also for an operational request received by the image-processing apparatus 100, it is received from the intermediary server 102 without grasping which apparatus actually generated the request and also an operational response is returned to the intermediary server 102. Therefore, for the image-processing apparatus 100, there is no harm in performing the process of transmitting/receiving on the assumption that all operational requests are generated by the intermediary server 102.

The above completes an explanation of the process related to transferring of each command and command response.

Next, a functional configuration is described for handling a command and a command response at the processing server 103 side. As for hardware, it is as described using FIG. 10.

Figure 48:
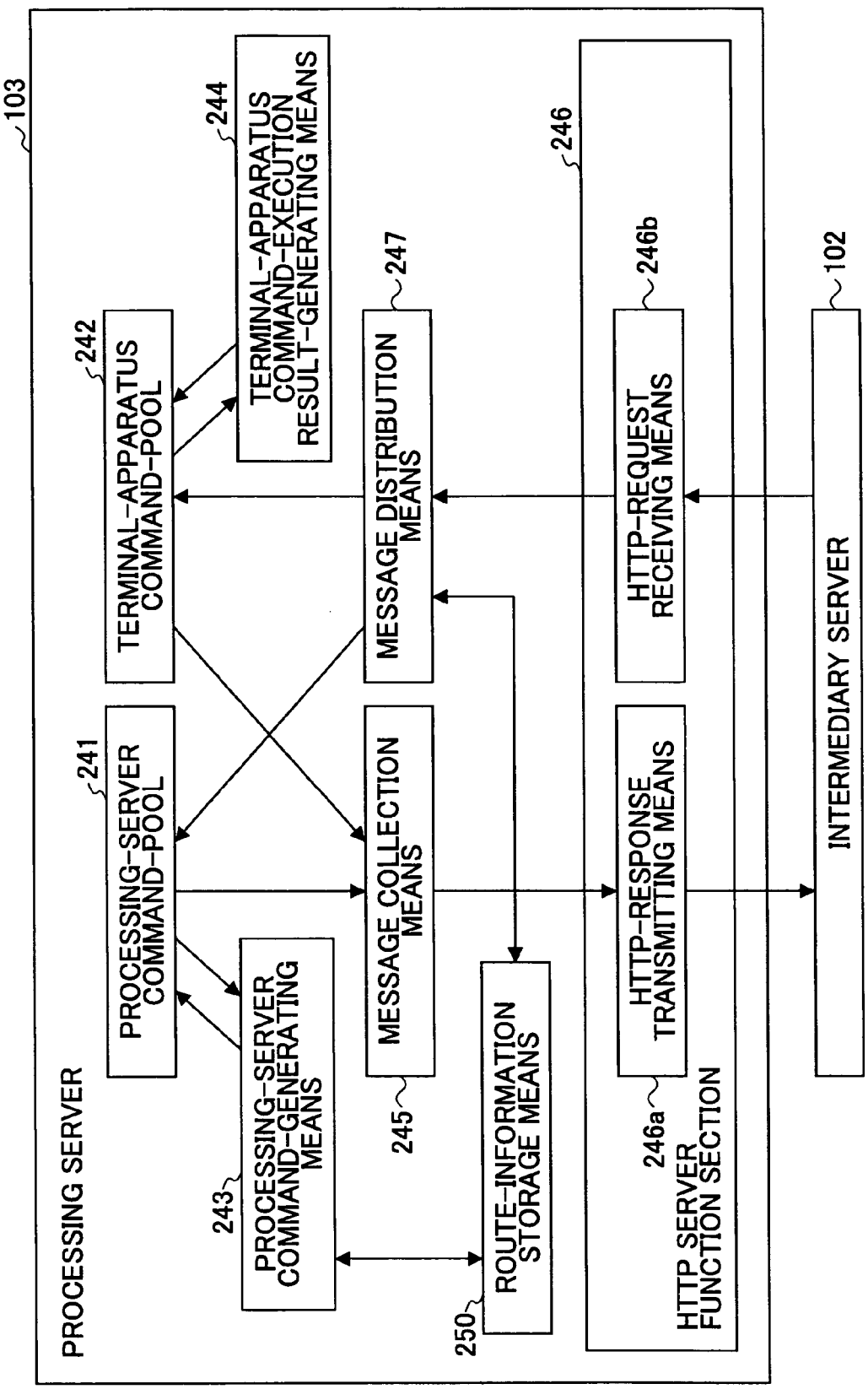
FIG. 48 is a functional-block diagram illustrating a configuration of functions for processing related to commands and command responses out of the functions of the processing server illustrated in FIG. 3.

FIG. 48 is a functional-block diagram illustrating a configuration of functions for processing related to commands and command responses out of the functions of the processing server 103.

Each function illustrated in FIG. 48 is to be realized by the CPU 301 of the processing server 103 executing the required control program so as to control the operation of each section of the processing server 103. Then, out of these functions, the processing-server command-pool 241 and the terminal-apparatus command-pool 242 are to be provided in rewritable storage means such as RAM 303. The functions of processing-server command-generating means 243, terminal-apparatus command-execution result-generating means 244, message-collection means 245 and message-distribution means 247 are to be realized by means of the CPU 301. Moreover, the function of the HTTP-server function section 246 is to be realized by means of the CPU 301 and the NIC 305. The route-information storage means 250 is to be provided in rewritable non-volatile storage means such as the SD card 304.

The functions of each section illustrated in FIG. 48 are described in more detail.

First, the processing-server command-pool 241 is a pool for registering a processing-server command in association with a response to this command or information identifying this command and information on the source or destination of the command, etc. Moreover, the terminal-apparatus command-pool 242 is a pool for registering a terminal-apparatus command in association with a response to this command or information identifying this command and information on the source or destination of the command, etc.

The processing-server command-generating means 243 corresponds to the request-generating means. Then, it has the functions of generating a processing-server command, assigning identifying information (ID) identifying this command, then assigning destination information on this command and management information for managing this command and registering these information sets in the processing-server command-pool 241 as described above as a processing-server command-sheet in a table format. Out of these, to the portion generating a processing-server command corresponds an application provided in the processing server 103, for example. Moreover, the data structure in the processing-server command-sheet of the processing server 103 is the same as the data structure in the intermediary-server command-sheet of the intermediary server 120 illustrated in FIG. 13.

It is noted that the processing-server command-generating means 243 registers in a processing-server command-sheet as destination information not only the eventual destination but also information on the route over which transferring is made to the destination. Then this route information can be obtained from the route-information storage means 250.

In other words, as the route-information storage means 250 stores therein as a route-information table a destination of a command (or other information) in association with route information for transmitting the command to the destination, searching this route-information table with the eventual destination as the key makes it possible to obtain the route information over which transferring is to be made to the destination.

FIG. 49 illustrates an example of this route-information table.

In this figure is illustrated a table in which 4 units of image-processing apparatuses are registered. Then, while information is registered for image-processing apparatuses A and B that indicates that a command may be transferred via the intermediary server 102, information is registered for image-processing apparatuses C and D that indicates that the routes are unknown.

Here, since the system configuration is such that a request to a terminal apparatus that is for communicating is not made from the processing-server 103 side, when information transferred from the terminal apparatus is received not even once after an operator inputs a terminal-apparatus ID based on a user registration postcard, etc., as it is not possible to recognize as to via which intermediary server 102 a command is set to be transferred to the terminal apparatus, a state such that the route information is unknown may arise.

It is noted that information of the route-information table as described below may be automatically updated with reference to information on a message described in a HTTP request received by the processing server 103 and also may be manually input by an operator by the processing server 103.

Moreover, while it is also possible to register a transfer route such that transferring is done via multiple intermediary servers, a provision is made to register only one type of route for one terminal apparatus.

Reverting to the explanation of FIG. 48, the terminal-apparatus command-execution result-generating means 244 corresponds to response generating means. Then it is an application for reading out a terminal-apparatus command from the terminal-apparatus command-pool 242 for executing. Then, it has the functions of generating a response to the terminal-apparatus command and registering the response in association with a command ID of the terminal-apparatus command in the terminal-apparatus command-pool 242. It is noted that a provision is made for the terminal-apparatus command received from the intermediary server 102 to be registered in the terminal-apparatus command-pool 242 as a terminal-apparatus command-sheet in a table format in association with an ID identifying this command, source information on this command (that is to be destination information on the command response) and management information for managing this command. Then, the command response generated by the terminal-apparatus command-execution result-generating means 244 is also registered in the terminal-apparatus command-sheet for the terminal-apparatus command executed.

Moreover, it is possible to provide the terminal-apparatus command-execution result-generating means 244 with the functions of reading out multiple types of terminal-apparatus commands from the terminal-apparatus command-pool 242 and generating a response to each terminal-apparatus command. Then, the terminal-apparatus command-execution result-generating means 244 may be a module for calling an application required for executing a terminal-apparatus command so as to cause the command to be executed, rather than the application itself.

Furthermore, the data structure in the terminal-apparatus command-sheet of the processing server 103 is the same as the data structure in the terminal-apparatus command-sheet of the intermediary server 102 illustrated in FIG. 12.

Next, message-collection means 245 corresponds to collection means. Then, it has the functions of reading out from the terminal-apparatus command pool 242 a command response generated by the terminal-apparatus command-execution result-generating means 244 in association with a command ID and source information of a terminal-apparatus command corresponding to this command response, as well as reading out from the processing-server command pool 241 a processing-server command generated by the processing-server command generating means 243 in association with a command ID and source information of this command, and generating a transmitting message from the information sets as described above.

As for the description format and the generating method of the transmitting message, it is the same as what is described for the intermediary server 102.

Moreover, the HTTP-server function section 246 is provided with HTTP-response transmitting means 246a for transmitting a HTTP response and HTTP-request receiving means 246b for receiving a HTTP request.

Then, the HTTP-response transmitting means 246a, corresponding to transmitting means, has the functions of generating as a communications response to a HTTP request received from the intermediary server 102 a HTTP response including a transmitting message generated by the message-collection means 245 and transmitting to the intermediary server 102. Here, any number of transmitting messages may be included in one HTTP response or transmitting messages related to command responses and transmitting messages related to processing-server commands may arbitrarily be set to co-reside. Of course, transmitting messages with differing destinations may be set to co-reside.

Moreover, a provision is made for the HTTP-response transmitting means 246a to include for transmitting in one HTTP response all transmitting messages generated by the message-collection means 245 regardless of which the transmitting messages are related to. It is noted that it is possible to set an upper limit on the number of transmitting messages to be included in one HTTP response.

Now, in case the message-collection means 245 attempts to read out a processing-server command or command response, the HTTP response is to be transmitted even when there are no data to be read out and, as a result, no SOAP messages to be transmitted are generated. Then, this attempt to read out is to be made when a HTTP request is received from the intermediary server 102.

The reason for the above is that even when reading out is attempted in other circumstances, as the processing server 103 does not have a HTTP-client function section, it is not possible to transmit by itself a HTTP request so as to transfer a transmitting message to the intermediary server 102.

Moreover, the HTTP-request receiving means 246b, corresponding to receiving means, has the function of receiving a HTTP request from the intermediary server 102. Then here, in the HTTP request, a receiving message including a terminal-apparatus command, a command ID and transfer-route information associated with the command and a receiving message including a response to a processing-server command, a command ID and transfer-route information associated with the command are included such that they arbitrarily coexist.

As for the description format of the receiving message, it is the same as what is described for the intermediary server 102.

Message-distribution means 247 corresponds to distribution means. Then, it has the function of dividing registering data included in a HTTP request received by the HTTP-request receiving means 246b into the processing-server command-pool 241 and the terminal-apparatus command-pool 242.

More specifically, a terminal-apparatus command, a command ID and transfer-route information (to be registered as source information) associated with the command are registered in a terminal-apparatus command-sheet provided in the terminal-apparatus command-pool 242 while, as for a response to a processing-server command, a command ID associated with the response is collated with a command ID of a processing-server command-sheet stored in the processing-server command-pool 241 so as to specify the corresponding processing-server command-sheet for registering in the item "output parameter" of the processing-server command-sheet. Also for the data conversion method for this registering, it is the same as what is described for the intermediary server 102.

Next, the process of executing in the processing server 103 having the configuration and the function as described above is described.

Figure 50:
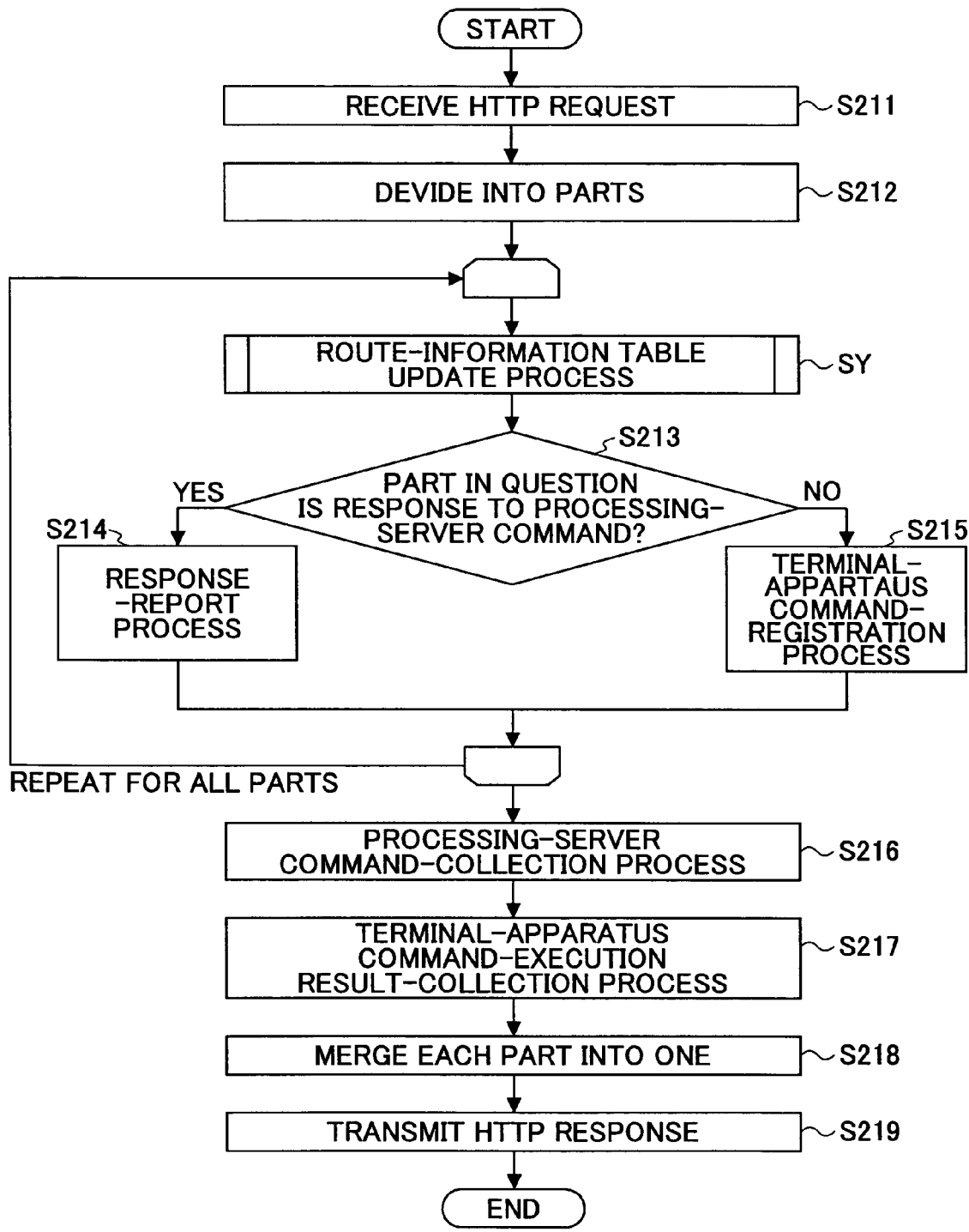
FIG. 50 is a flowchart illustrating a basic operation of the process of collecting and distributing messages in the processing server illustrated in FIG. 3.

While FIG. 50 illustrates a flowchart of a basic operation related to transmitting/receiving messages with the intermediary server, the process illustrated in this flowchart is to be performed by the CPU 301 of the processing server 103 executing control programs required.

Once a HTTP request is transmitted from the intermediary server 102, the CPU 301 initiates the process illustrated in the flowchart of FIG. 50.

Then, first the HTTP request is received (S211). Then, the HTTP body of the HTTP request received is divided into parts (S212). Now, the dividing into parts is to divide into each element divided by "MIME_boundary" and also herein the dividing is done for all parts.

Then thereafter, the process of step SY and steps S213 through S215 is sequentially repeated for all parts obtained by dividing. In this process, first the process of route-information table updating is performed for updating the route-table information illustrated in FIG. 49 (SY) and next it is determined whether the part in question is a part describing therein a response to a processing-server command (S213). Then, when it is a response to a processing-server command, the process of response reporting is performed (S214). Moreover, when it is not a response to a processing-server command, as it is a part describing therein a terminal-apparatus command, the process of terminal-apparatus command registering is performed (S215).

After step S214 or S215, the process returns to step S213 and repeats the process for the following part. Then, when the process as described above is performed for all parts, the process proceeds to the next step S216.

In the process up to here, the CPU 301 functions as HTTP-request receiving means 246b in steps S211 and S212 and as message-distribution means 247 in steps S213 through S215.

Next, the CPU 301 performs the process of collecting a processing-server command (S216). This is the process of collecting a processing-server command to be transmitted from the processing-server command-pool 241 to the intermediary-server 102 and includes the process of generating from data collected a part using a SOAP envelope.

Next, the process of collecting a terminal-apparatus command-execution result being a response to a terminal-apparatus command is performed (S217). This is the process of collecting a command response to be transmitted from the terminal-apparatus command-pool 242 to the intermediary-server 102 and again includes the process of generating from data collected a part using a SOAP envelope.

Thereafter, the parts generated in the process of steps S216 and S217 are merged into one so as to generate a HTTP response including all parts (S218), and the HTTP response is transmitted to the intermediary server 102 as a communications response to the HTTP request received in step S211 (S219) so as to finish the process.

In the process up to here, the CPU 301 functions as message-collection means 245 in steps S216 and S217 and as HTTP-response transmitting means 246a in steps S218 and S219.

Next, the process illustrated in the flowchart in FIG. 50 is described using flowcharts illustrating each part in more detail.

Figure 51:
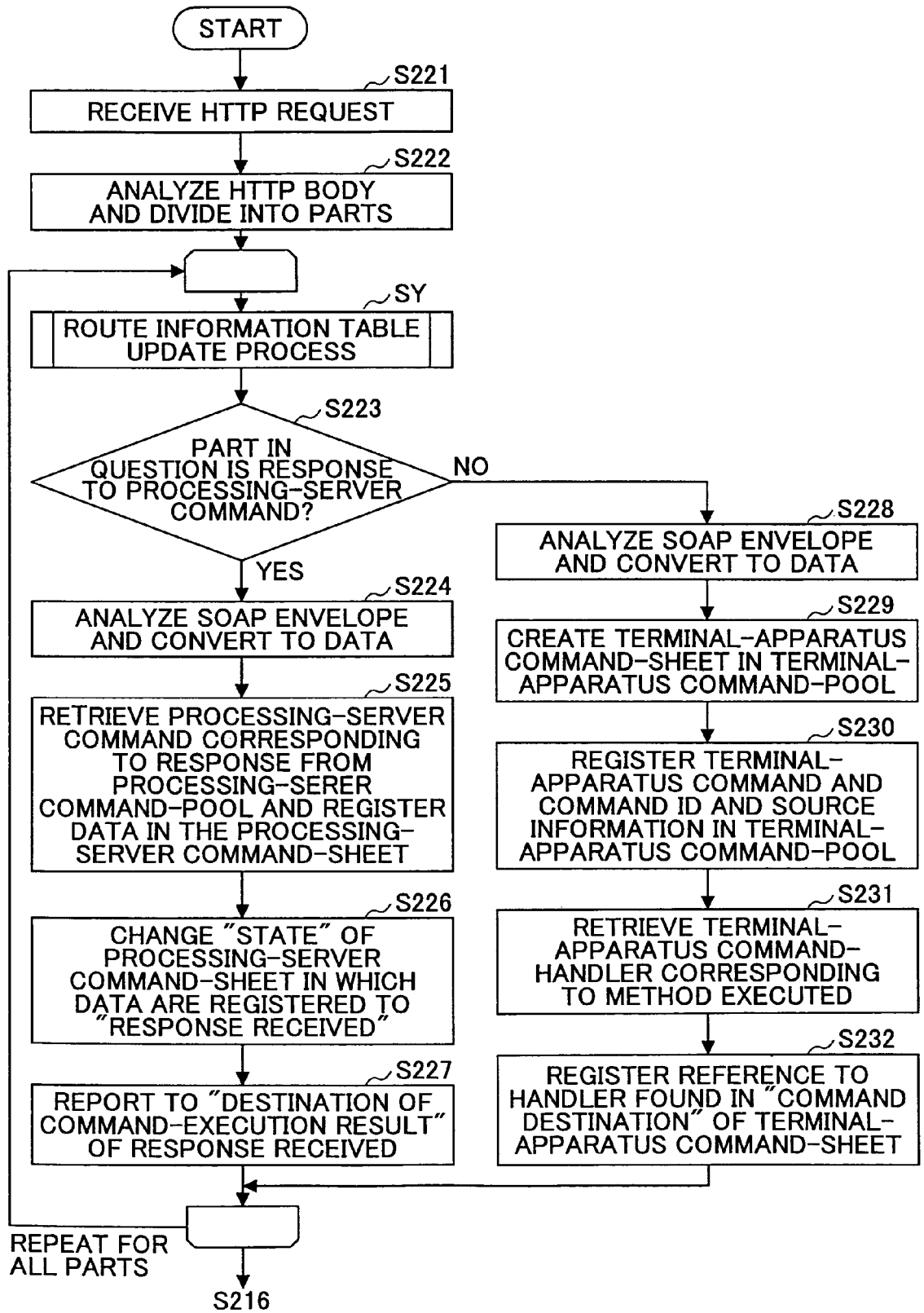
FIG. 51 is a flowchart illustrating in more detail the process up to and including step S215 of FIG. 50.

FIG. 51 is a flowchart illustrating in more detail the portion of the process up to and including step S215 of FIG. 50.

In this process, the CPU 301 first receives a HTTP request from the intermediary server 102 (S221). Then once receiving the request, its HTTP body is analyzed so as to divide into parts (S222).

Then thereafter, the process of steps SY and steps S223 through S232 is sequentially repeated for each part obtained by dividing.

In the process as described above, step SY is described below. Moreover, as for steps S223 through S232, the process is almost the same as the process of steps S133 through S142 described using FIG. 47 for the image-processing apparatus 100. Then, basically, what is a terminal-apparatus command is here a processing-server command and what is a server-side command is here a terminal-apparatus command and only the names of the command sheets differ as a result.

The only other difference is that in step S230, information on transfer-route (the contents of "X-Received-From" header) is extracted from the entity header of the part which described the terminal-apparatus command so as to register in the item "source information" and furthermore information on the source of the HTTP request is also registered in the same item as information of the latest transfer route.

Thus, the explanation is omitted for other points.

Then, once the process of step SY and steps S223 through S232 is finished for all parts, the process illustrated in the flowchart in FIG. 51 is finished so that the process proceeds to the process corresponding to steps S216 and beyond in FIG. 50.

Figure 52:
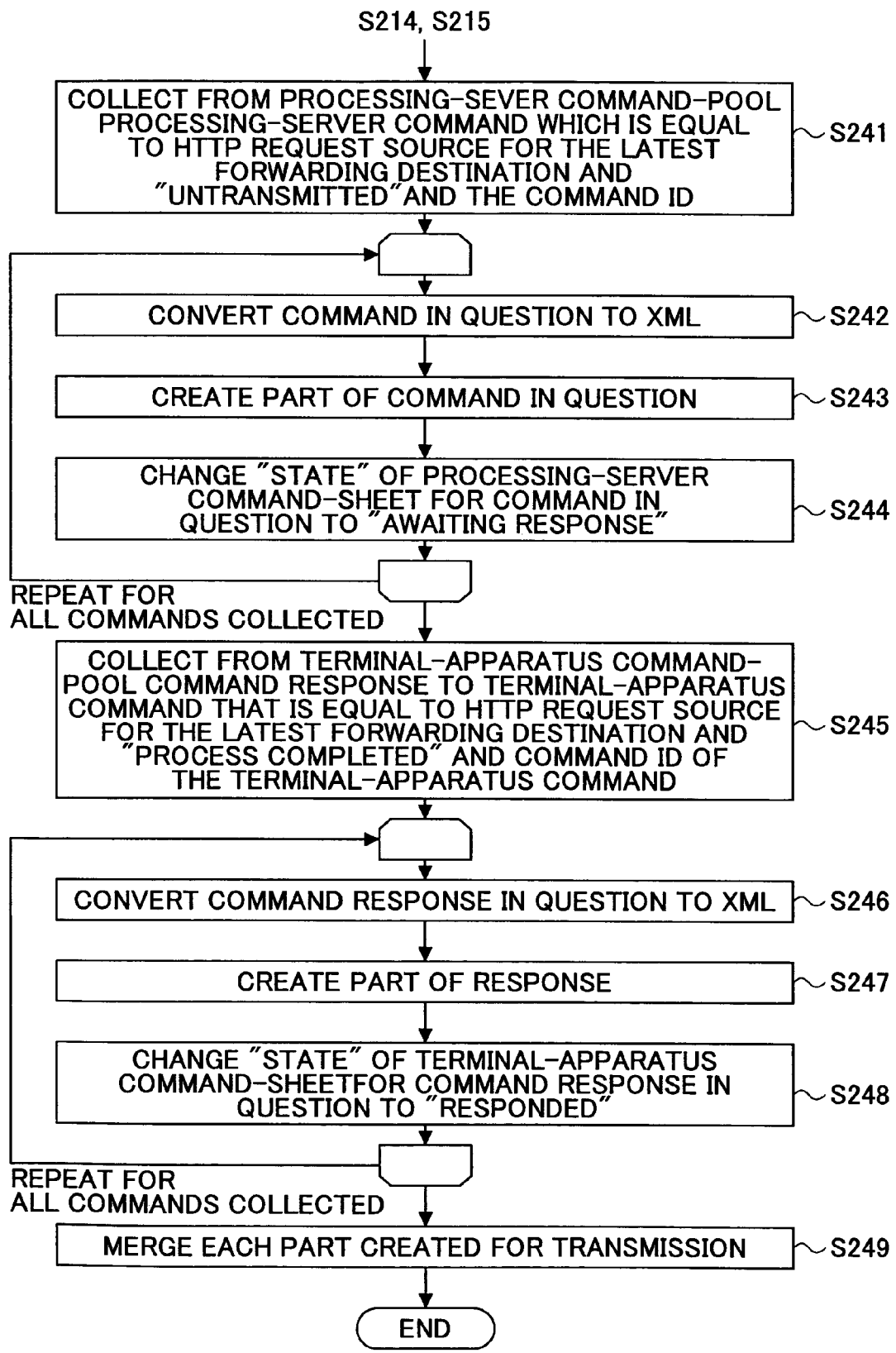
FIG. 52 is a flowchart illustrating in more detail the process of step S216 and steps after S216 of FIG. 50.

FIG. 52 is a flowchart illustrating in more detail the portion of the process of steps S216 and beyond in FIG. 50. The process following the step S227 or S232 in FIG. 51 corresponds to step S241 in this figure.

In this process, the CPU 301 first collects as a processing-server command to be transmitted the contents of "method name" and "input parameter" of a processing-server command-sheet which is the same as the source of the HTTP request received in step S211 in the latest forwarding destination and "untransmitted" in "state" and also collects a command ID of the command as the contents of "command ID" (S241).

Here, as route information related to transferring a command is registered in "destination information" with reference to the route-information table, it is possible to recognize that the sheet describing therein source information on a HTTP request is a sheet describing therein a command to be described in a HTTP response to the HTTP request so as to be transmitted.

Moreover, the "state" being "untransmitted" indicates that a command is not yet reported to the intermediary-server 102 after it has been generated by the processing-server command-generating means 243 so that a command to be transmitted to the intermediary server 102 can be extracted based on the above.

Thereafter, the process of steps S242 through S244 is sequentially repeated for all processing-server commands collected in step S241.

In the process as described above, first a processing-server command in question and its command ID are converted into a SOAP envelope in which the information sets as described above are included in the SOAP body and the SOAP header respectively (S242) and an entity header is added thereto so as to generate a part related to the command in question (S243). It is noted that in step S243 information on transfer route is described according to the "X-Send-To" header as described above with reference to "destination information". Here, information for transmitting a HTTP response from now on is no longer needed so that it is not described.

Then, "state" of the processing-server command-sheet which described the processing-server command in question is changed to "awaiting response" (S244). "State" being "awaiting response" indicates that a command has already been transmitted to the intermediary server 102.

After the process as described above has been completed in its entirety, the CPU 301 collects what is to be transmitted out of command responses to terminal-apparatus commands the contents of "output parameter" of a terminal-apparatus command sheet which is the same in the latest forwarding destination as the source of the HTTP request received in step S211 and "process completed" in "state" and also the contents of "command ID" as the command ID of the corresponding terminal-apparatus command (S245).

Here, as route information related to transferring for receiving a terminal-apparatus command is registered in "source information", it is possible to recognize that the sheet in which the source information on a HTTP request is described as a forwarding destination for directly transferring from the processing server 103 is a sheet describing therein a command to be described in a HTTP response to the HTTP request so as to be transmitted.

Moreover, "state" being "process completed" indicates that the process corresponding to the terminal-apparatus command has not yet been transmitted after it has been generated by the terminal-apparatus command-execution result-generating means 244 so that a command response to be transmitted to the intermediary server 102 can be extracted based on the above.

Thereafter, the process of steps S246 through S248 is sequentially repeated for all command responses collected in step S245. The process as described above converts first a command response in question and a command ID collected with the response into a SOAP envelope in which the information sets as described are included in the SOAP body and the SOAP header respectively (S246) and an entity header is added thereto so as to generate a part related to the command in question (S247).

It is noted that, in step S247, information on transfer route is described in the entity header according to the "X-Send-To" header as described above with reference to "source information". Here, information for transmitting a HTTP response from now on is no longer needed so that it is not described. In other words, the contents of the "X-Send-To" header may be set to be the same as the contents of the "X-Received-From" header which are described at the time of receiving the corresponding terminal-apparatus command.

Then next, "state" of the terminal-apparatus command-sheet which describes the command response in question is changed to "responded" (S248). "State" being "responded" indicates that a command response has already been transmitted to the intermediary server 102.

Then, after the process up to here has been completed in its entirety, the CPU 301 merges each part generated in step S243 or S247, generates a multi-part HTTP response so as to be transmitted to the intermediary server 102 as a response to the HTTP request received (S249).

It is noted that the change of "state" performed in step S244 or S248 may be performed after this transmission is actually finished. The process as described above makes it possible to set the command and command response which are planned for transmission to be what are to be retransmitted even when a communications error takes place so that the system reliability is improved.

The above completes the process as illustrated in FIG. 52.

Figure 53:
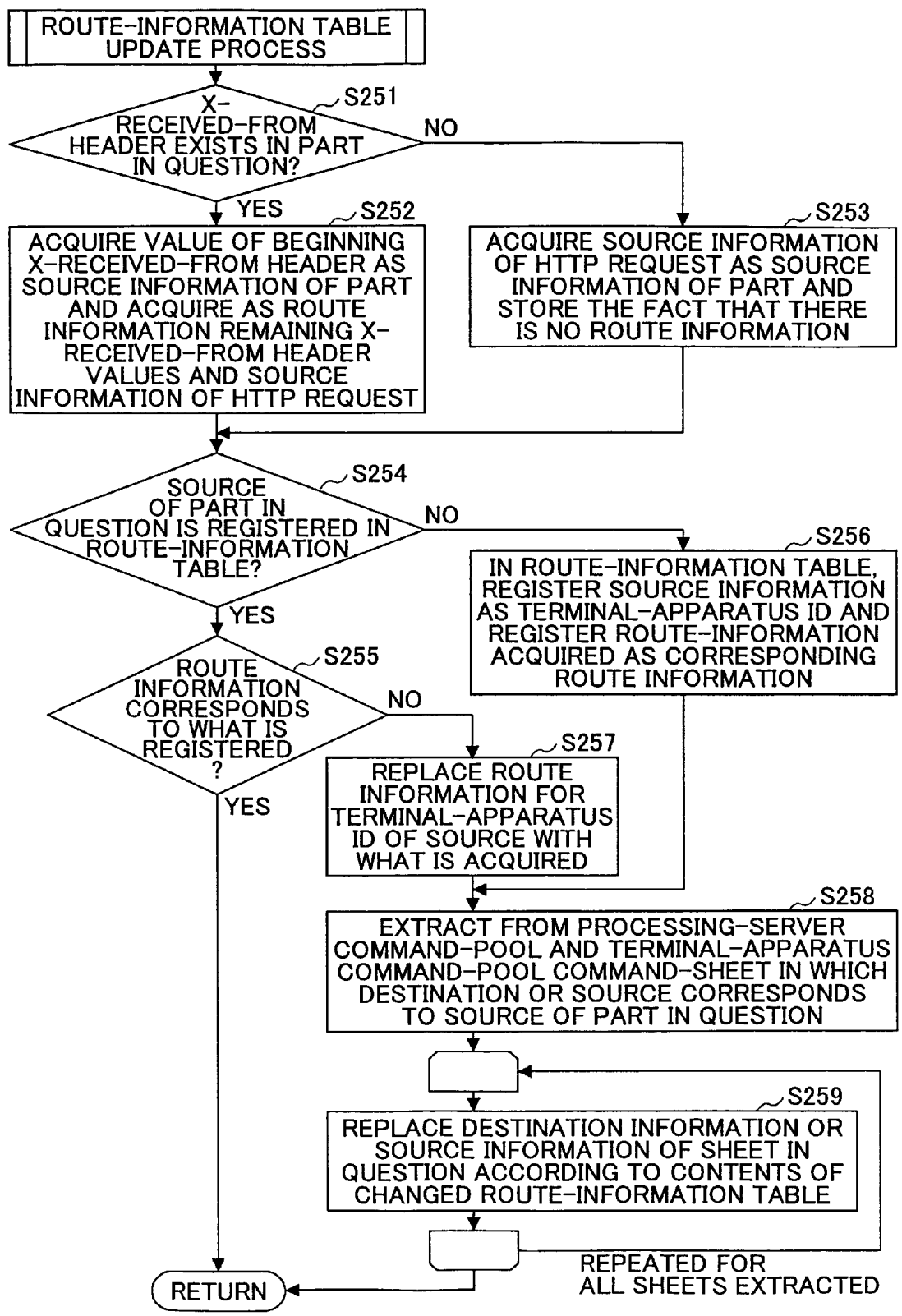
FIG. 53 is a flowchart illustrating the process of route-information table-update process illustrated in FIG. 50.

Next FIG. 53 illustrates a flowchart of the process of route-information table-update illustrated in FIG. 50, etc.

In this process, the CPU 301 first determines whether there are "X-Received-From" headers in the part in question, or whether route information is described in the entity header (S251).

Then, when there are "X-Received-From" headers, the value of the beginning "X-Received-From" header is obtained as source information of the part in question and obtains as route information the remaining "X-Received-From" header values and source information of the HTTP request received in step S211 of FIG. 50 (S252). On the other hand, when there are no "X-Received-From" headers, source information of the HTTP request is obtained as source information on the part in question and the fact that there is no route information is stored (S253).

In either case, next it is determined whether the source of the part in question is registered in a route-information table (S254). Then, when it is registered, whether the route information corresponds to the contents registered is determined (S255) and when it corresponds, as there is no need to change the contents of the route-information table, the process of FIG. 53 is terminated so as to return to where it came from.

When it is not registered in step S254, in order to newly register the source of the part in the route-information table, it is registered in the route-information table as the terminal-apparatus ID and the route information obtained in step S252 or S253 is registered as the corresponding route information.

Moreover, when it does not correspond in step S255, route information for the terminal apparatus ID of the source is replaced with route information obtained in step S252 or S253 and the route information is updated. This includes the case such that the original route information is unknown.

After step S256 or S257, in order to reflect the content updates of the route-information table in the command sheet already registered in a pool, a command sheet such that the destination or source (not including the intermediary transfer route) that corresponds to the source of the part in question (source information obtained in step S252 or S253) is extracted from the processing-server command-pool 241 and the terminal-apparatus command-pool (S258).

Then, the process of replacing destination information or source information of the sheet in question is sequentially performed for all sheets extracted according to the contents of the route-information table after the change (S259). Here, what is replaced is only the transfer route so that the eventual destination or the source of the command is not changed.

When the process as described above is finished in its entirety, the process illustrated in the flowchart of FIG. 53 is finished so as to return to where it came from.

Performing the process described using FIGS. 50 through 53 as in the above makes it possible for the processing server 103 to collectively transmit to the intermediary server 102 operational requests to be transmitted to various image-processing apparatuses 100 and operational responses to operational requests received from the image-processing apparatus 100. Moreover, it is possible to collectively receive from the intermediary server 102 operational requests from the image-processing apparatus 100 and operational responses to operational requests transmitted to the image-processing apparatus 100 so as to process them. Furthermore, even when a request for communicating is not transmitted from the processing server 103, it is possible to deliver operational requests or operational responses to an appropriate intermediary server 102 which provides for intermediating communications with the image-processing apparatus. 100.

It is noted that, while here again an explanation is provided such that all parts to be transmitted are first generated after which they are merged so as to be transmitted and all parts are first received after which they are divided so as to processed, the process does not have to be set as described above. The fact that a provision may be made for sequentially transmitting whenever each part is generated or sequentially performing the process related to each part whenever each part is received is the same as in the case of the intermediary server 102.

Moreover, as the process related to executing an image-equipment command, a provision may be made for executing for the intermediary server 102 the same process as the process described using FIG. 37 or FIG. 38.

The above completes an explanation of the process related to handling each command and command response that is executed in the processing server 103.

Figure 54:
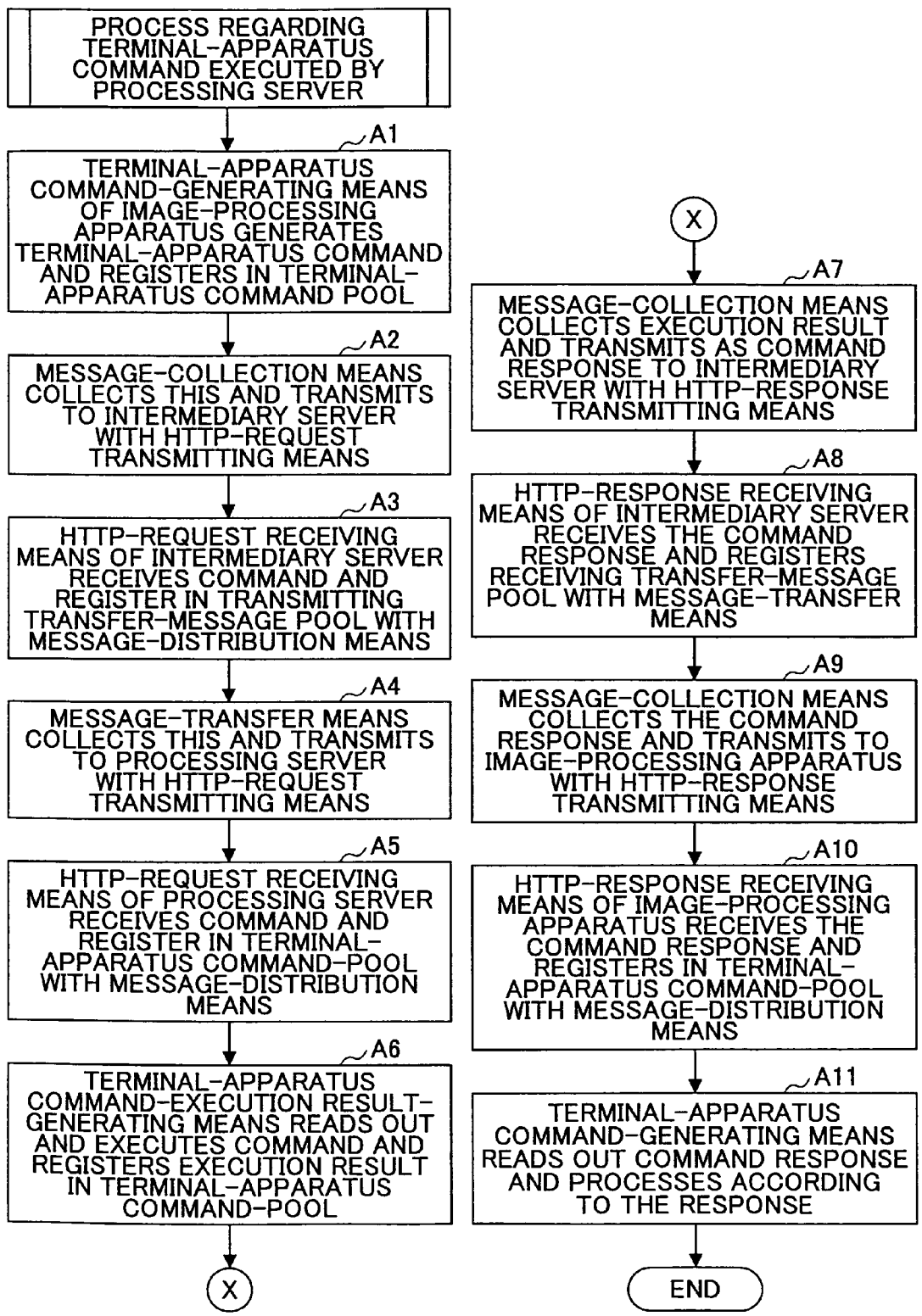
FIG. 54 is a flowchart illustrating a series of processes performed in each apparatus in the remote-control system illustrated in FIG. 3 from when the image-processing apparatus generates a terminal-apparatus command executed at the processing server to when a response to the command is received.
Figure 55:
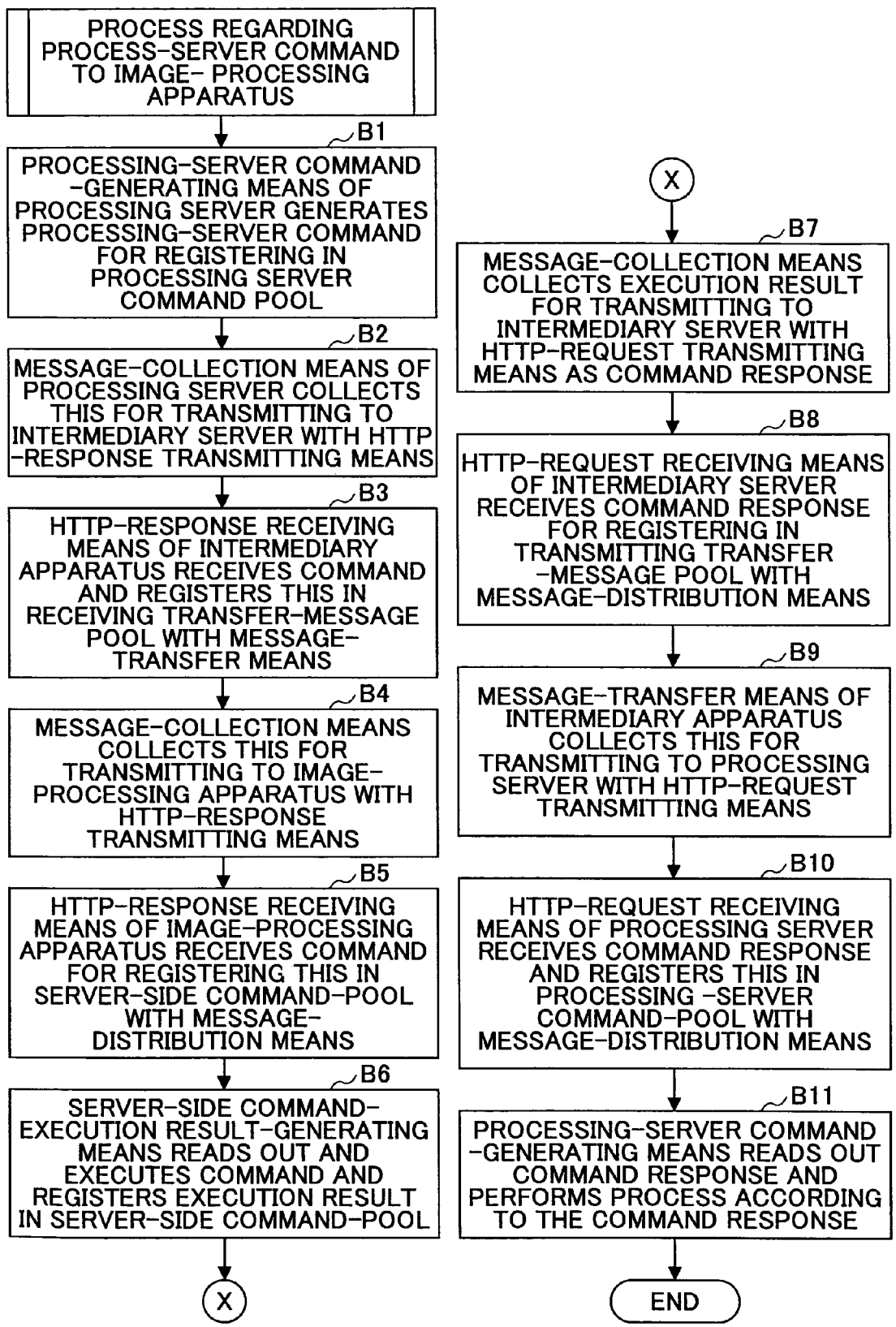
FIG. 55 is a flowchart illustrating a series of processes performed in each apparatus in the remote-control system illustrated in FIG. 3 from when the management server generates a management-apparatus command destined for the image-processing apparatus to when a response to the command is received.

Now, FIG. 54 illustrates a series of processes performed in each apparatus in the remote-control system described in the above from when the image-processing apparatus 100 generates a terminal-apparatus command executed at the processing server 103 to when a response to the command is received. Moreover, FIG. 55 illustrates a series of processes performed in each apparatus from when the processing server 103 generates a processing-server command destined for the image-processing apparatus 100 to when a response to the command is received.

Although each of the processes illustrated in these figures is one of the processes already described so that a detailed explanation is omitted, in the remote-control system as described in the above, performing the processes as described above makes it possible to perform with intermediating by means of the intermediary server 102 the transmission/reception of commands and command responses between the processing server 103 and the image-processing apparatus 100.

Then, as it may be understood from the above explanation, in this remote-control system, providing with the intermediary server 102 and providing for communications between the image-processing apparatus 100 and the processing server 103 to be conducted via the intermediary server 102 makes it possible to transfer to an appropriate forwarding destination a command or command response transmitted by the image-processing apparatus 100 even when the image-processing apparatus 100 does not recognize the fact that the processing server 103 exists and does not recognize which apparatus a command or command response is to be eventually transferred to. The reason for this is that it is provided for the intermediary server 102 to designate an appropriate forwarding destination according to the type of the command or command response received from the image-processing apparatus 100 so as to transfer the command or command response.

The process as described above makes it possible to reduce the burden of managing destination information in the image-processing apparatus 100 being a terminal apparatus installed in the customer-side environment. In other words, changing the configuration of the service provided by the function-providing side intermediary server 102 and processing server 103 is made possible only by changing the contents of the forwarding-destination table stored in the intermediary server 102. In other words, the process as described above is made possible by maintaining only the service-providing side so that destination-information management becomes very easy.

Moreover, while commands are often divided into groups so as to hierarchically manage them, by defining the correspondence between the type and the forwarding destination per group as described above, there is no need to change the forwarding-destination table even when commands within the same group are added or deleted. Therefore, the burden of managing destination information in the intermediary server 102 can also be reduced. Then, as commands in the same group are normally processed with the same application, no specific problem normally takes place even when setting the forwarding destinations the same.

Moreover, describing a command and a command response as a SOAP request and a SOAP response makes it possible to transmit/receive data standardized with XML so that data transmitted/received can be effectively reused. In other words, the process of registering received data in an in-house system or using a technology such as XSLT (XML Stylesheet language Transform) so as to automatically generate a Web page displaying data received can be easily performed.

Furthermore, while a name space of a tag is often defined in a SOAP message, designating a forwarding destination per name space of the tag related to command or command response provides for easily managing the forwarding destination. In this case, the level of breakdown does not have to be the same between the name space related to designating the forwarding destination and the name space related to defining a name-space prefix.

Moreover, in each apparatus configuring the remote-control system, adopting a configuration as described above makes it possible to collectively transmit/receive operational requests and operational responses to be transmitted/received between each apparatus regardless of their being operational requests or operational responses, or of where the eventual forwarding destination is so that there is no need for separately negotiating to establish a communications connection for transmitting an operational request and for transmitting an operational response and per eventual forwarding destination, thus making it possible to reduce the communications overhead and improve the communications efficiency.

The larger the number of image-processing apparatuses 100 and the larger the number of operational requests and operational responses to be transferred between the processing server 103 and the intermediary server 102 and the image-processing apparatus 100 the larger will be the advantage as described above.

More specifically, for the image-processing apparatus 100, the process as described above makes it possible to collectively transfer all operational requests and operational responses with the intermediary server 102 so that managing the communications timings becomes easy.

Moreover, the reason that operational requests and operational responses can be collectively transmitted is that these are respectively converted to serialized data and to transmitting messages described in a structured-language format. The process as described above makes it possible to easily combine operational requests and operational responses with differing formats and transmit them as one logical transmitting item.

Then, the process as described above makes it possible for each apparatus to easily separate operational requests and operational responses received collectively into individual messages and to perform an appropriate process depending on their being operational requests or operational responses and also depending on the type and the forwarding destination.

Moreover, combining each of multiple operational requests and operational responses without changing the format so as to express them in a format in which one transferable message can be generated, and separating the information sets as described above without changing the format in which the information sets are combined so as to set a format which allows for restoring individual operational requests and operational responses to be transferable makes it possible to reduce the burden of processing for combining or dividing operational requests and operational responses.

Furthermore, for communicating between the image-processing apparatus 100 and the intermediary server 102, communicating with a communications request always originating from the image-processing apparatus 100 and transmitting an operational response, etc., from the intermediary server 102 to the image-processing apparatus 100 as a response to the communications request makes it possible to transmit/receive operational requests and operational responses when the image-processing apparatus 100 is provided behind a firewall without being aware of the firewall. Moreover, as there is a correspondence between communications requests and communications responses, timing management at the communications level is easy.

In this case, periodically transmitting a communications request from the intermediary server 102 to the processing server 103 makes it possible to prevent transmitting of information from the processing server 103 to the intermediary server 102 from being tied up for a long period of time.

Moreover, in each apparatus, providing a command pool for registering an operational request for executing by itself and a command pool for registering an operational request generated by itself, and accumulating operational requests and operational responses generated by each application, etc., or received from other apparatuses makes it possible to generate and transmit/receive operational requests and operational responses without taking into account timing of transmitting to forwarding destinations. Therefore, the process as described above makes it possible to simplify timing management of the process and make design and development easy.

Then, with the process as described above, providing collection means for reading out operational requests and operational responses to be transmitted to a communications counterpart makes it possible when communicating to transmit without any omissions information to be transmitted.

Moreover, providing distribution means for separating operational requests and operational responses respectively and accumulating received information also in a pool makes it possible to execute operations related to operational requests received, to perform the process after receiving operational responses and to transfer operational requests and operational responses without taking into account the timing of receiving from the communications counterpart. Therefore, managing the timing is simplified so that the design and development of the apparatus becomes easy.

Moreover, assigning identifying information such as ID in the operational request generated so as to store and transmit the operational request in association with this identifying information and also storing and transmitting an operational response in association with information identifying the corresponding operational response makes it possible to easily recognize the correspondence between the operational request and the operational response via the identifying information even when including multiple operational requests and operational responses in one message (a HTTP message herein).

Then, assigning a priority order to the operational requests so as to execute and transmit the operational requests in the descending priority order makes it possible to execute with priority an operation requiring an urgent execution as well as to return with priority the response.

Moreover, in the intermediary server 102, providing a transfer-message pool and registering separately operational requests and operational responses merely intermediating transferring from those generated or executed by itself makes it possible for messages related to transferring to perform the process different from the process for other messages. For example, messages related to transferring do not require interpreting of the contents (for example, deserializing XML is not required) so that they can be registered in a transfer-message pool still in the format received. Moreover, the search range for searching a message to be transferred to the processing server 103 can be narrowed. Therefore, providing a transfer-message pool enables reducing the processing burden of the message-transfer intermediating process in the intermediary server 102.

Variation of the Embodiment

Next a variation of the embodiment as described above is described.

First, in the embodiment as described above, while an explanation is given for an example such that messages are transmitted/received for only one intermediary server 102 between a terminal apparatus such as the image-processing apparatus 100 and the processing server 103, it is a matter of course that transmitting/receiving may be performed via two or more intermediary apparatuses.

Figure 56:
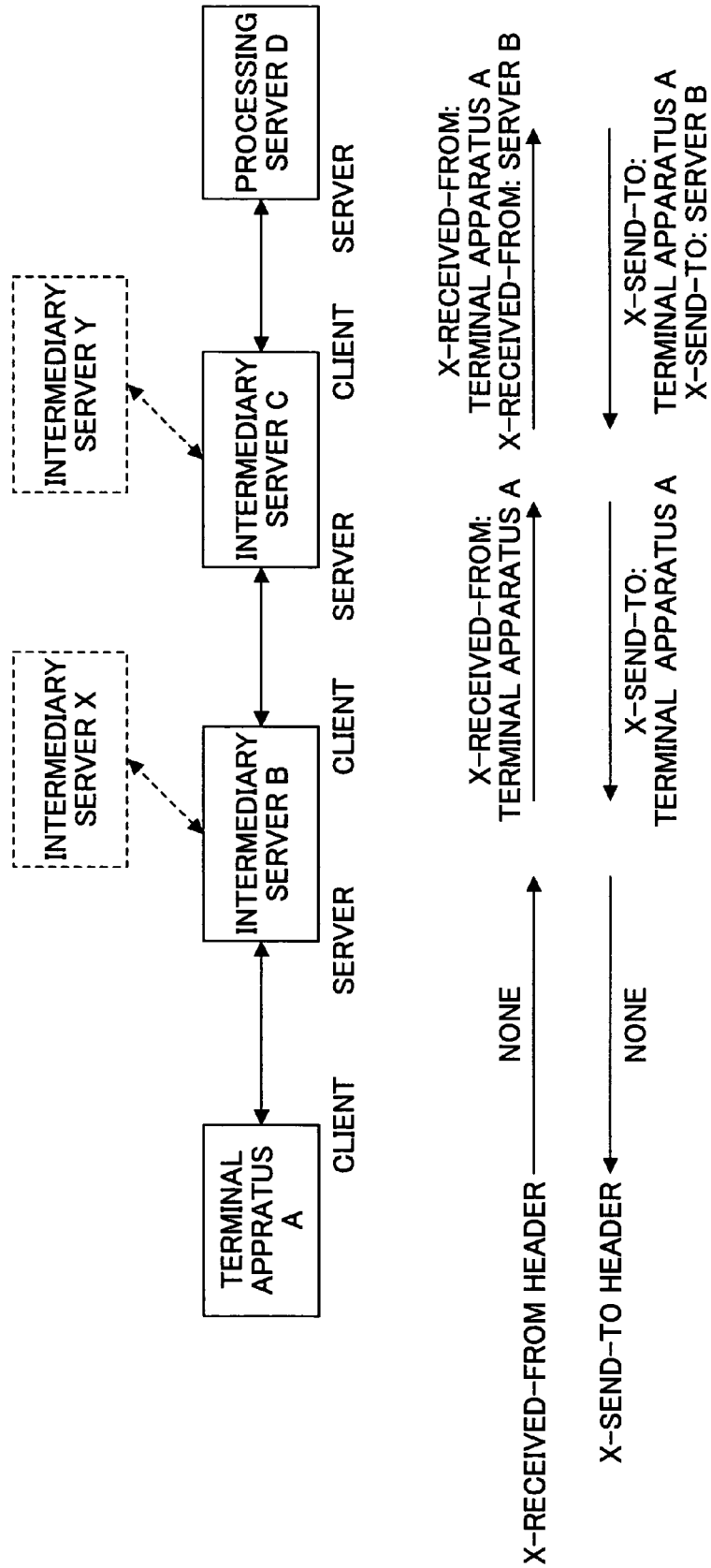
FIG. 56 is a diagram illustrating another example configuration of the distributed-processing system of an embodiment of the invention.

An example of such a distributed-processing system is illustrated in FIG. 56.

In this example, a terminal apparatus A can transmit/receive messages with a processing server D via two intermediary servers being intermediary servers B and C. In this case, the functions of the intermediary servers B and C are the same as the function of the intermediary server 102 in the embodiment as described above. Moreover, the function of the processing server D is the same as that of the processing server 103.

Then, in this case, a message for transferring in the direction from the terminal apparatus to the processing server is to be described in a communications request while a message for transferring in the opposite direction is to be described in a communications response corresponding to the communications request, so as to transfer the information sets as described above.

Moreover, which apparatus is a first apparatus and which is a second apparatus is relatively determined in relation to each intermediary server. More specifically, an apparatus transmitting a communications request to an intermediary server is a first communications apparatus while an apparatus to which an intermediary server transmits a communications request is a second communications apparatus. Alternatively, it is also possible to consider that an apparatus transmitting a message not describing a forwarding destination is a first communications apparatus while an apparatus transmitting a message describing a forwarding destination is a second communications apparatus.

In this distributed-processing system, the fact that the forwarding destination is the intermediary server C is stored in the intermediary server B for the type of messages to be transferred to the processing server D (it is not necessary to store where this is eventually transferred to). Then, the fact that the forwarding destination is the processing server D is stored in the intermediary server C for the type of messages to be transferred to the processing server D. Setting the forwarding destination in this way makes it possible to transfer a message transmitted from the terminal apparatus A to the intermediary server B to the processing server D via the intermediary server C.

Here, information "terminal apparatus A" is described in a "X-Received-From" header as the source information in a message transferred from the terminal apparatus A to the intermediary server B when it is further transferred to the intermediary server C. Moreover, when it is further transferred to the processing server D, information "intermediary server B" is described in the next "X-Received-From" header as the source information. Moreover, the processing server D can recognize from the source information of a HTTP request describing therein this message that the intermediary server C is also a transfer route.

Therefore, it can be understood that a message to be transmitted to the terminal apparatus A is to be transferred in a route of intermediary server C→intermediary server B→terminal-apparatus A at the processing-server D side. Then, the processing server D can describe the route information according to the "X-Send-To" header in the message to be transmitted to the terminal apparatus A (there is no need to describe information of the intermediary server C to be a destination to directly transfer to).

Then, in this way, an intermediary server being on a transfer route can refer to this transfer-route information, transfer to the next forwarding destination, and eventually transfer to the terminal apparatus A. Then, for transferring the message, route information indicating the forwarding destination is erased and the next forwarding destination is indicated at the bottom-most level.

It is noted that in the configuration as described above, as it can be understood from the description of FIG. 56, the contents of the header "X-Received-From" header described in the message transferred to the processing server from the terminal apparatus and the contents of the "X-Send-To" header described in the message transferred on the same route to the terminal apparatus from the processing server become fully the same.

Moreover, while an example of adding at the receiving side the "X-Received-From" header and deleting at the transmitting side the "X-Send-To" header is described in the embodiment as described above, setting the process in this way is not mandatory. Conversely, the "X-Received-From" header may be added at the transmitting side and the "X-Send-To" header may be deleted at the receiving side.

Figure 57:
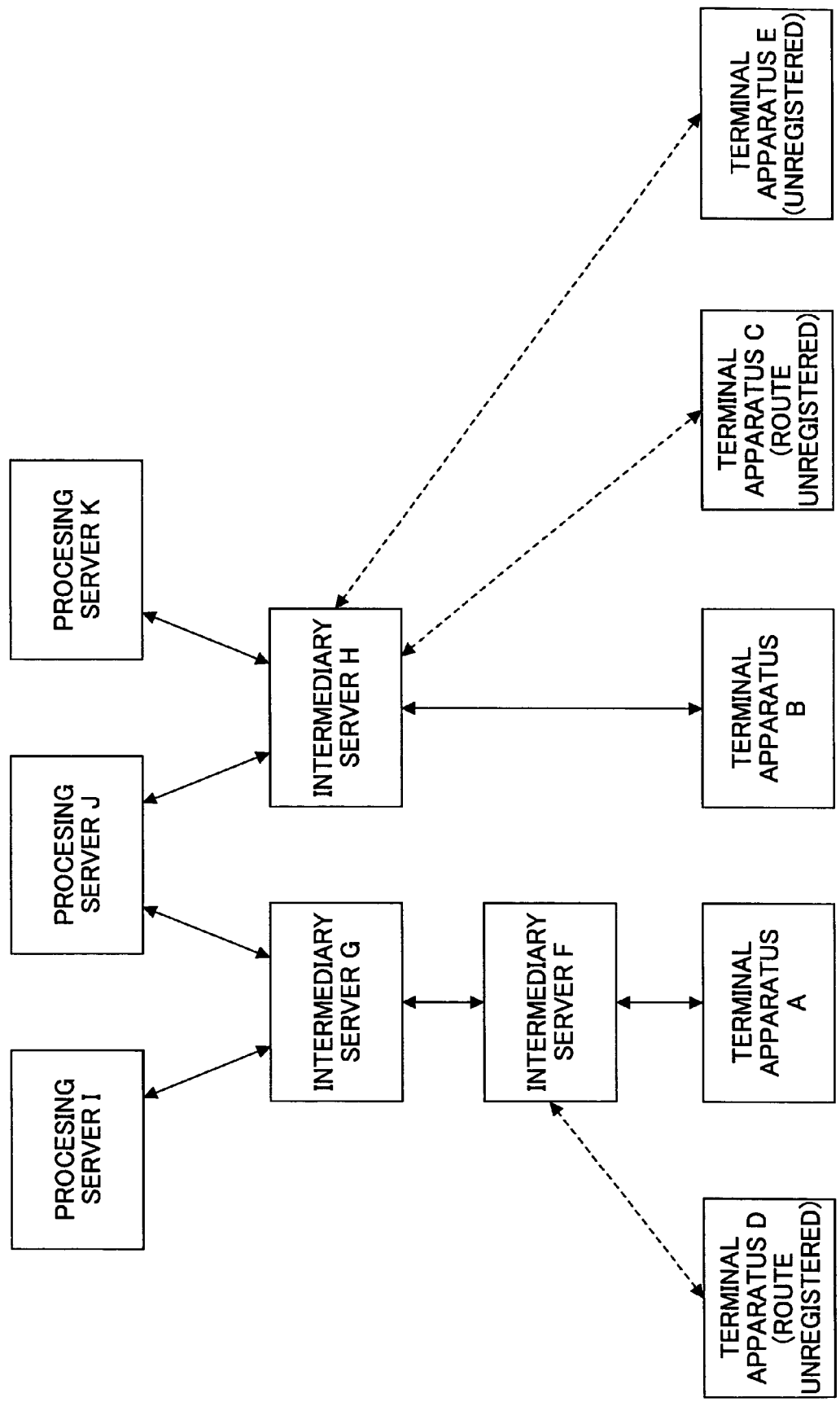
FIG. 57 is a diagram illustrating yet another example configuration of the distributed-processing system of the embodiment of the invention.

FIG. 57 illustrates yet another example configuration of the distributed processing system.

As illustrated in this figure, in the distributed-processing system of the invention, there is no need to have just one intermediary server communicating with the terminal apparatus. Moreover, there is no need to have a configuration such that messages are transmitted/received with only one intermediary server. The fact that one intermediary server may transmit/receive with multiple apparatuses is as described above.

The process as described above provides for storing information on destination and transfer routes. in a message to be transferred from a terminal apparatus to a processing server and for an intermediary server along the way to store therein information on forwarding destinations per type of messages and for describing information on transfer routes and destinations in a message to be transferred from the processing server to the terminal apparatus makes it possible to transfer a message to an appropriate counterpart by referring to these information sets as described above.

In a distributed-processing system with such a configuration as described above, a route-information table in a processing server J is as described in FIG. 58. In other words, for the terminal apparatus A, it can be recognized at the processing server J side that a message can be transferred in a transfer route such as terminal apparatus A ⇔ intermediary server F ⇔ intermediary server G ⇔ processing server J. As for the terminal apparatus B, it can be recognized that a message can be transferred in a transfer route such as terminal apparatus B ⇔ intermediary server H ⇔ processing server J.

As for terminal apparatuses C and D, no routes have yet been registered. However, when the processing server J receives a message from the terminal apparatus D, a route of terminal apparatus D ⇔ intermediary server F ⇔ intermediary server G ⇔ processing server J can be recognized from information on the transfer route of the message so that it can be registered in the route-information table.

Similarly, as with the terminal apparatus E, when receiving messages from a terminal apparatus not registered in the route-information table, a route of terminal apparatus E ⇔ intermediary server H ⇔ processing server J can be recognized from information on transfer route of the message so that it can be registered in the route-information table. However, it is possible to set the process such that an error is returned for messages from a terminal apparatus not registered in advance in the route-information table and no new registrations are made to the route-information table.

It is noted that as a matter of course, various configurations other than the configurations illustrated in FIGS. 56 and 57 may be taken as a distributed-processing system. It is noted that allowing for messages to be transmitted from one terminal apparatus to multiple intermediary servers causes the need to manage message destinations at the terminal-apparatus side. Thus, it is preferable to allow for transmitting messages to only one intermediary server from each terminal apparatus.

It is noted that in these distributed-processing systems including the distributed-processing system of the embodiment as described above, there is not necessarily a need to distinguish a processing server from an intermediary server. Then, in this way, the function of these servers may be the function described for the intermediary server 102 in the embodiment, to which is added the function related to the route-information storing means 250 described for the processing server 103.

Then, in an apparatus in which information on something other than itself is not registered in the forwarding-destination table as a forwarding destination, the whole process related to all operational requests and operational responses received is to be done by itself so that transfer-message pools and message-transfer means are never used, resulting in the apparatus as described above to function as a processing server. Therefore, in this way, only changing the contents of the forwarding-destination table makes it possible for the same apparatus to function as one of the processing server and the intermediary server so that changing the system configuration becomes easy.

It is noted that it is also possible to conversely not provide the intermediary server with the function of performing the process related to operational requests or generating operational requests and set an intermediary server as an apparatus dedicated to intermediating messages. In this way, none of a terminal-apparatus command-pool, an intermediary-server command-pool, and terminal-apparatus command-execution result-generating means are needed. Therefore, it is possible to simplify the configuration of the intermediary server and reduce the design and development efforts so as to reduce costs.

Moreover, it is also possible to allow for transmitting a communications request from the processing server to the intermediary server and for describing in the communications request messages related to operational requests and operational responses.

Furthermore, in the embodiment as described above, an explanation is provided for an example such that what describes therein as a forwarding-destination table in the intermediary server 102 as illustrated in FIG. 34 per name space URI information on a forwarding destination of messages related to a command or command response belonging to the name space. However, it is also possible to provide for transferring to a predetermined forwarding destination a message for which a forwarding destination is not clearly specified in the forwarding-destination table.

In this way, as described in FIG. 59, it is possible to provide for establishing a "default" item in a forwarding-destination table and for transferring, when a name space URI of a command or command response is not registered in the forwarding-destination table, to the forwarding destination registered in the "default" a message related to the command or command response. Then, in this case, in the message-distribution process as illustrated in FIG. 33, when the name space URI is not registered in the forwarding-destination table in step S22, the forwarding destination of the message of the part in question may preferably set to be the forwarding destination stored in the "default".

Figure 60:
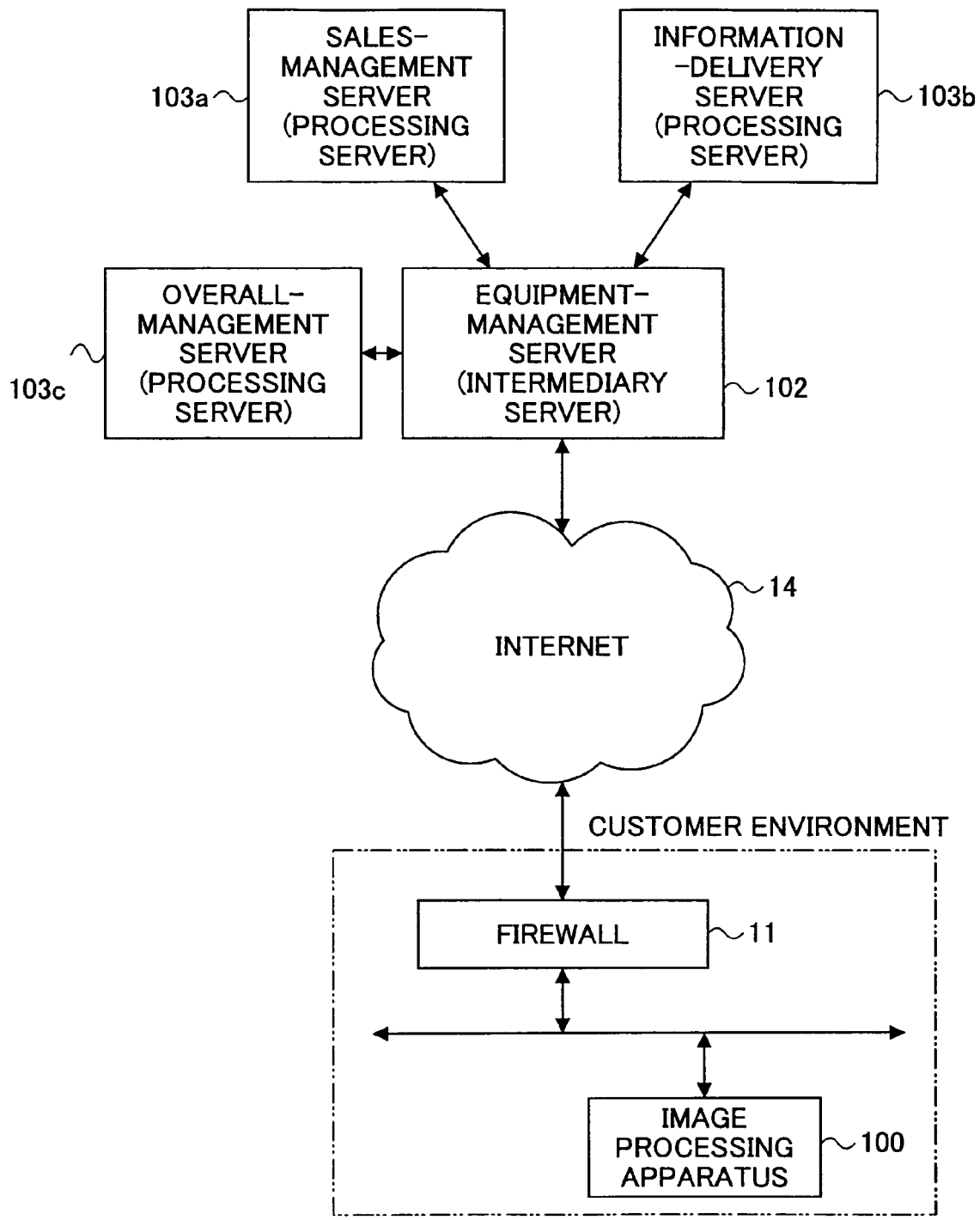
FIG. 60 is a diagram illustrating an example configuration of a distributed-processing system when using the forwarding-destination table illustrated in FIG. 59.

Moreover, as a system configuration using the forwarding-destination table illustrated in FIG. 59, a configuration illustrated in FIG. 60, for example, is possible. In other words, the configuration as described above is a configuration such that an overall-management server 103c is added in the distributed-processing system as illustrated in FIG. 3. Then, storing in the equipment-management server 102 a forwarding-destination table as illustrated in FIG. 59 provides for transferring to all overall-management servers 103c messages which are neither to be processed at the equipment-management server 102 nor to be transferred to the sales-management server 103a or the information-delivery server 103b.

In this way, as there is now no need to designate in the intermediary server 102 forwarding-destination information depending on all commands or command responses which can be handled, system design and management become easy.

In this case, there is no need to process messages received by the overall-management server 103c by itself and the messages may be further transferred to other apparatuses. Moreover, in such a case a forwarding-destination table used by the overall-management server 103c may be one with no "default" item such as the one illustrated in FIG. 34 or one with a "default" item such as the one illustrated in FIG. 59. Furthermore, it is also possible to collate a forwarding destination registered in the "default" item with any name space URI so as to set the forwarding destination to be the same as a destination registered in the forwarding-destination table.

Moreover, it is also possible to use in each intermediary server a forwarding table as illustrated in FIG. 61. In other words, it is also possible to register as a forwarding destination for only commands or command responses to be processed by itself the intermediary server itself, and to transfer all of the other commands or command responses to the next intermediary server.

Figures 62, 63:
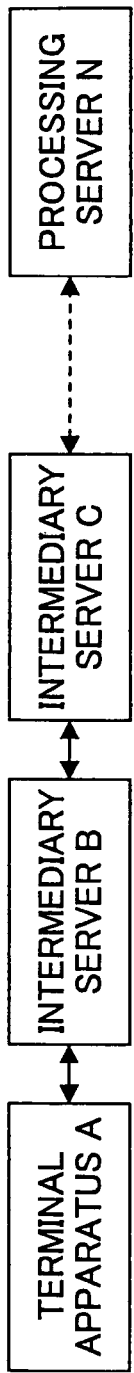
FIG. 62 is a diagram illustrating an example configuration of a distributed-processing system for using the forwarding-destination table as illustrated in FIG. 61.
FIG. 63 is a diagram illustrating example data which may be used in lieu of the forwarding-destination table when configuring the distributed-processing system as illustrated in FIG. 62.

In this case, it is possible to, for example, configure the distributed-processing system as illustrated in FIG. 62, and to arrange in series multiple intermediary servers so that each intermediary server sequentially transfers to the next server messages to commands or command responses other than those to be processed by itself. Configuring the system in this way allows for storing in each intermediary server only information on commands and command responses to be processed by itself and forwarding destination of the other commands and command responses so that system design and management further becomes easy.

Then, as there is no need for each intermediary server to know how messages are processed in the intermediary server or processing server of the forwarding destination of the messages, it is possible to freely specify in the intermediary server or processing server of the forwarding destination the type of commands accepted or the division of the process without reporting to the intermediary server from which the commands are forwarded from. Therefore, when a company installing an intermediary server subcontracts the process related to messages to another company and the subcontracted company further subcontracts the process, adopting such a configuration as described above is especially effective as a company contracted for the process can freely configure the system.

Then, in a final-stage processing server N, not providing a "default" item in a forwarding-destination table and performing an error process to commands or command responses for which the name space URI is not registered in the forwarding-destination table makes it possible to appropriately handle commands, etc., not related at all.

Then, in case it suffices to handle only the configuration such that multiple intermediary servers are directly arranged as illustrated in FIG. 62, it is preferable to store in each intermediary server information as illustrated in FIG. 63 in lieu of a forwarding-destination table. In other words, it is preferable to store a name space URI to which a method processed by itself belongs and a ID of the server of the forwarding destination to which other commands, etc., are transferred.

Figure 64:
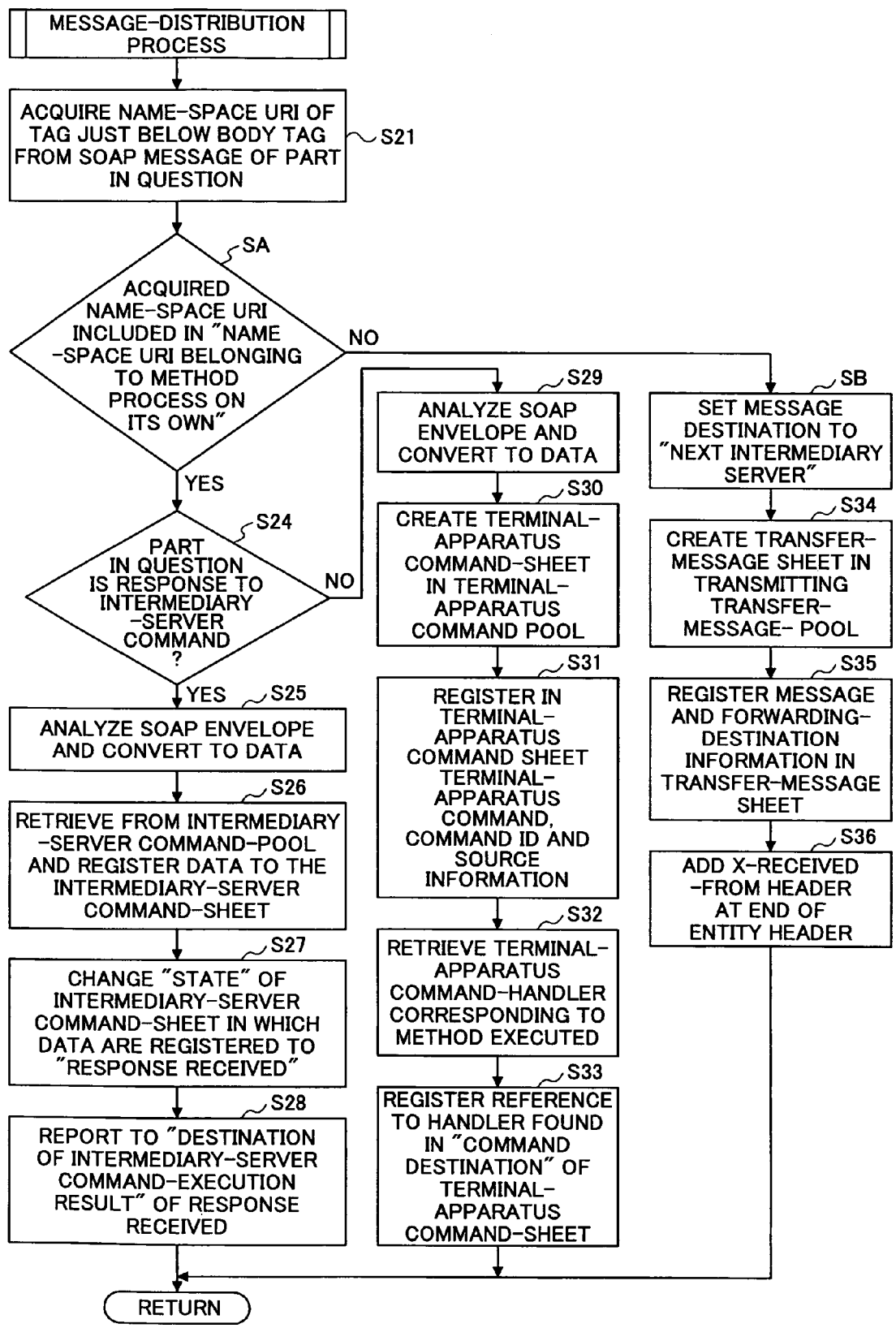
FIG. 64 is a flowchart corresponding to FIG. 33, illustrating a message-distribution process for executing when using data illustrated in FIG. 63.

FIG. 64 illustrate a flowchart of a process for handling when using information illustrated in FIG. 63. The process illustrated in FIG. 64 provides for performing the process of steps SA and SB in lieu of steps S22 and S23 of the process illustrated in FIG. 33.

In other words, when using information illustrated in FIG. 63, in the message-distribution process in the basic flow of the message transmission/reception illustrated in FIG. 32, the process illustrated in FIG. 64 is performed. Then, in step S21, from the SOAP message of the part in question, a name space URI of a command or command response related to the message is obtained, and in step SA it is determined as to whether the name space URI is included in "name space URI to which a method processed by itself belongs" illustrated in FIG. 63.

Then, when it is included, as the command or command response is to be processed by itself, the process proceeds to step S24 and beyond and performs the same process as in the case of FIG. 33. When it is not included, as the command or command response is to be transferred to the next intermediary server, in step SB the message destination is set in the "next intermediary server" registered as "forwarding-destination server ID" illustrated in FIG. 63 and the process proceeds to step S34 and beyond so that the message in question is registered in the transmitting transfer-message pool 51.

Providing for each intermediary server to execute the process as described above makes it possible with only information as illustrated in FIG. 63 to appropriately cause messages to be transferred. It is noted that, when adopting such a process as described above, there is only one server at the forwarding-destination so that, for performing the process of transferring messages as illustrated in FIG. 39, it is preferable to collect all messages registered in the transmitting transfer-message pool 51 and to transmit to a predetermined forwarding destination. Therefore, managing the forwarding destination of a message in the transfer-message sheet as illustrated in FIG. 14 is not mandatory.

It is noted that it is possible to register multiple servers as "forwarding-destination server-ID" and to distribute to each server according to scheduling dependent on received date/time of messages, according to where messages are received from, or on a random basis, etc., forwarding destinations of messages related to commands to be transferred to other servers. In this way, it is possible to prevent messages from concentrating at the server of the forwarding destination and to achieve a distribution in the processing burden.

Moreover, the same process may also be performed for the command response. In this case, providing a database to which each apparatus at which there is a possibility of eventually receiving a message refers in common so as to pool therein the received messages makes it possible for the source apparatus, even when a command response does not arrive at the source apparatus, to refer to the command response by accessing the database.

Moreover, even for a message related to a command which can be processed by itself, when resources required for processing by itself cannot be secured sufficiently, etc., a provision may possibly be made for transferring to other servers. In such a case, it is preferable to provide in the server of the forwarding destination the function of processing the same command as the server from which forwarding was made. The process as described above makes it possible, when the processing burden is concentrated in some servers, to cause in a simple process and in an efficient manner the process to be distributed to multiple servers.

Then, while an explanation is provided for an example of performing in multi-part transferring of messages among all apparatuses, setting the process as described above is not mandatory. For example, when restricting the commands to be handled in the overall system only to those directed from the terminal apparatus to the intermediary server or the processing server, it is also possible to adopt a method such as to describe only one SOAP message in one HTTP request or HTTP response, for example, the process in the intermediary server 102 that is as described using FIG. 41. The process as described above eliminating the need for each apparatus to handle a special transfer protocol such as a multi-part makes it possible to reduce the design and development efforts so as to reduce costs.

Moreover, even when restricting commands to be handled in the overall system to those directed from the terminal apparatus to the intermediary server or the processing server, providing for transferring using the multi-part as described above makes it possible to similarly obtain the advantages as described above.

Furthermore, in the embodiment as described above, while SOAP is adopted as an upper-level protocol for implementing RPC and an application directly operates the pool so as to implement the RPC, a bridge (message-conversion function) with CORBA (Common Object Request Broker Architecture) or JAVA (a registered trademark) RMI (Remote Method Invocation) may be provided so as to further improve the application development efficiency.

Moreover, in the embodiment as described above, while passing on a command and a command response to the command between nodes is described herein as what is to be performed using a SOAP message described in XML, the above is not restrictive so that the description may be in other formats.

Moreover, there is no harm in providing a limit on the information amount of commands or command responses to be transmitted/received. More specifically, providing for limiting the information amount of commands to be received makes it possible to reduce the memory capacity utilized when the receiving side represents an apparatus with a limited memory capacity.

Moreover, in the embodiment as described above, while it is assumed that adopting a SOAP-standard protocol as well as a proprietary protocol combining SOAP and MIME multipart provides for handling a HTTP request or a SOAP envelope included in a HTTP response as totally independent, a SOAP attachment defined as specifications related to SOAP may be used to configure in a manner such that a link to a SOAP envelope of a second part and beyond is embedded in a SOAP envelope of a first part included in a HTTP response so as to associate the SOAP envelopes for delivering. The same applies in the case of adopting SMTP.

It is noted that while a message is to be included in an electronic mail for transmission when adopting SMTP as a message transfer protocol, it is possible to include in one electronic mail multiple messages using a MIME multi-part, etc. Therefore, it is possible to use an electronic mail, and another electronic mail in response to the electronic mail in lieu of the HTTP request and the HTTP response as described above. However, as there is in an electronic mail no correspondence such as one between a communications request and its response, there is a need to independently manage the timings of a first transmission and a return transmission in response to the first transmission. Moreover, as an electronic mail takes a long period of time before arriving at the destination, it is preferable to use HTTP as a transfer protocol for smoothly operating the system.

Moreover, while an example is described herein for connecting the image-processing apparatus 100 and the intermediary server 102 via the Internet 14, various other communications routes, wireline or wireless, allow for network communications may be used. Similarly, for mutually communicating between the intermediary server 102 and the processing server 103, various communications routes may be used.

Furthermore, it is a matter of course that the configuration of the distributed-processing system is not limited to what is described above so that this invention may be applied to a distributed-processing system other than a remote-control system and an arbitrary communications system.

For example, "a terminal apparatus" in the embodiment as described above is strictly "a terminal" in a distributed-processing system so that there is no need to function as "a terminal" also within the customer environment. In other words, a configuration is also possible such that a backbone server in the customer environment is connected as "a terminal apparatus" to a distributed-processing system such as the embodiment as described above and process the information obtained therefrom so as to distribute the information to other apparatuses within the customer environment.

Moreover, also as for the processing server, there is no need for it to be an apparatus for executing commands which are respectively different. For example, in the intermediary server, a provision may be made for referring to not only the type of operational requests or operational responses but also information on the source of the message so as to determine the forwarding destination. With the process as described above, the number of terminal apparatuses for transmitting operational requests increasing makes it possible to easily achieve a distribution of the processing burden by allocating a processing server per predetermined number of units of terminal apparatuses even when the burden on the processing server becomes excessive. Even in this case, as there is no need at all to report the specifics of distributing the process to the terminal-apparatus side, the burden for changing the system configuration is kept to a minimum.

Moreover, for operational requests from the terminal-apparatus side, it is also possible to dynamically change the forwarding destination based on the result of the intermediary server monitoring the communications traffic. Even in this way, the processing server having the function of returning an operational response with an appropriate transfer route designated makes it possible to accurately return an operational response to the source of the operational request.

In addition, a provision may be made for installing an apparatus corresponding to an intermediary server also at the customer environment and making the apparatus to serve collectively transferring of messages related to multiple terminal apparatuses. In this case, an intermediary server and a terminal apparatus in the customer environment being possibly connected with a LAN make it possible to apply for communicating between these elements as described above a common communications protocol used in a communication within the LAN.

Therefore, providing such a protocol conversion function in an intermediary server at the customer environment makes it possible even for a terminal apparatus not handling a special protocol to connect to a distributed-processing system using a special protocol such as a multi-part transferring and obtain the advantages as described above.

Then, even in this way as the intermediary server and the terminal apparatus within the customer environment that communicate via a network in which communications counterparts are normally limited, the processing burden of negotiating is kept small so that the communications efficiency does not decrease so much even when the number of times of communicating increases. Moreover, as there is no need to make the terminal apparatus handle a complex communications protocol, it is possible to reduce the efforts and cost for configuring the system as a whole.

It is noted that in this case the connection between the intermediary server and the terminal apparatus in the customer environment is not limited to a LAN and may be a serial connection which is RS-485 compliant or a parallel connection which is SCSI (Small Computer System Interface) compliant. For example, in the case of the RS-485 connection, up to five units of terminal apparatuses may be serially connected to an intermediary server.

Moreover, when an intermediary server is not provided at the customer environment, each terminal apparatus individually makes periodic communications requests as described above in order to prevent information transmission from being tied up. Thus, a large number of communications requests would rush into the intermediary server 102 at the function-providing side. Therefore, when providing a large number of terminal apparatuses in the customer environment, it is preferable to provide an intermediary server at the customer environment and to cause the intermediary server as a representative to make periodic communications requests.

In this case, a system configuration as illustrated in FIG. 65 is possible. In this figure, networked appliances such as a television receiver 10*a* and a refrigerator 10*b*, a medical device 10*c*, an automated vending machine 10*d*, a metering system 10*e* and a ventilation system 10 *f* are indicated as example apparatuses to be managed for which a customer-environment side intermediary-server 112 is separately provided. Then, as example apparatuses to be managed for which a customer-environment side intermediary-server 112 is not separately provided, an automobile 10*g* and an airplane 10*h* are indicated. Moreover, in an apparatus such as the automobile 10g or the airplane 10h that travels over a wide range, it is preferable to also have the function of the firewall (FW) 11. Moreover, even when there is a firewall 11 between a customer-environment side intermediary server 112 and a functional-providing side intermediary server 102, by providing for always originating communications requests from the customer-environment side intermediary server 112 so as to transfer messages, there is no harm in transferring messages.

Moreover, even at the functional-providing side, there is no need for a single vendor to provide the intermediary server 102 and the processing server 103. In case the command forwarding destination can be grasped in each intermediary server, it does not matter how the function is provided at the processing server of the forwarding destination.

Therefore, performing at the terminal-apparatus side the process of transmitting commands to multiple processing servers for providing functions such as sightseeing-site guides, timetable guides, ticket reservations or reservations for accommodations, processing XML data of the respective command responses so as to combine the processed data and converting into one HTML document makes it possible for the intermediary server to also provide a service similar to service provided by the so-called portal site that is such that functions of multiple sites are provided within one web page.

Moreover, in the embodiment as described above, an example is described such that the terminal apparatus does not describe messages related to destinations or forwarding destinations in operational requests and operational responses transmitted to the intermediary server. However, a provision may be made for performing at the terminal-apparatus side the process of grasping information on the processing server destination to transmit a terminal-apparatus command and on the processing-server command source, and describing destination on commands and responses for transmitting to the intermediary server.

In such a case as described above, it is preferable to describe in a SOAP header within a SOAP message information on the destination and the source and to describe the information in a terminal-apparatus command-sheet or server-side command-sheet so as to manage the described information.

Moreover, when the destination described in the operational request and operational response received from the terminal apparatus is only itself or an apparatus to which directly communicating is possible, no forwarding-destination table is provided in the intermediary server so that it suffices to register the destination provided in the SOAP header as the forwarding destination in a transfer-message sheet. When the destination may include an apparatus to be transferred to yet another intermediary server, it is possible to store as a forwarding-destination table the destination information and the correspondence with the apparatus to be a direct forwarding destination and to refer to this table so as to determine the next-stage forwarding destination.

It is noted that at any rate it is necessary to deserialize for the time being a SOAP message in order to interpret the contents of the SOAP header.

Even when adopting a configuration as described above, the advantages of improving the communications efficiency by collectively transferring from the processing server operational requests destined for multiple terminal apparatuses are obtained as in the case of the embodiment as described above. The advantages are especially large when the intermediary server is a customer-environment side intermediary server as described above.

Moreover, the advantages of improving the communications efficiency are similarly obtained even when the intermediary server collectively transmits operational requests from multiple processing servers that are destined for the terminal apparatus and collectively receives operational responses to the operational requests. The advantages are especially large when the intermediary server is provided at the function-providing side.

These advantages are obtained even when operational requests from the terminal-apparatus side are not handled, and only the operational requests from the processing-server side and operational responses to them are handled.

It is noted that as a matter of course, each variation as described above can be combined for applying to the extent that the variations do not contradict.

Moreover, the program according to this invention, which is for causing a computer to function as an intermediary apparatus for intermediating communications between a first communications apparatus and a second communications apparatus, makes it possible to obtain the advantages as described above by causing such program to be executed by the computer.

Such program may be stored from the beginning in storage means such as a ROM or a HDD that the computer is provided with, or it may also be recorded in a CD-ROM or a flexible disk that is a recording medium, or in a non-volatile recording medium (memory) such as a SRAM, an EEPROM or a memory card. Each of the procedures as described above can be executed by installing a program stored in the memory so as to cause the installed program to be executed by the CPU or reading out this program from the memory so as to cause the read-out program to be executed by the CPU.

Moreover, the process of connecting to a network and downloading a program from external equipment provided with a recording medium in which the program is recorded or from external equipment which stores in its storage means the program so as to cause the program to be executed is also possible.

The present application is based on the Japanese Priority Applications No. 2004-032586 filed on Feb. 9, 2004 and No. 2004-272614 filed on Sep. 17, 2004, the entire contents of which are hereby incorporated by reference.

The invention claimed is:

1. A method of operating a plurality of intermediary servers coupled between first and second servers and coupled in series, each of the plurality of intermediary servers including a table, the method comprising:

receiving, at a first of the plurality of intermediary servers, a Hypertext Transfer Protocol (HTTP) request from the first server;

dividing, by the first of the plurality of intermediary servers, the HTTP request into parts;

distributing the parts of the HTTP request to process, by the first of the plurality of intermediary servers, the distributing for each part of the HTTP request including, acquiring a uniform resource identifier (URI) from a Simple Object Access Protocol (SOAP) message of the part, determining whether the acquired URI is to be processed by the first of the plurality of intermediary servers based on the table, and setting to transfer the part to a next of the plurality of intermediary servers if the acquired URI is not to be processed by the first of the plurality of intermediary servers, the set to transfer part to be distributed by the next of the plurality of intermediary servers; and transmitting, by the first of the plurality of intermediary servers, an HTTP response based on the distributed parts of the HTTP request.

2. The method of claim 1, wherein the determining includes,
    determining whether the acquired URI is to be processed by the first of the plurality of intermediary servers based on setting names and setting values in the table.

3. The method of claim 2, wherein the setting to transfer includes,
    setting to transfer the part to the next of the plurality of intermediary servers that is identified in the table.

4. The method of claim 1, wherein the table is a forwarding destination table and the determining includes,
    determining whether the acquired URI is to be processed by the first of the plurality of intermediary servers based on a plurality of URI and associated forwarding destination information in the forwarding destination table.

5. The method of claim 4, wherein the setting to transfer includes,
    setting to transfer the part to the next of the plurality of intermediary servers, the next of the plurality of intermediary servers being identified as a default setting in the table.

6. The method of claim 1, wherein the distributing includes,
    second determining if the part is a response to a command from one of the plurality of intermediary servers.

7. The method of claim 6, wherein the second determining includes,
    second determining if the part is a response to a command from one of the plurality of intermediary servers based on a SOAP header.

8. The method of claim 7, wherein the distributing further includes,
    converting data in the part to a format for a command sheet for the first of the plurality of intermediary servers if the part is a response, and
    obtaining an intermediary server command corresponding to the part from an intermediary server command pool.

9. The method of claim 7, wherein the distributing further includes,
    converting data in the part to a format for a command sheet for the first server, and
    obtaining a first server command corresponding to the part from a first server command pool.

10. The method of claim 1, further comprising:
    merging each distributed part into the HTTP response.

11. A first of a plurality of intermediary apparatuses for intermediating communications between a first communications apparatus and a plurality of second communications apparatuses, the plurality of intermediary apparatuses being connected in series, the first of the plurality of intermediary apparatuses comprising:
    a first transmitting and receiving part configured to receive a Hypertext Transfer Protocol (HTTP) request from the first communications apparatus;
    a second transmitting and receiving part configured to transmit and receive data to and from at least one of the plurality of intermediary apparatuses and the plurality of second communications apparatuses; and
    a message distribution means coupled to the first transmitting and receiving part, the message distribution means configured to
        divide the HTTP request into parts,
        acquire a uniform resource identifier (URI) from a Simple Object Access Protocol (SOAP) message of the part,
        determine whether the acquired URI is to be processed by the first of the plurality of intermediary apparatuses based on a table stored in the first of the plurality of intermediary apparatuses, and
        set to transfer the part to a next of the plurality of intermediary apparatuses if the acquired URI is not to be processed by the first of the plurality of intermediary apparatuses.

12. The first of a plurality of intermediary apparatuses of claim 11, wherein the table includes setting names and setting values, at least one of the setting names being an identification of the next of the plurality of intermediary apparatuses.

13. The first of a plurality of intermediary apparatuses of claim 11, wherein the table is a forwarding destination table that includes a plurality of URI and associated forwarding destination information.

14. The first of a plurality of intermediary apparatuses of claim 13, wherein the next of the plurality of intermediary apparatuses is identified by a default URI.

15. The first of a plurality of intermediary apparatuses of claim 11, wherein the message distribution means is configured to determine if the part is a response to a command from one of the plurality of intermediary apparatuses.

16. The first of a plurality of intermediary apparatuses of claim 15, wherein the message distribution means is configured to
    convert data in the part to a format for a command sheet for the first communications apparatus, and
    obtain a first communications apparatus command corresponding to the part from a first communications apparatus command pool in the first of the plurality of intermediary apparatuses.

17. The first of a plurality of intermediary apparatuses of claim 15, wherein the message distribution means is configured to
    convert data in the part to a format for a command sheet for the first of the plurality of intermediary apparatuses if the part is a response, and
    obtain an intermediary apparatus command corresponding to the part from an intermediary apparatus command pool in the first of the plurality of intermediary apparatuses.

18. The first of a plurality of intermediary apparatuses of claim 17, wherein the obtained intermediary apparatus command is registered in an intermediary apparatus command sheet and a state of the intermediary apparatus command sheet indicates that the response is received.

19. The first of a plurality of intermediary apparatuses of claim 11, further comprising:
    a message transfer means configured to transfer the set to transfer parts to the second transmitting and receiving part.

20. A method of operating a plurality of intermediary servers coupled in series and coupled between first and second servers, each of the plurality of intermediary servers including a table, the method comprising:
    receiving, at a first plurality of intermediary servers, a Hypertext Transfer Protocol (HTTP) request from the first server;
    dividing, by the first plurality of intermediary servers, the HTTP request into parts;
    distributing the parts of the HTTP request, the distributing for each part of the HTTP request including,
        acquiring a uniform resource identifier (URI) from a Simple Object Access Protocol (SOAP) message of the part,
        determining whether the acquired URI is to be processed by the first of the plurality of intermediary servers based on the table, and setting to transfer the part to a next of the plurality of intermediary servers if the acquired URI is not to be processed by the first of the plurality of intermediary servers, the transferred part to be distributed by the next of the plurality of intermediary servers;

transferring, by the first of the plurality of intermediary servers, the parts set to transfer to the next of the plurality of intermediary servers;

receiving, by the first of the plurality of intermediary servers, responses from the next of the plurality of intermediary servers corresponding to the parts set to transfer;

collecting, by the first of the plurality of intermediary servers, the responses from the next of the plurality of intermediary servers;

second collecting, by the first of the plurality of intermediary servers, commands for the first of the plurality of intermediary servers to the first server;

merging the commands and the responses into an HTTP response; and transmitting, by the first of the plurality of intermediary servers, the HTTP response to the first server.

* * * * *